United States Patent [19]

Isbister et al.

[11] 4,104,629

[45] Aug. 1, 1978

[54] MARINE RADAR INTERROGATOR-TRANSPONDER TARGET DETECTION, IDENTIFICATION, AND RANGE MEASUREMENT SYSTEM

[75] Inventors: Eric J. Isbister, Greenlawn, N.Y.; Horace E. Fidler, Charlottesville, Va.

[73] Assignee: Sperry Rand Corporation, New York, N.Y.

[21] Appl. No.: 714,211

[22] Filed: Aug. 13, 1976

[51] Int. Cl.² ............................................. G01S 9/56
[52] U.S. Cl. ............................... 343/6 R; 343/6.5 LC
[58] Field of Search .............. 343/6 R, 6.5 R, 6.5 LC

[56] References Cited

U.S. PATENT DOCUMENTS

| 3,772,692 | 11/1973 | Braddon | 343/6 R |
|---|---|---|---|
| 3,806,922 | 4/1974 | Isbister | 343/6.5 LC |
| 3,900,846 | 8/1975 | Gibbon et al. | 343/6 R |
| 3,945,006 | 3/1976 | Cleeton | 343/6 R |

Primary Examiner—T.H. Tubbesing
Attorney, Agent, or Firm—Howard P. Terry

[57] ABSTRACT

A marine radar interrogator-transponder navigation and collision avoidance system provides facilities for early detection of, identification of, and communication with cooperating marine vessels. For these purposes, a general coded call may be transmitted by own ship to all other ships in radio range, the reply then being returned from each answering ship with the coded identification of that ship. In this manner, the other ships may be identified. Own ship may call a specific second ship or a shore based transponder, the called transponder returning only the coded message it received. Own ship may call a specific second ship causing an alarm to call the ship's operator to a radio telephone, the identical coded message being reradiated.

The invention provides means for application in cooperative systems using a finite number of such discrete interrogator-transponder addresses for receiving proper replies from responding transponders lying on a radial line with respect to own ship so that the replies are not destroyed by overlap. Other problems are solved related to the use of a finite number of addresses which may be less than the expected population of addressed ships, rendering it possible that two or more transponders will reply with the same address codes.

85 Claims, 28 Drawing Figures

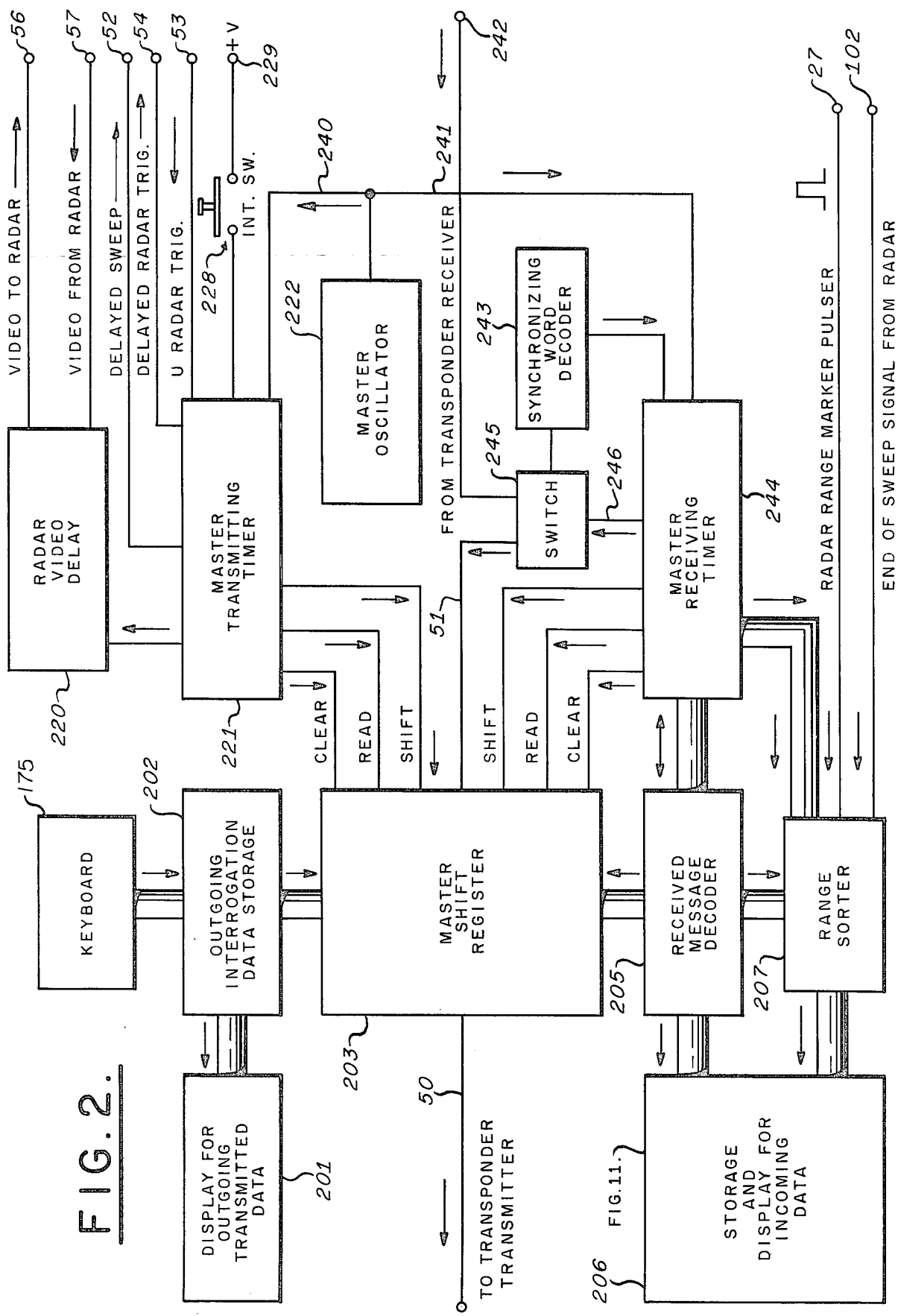

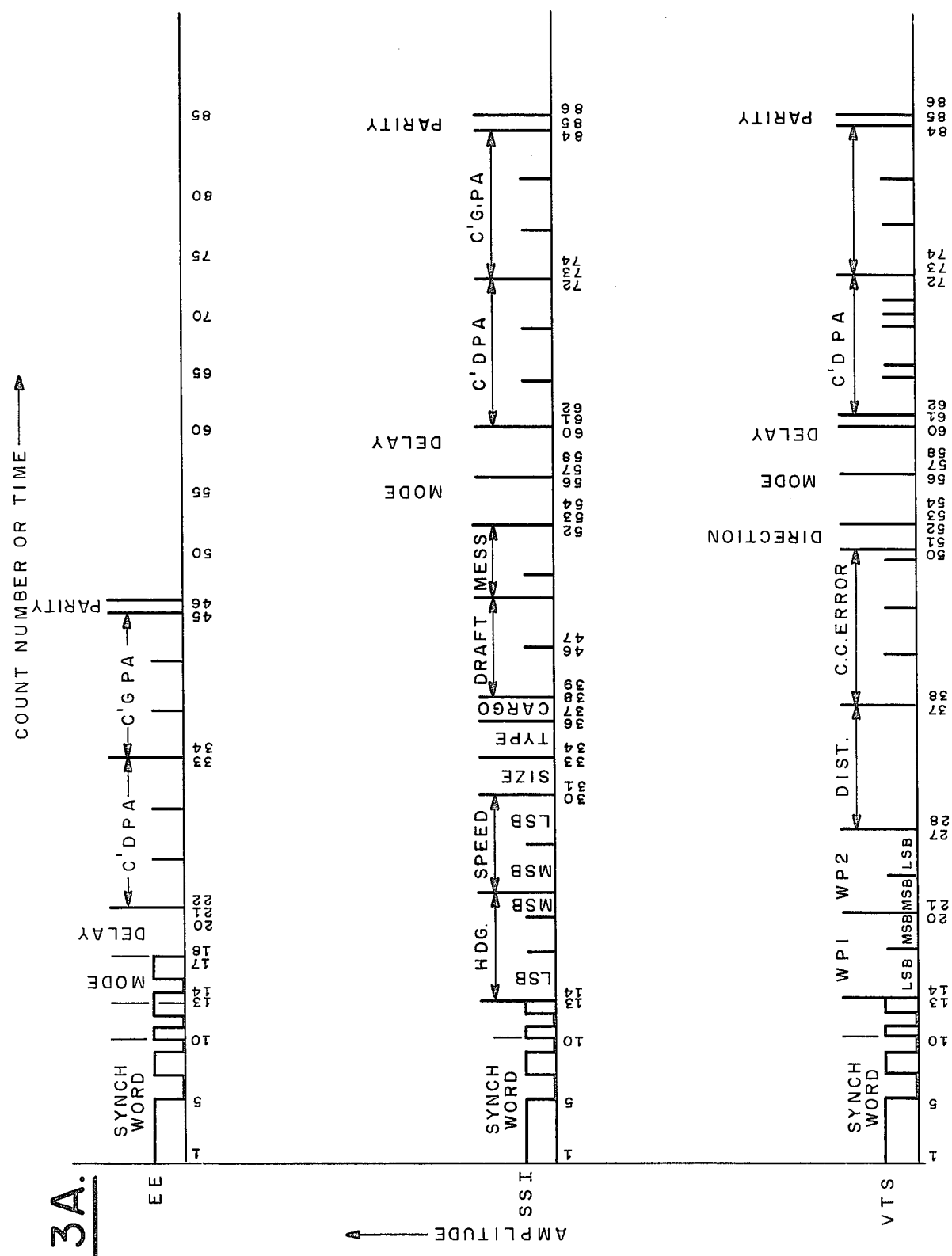

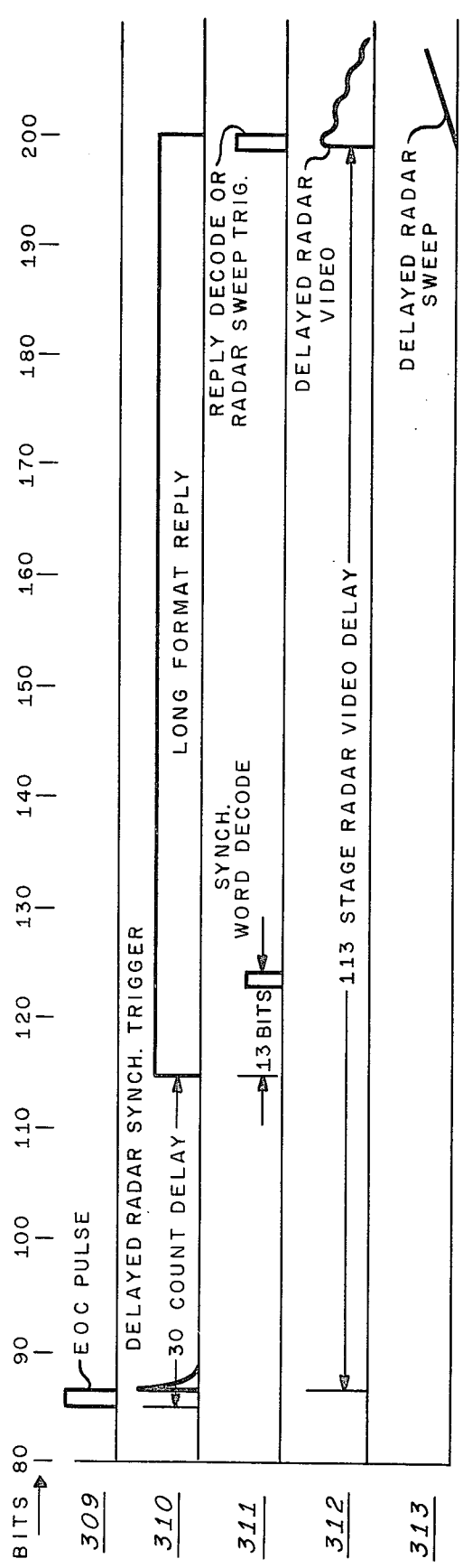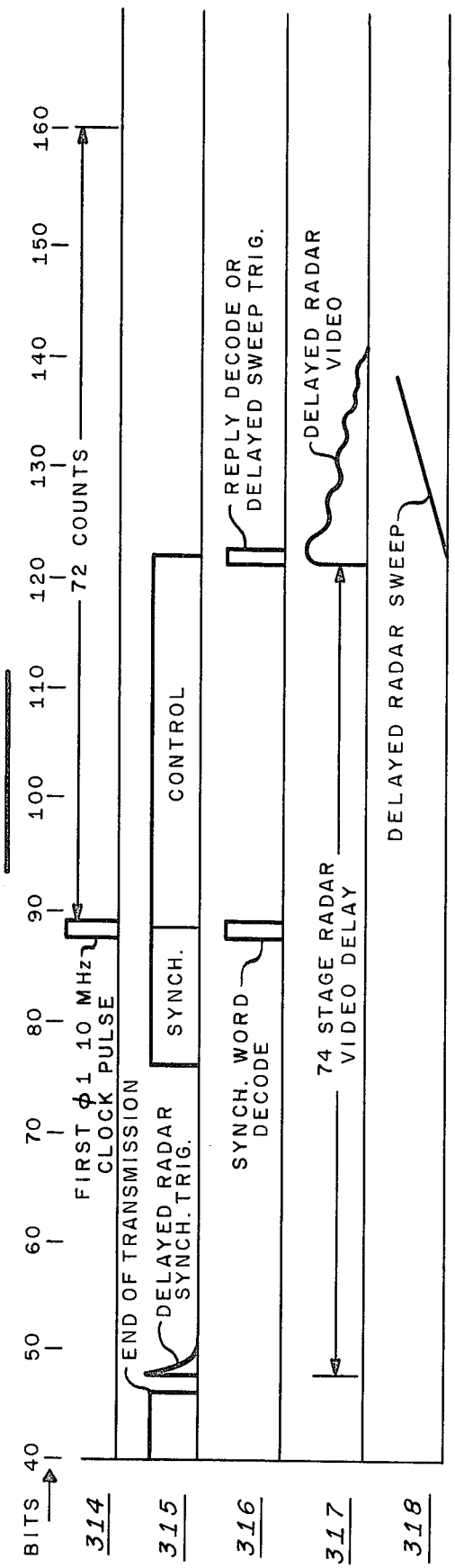
FIG. 3C.
FIG. 3D.

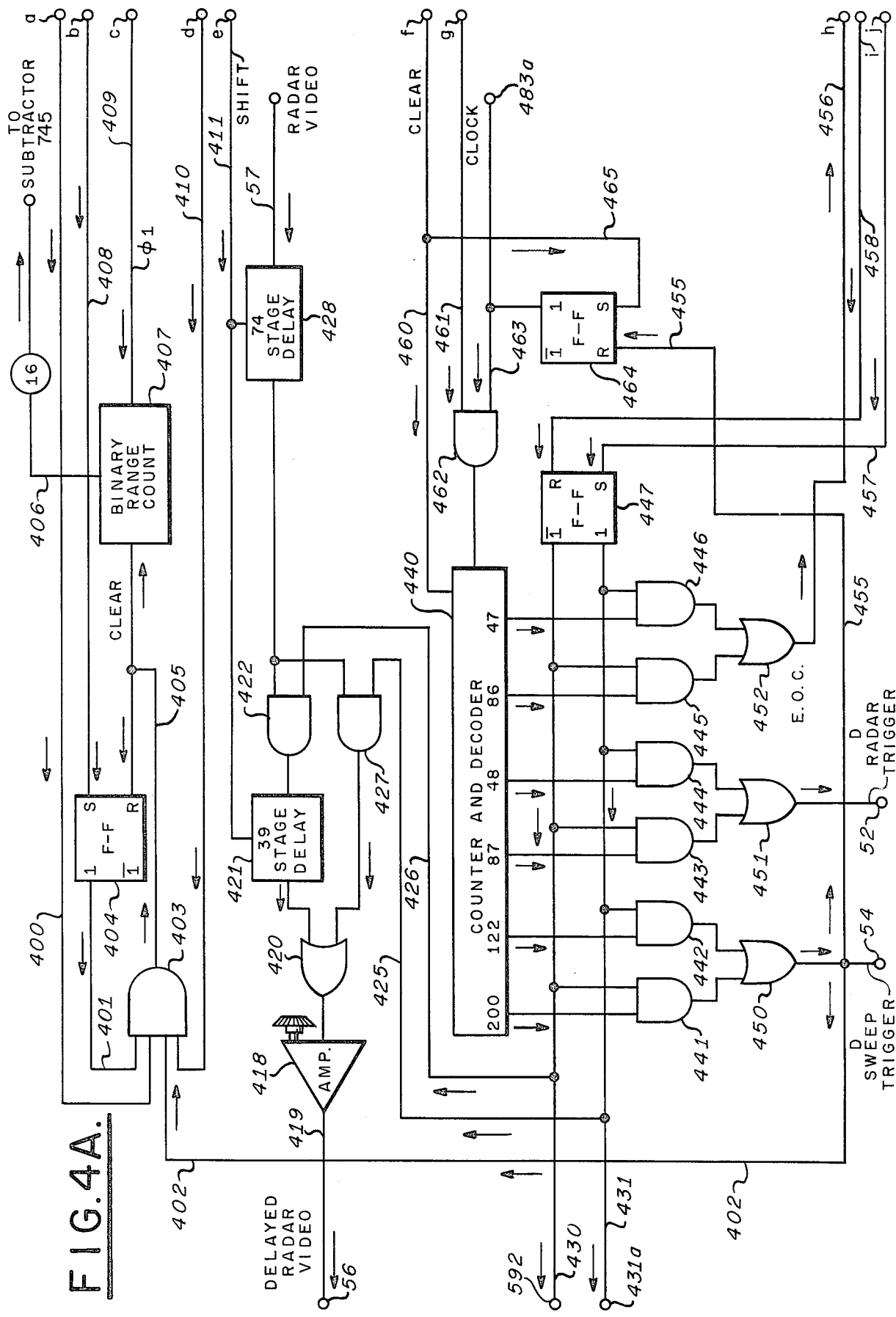

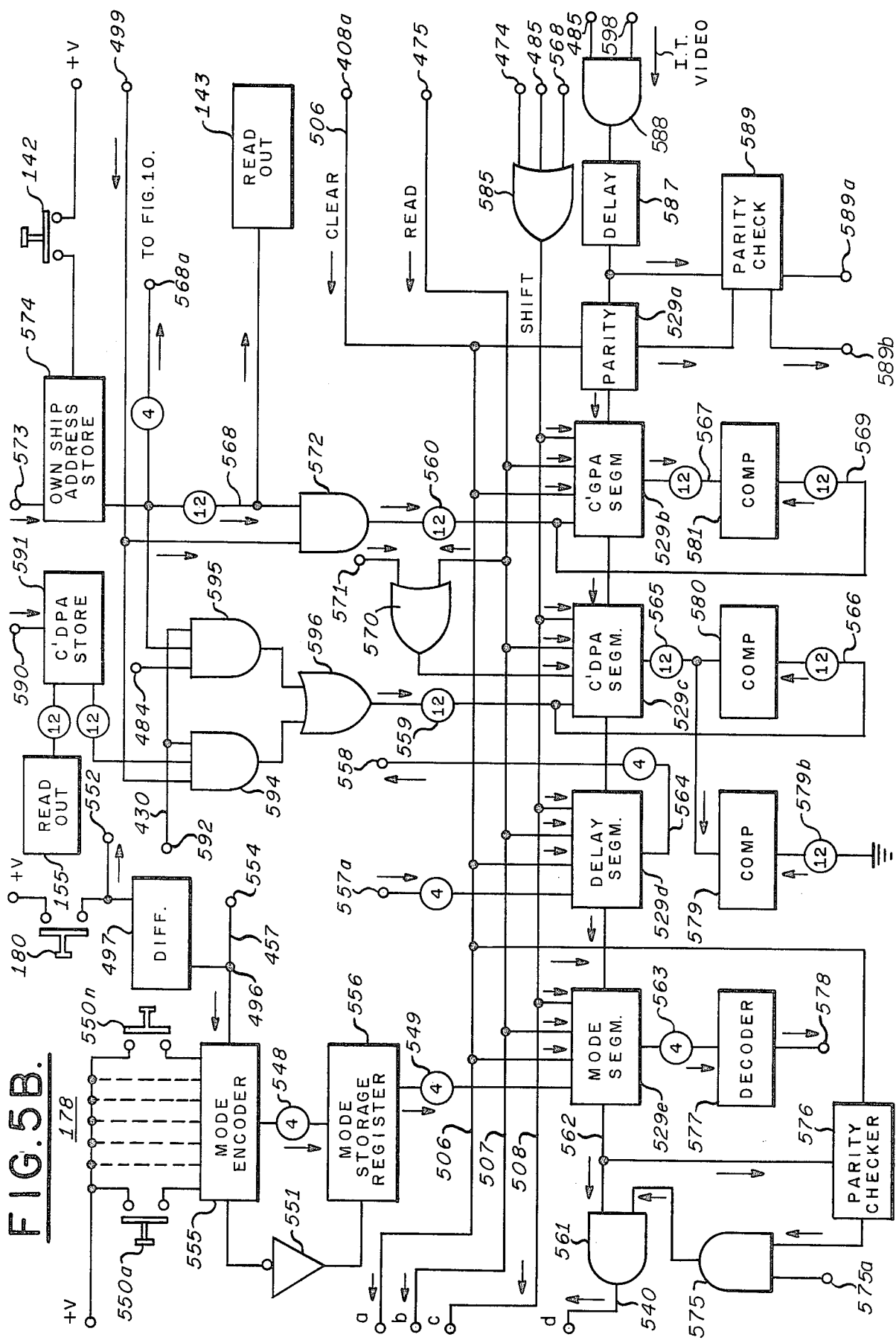

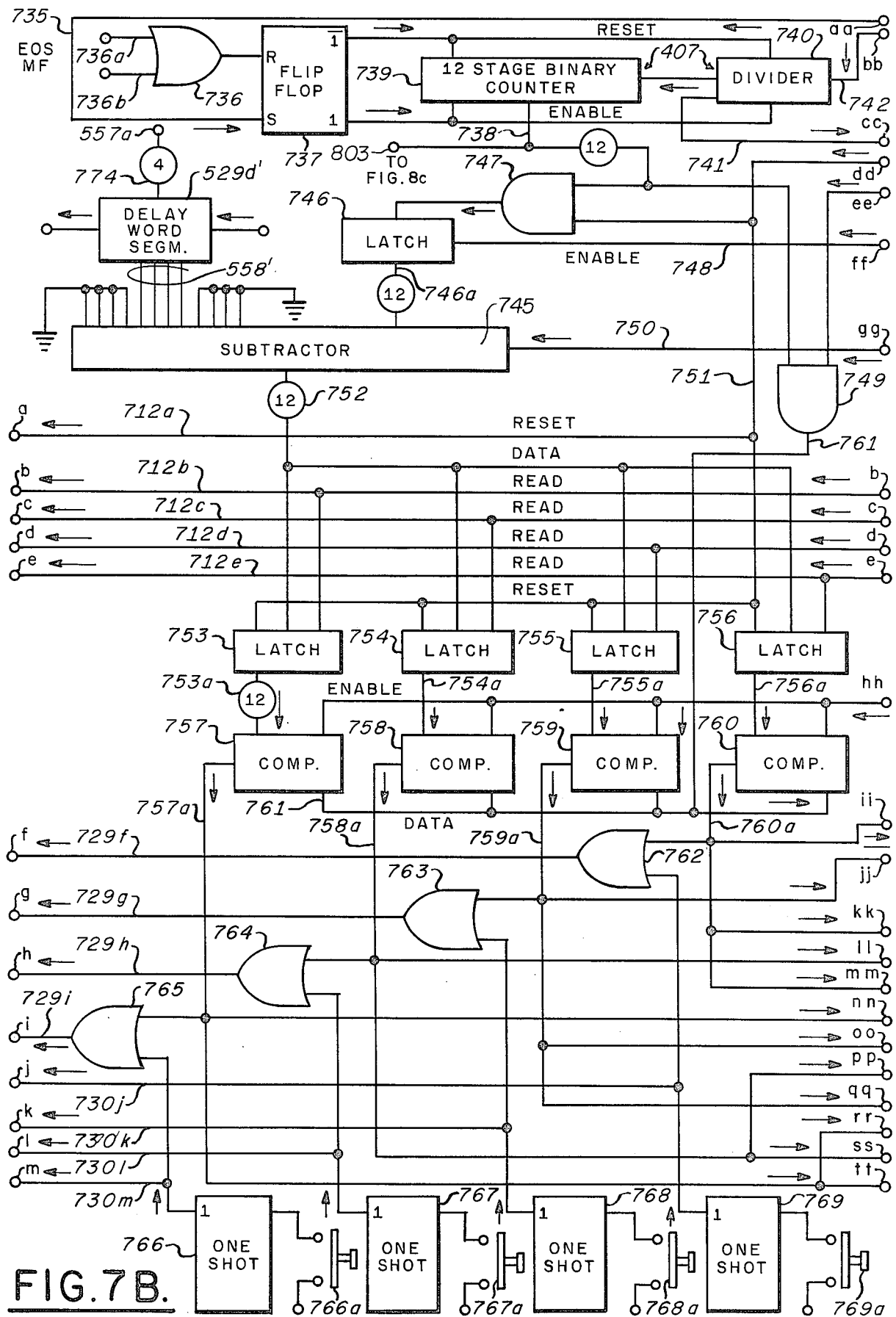

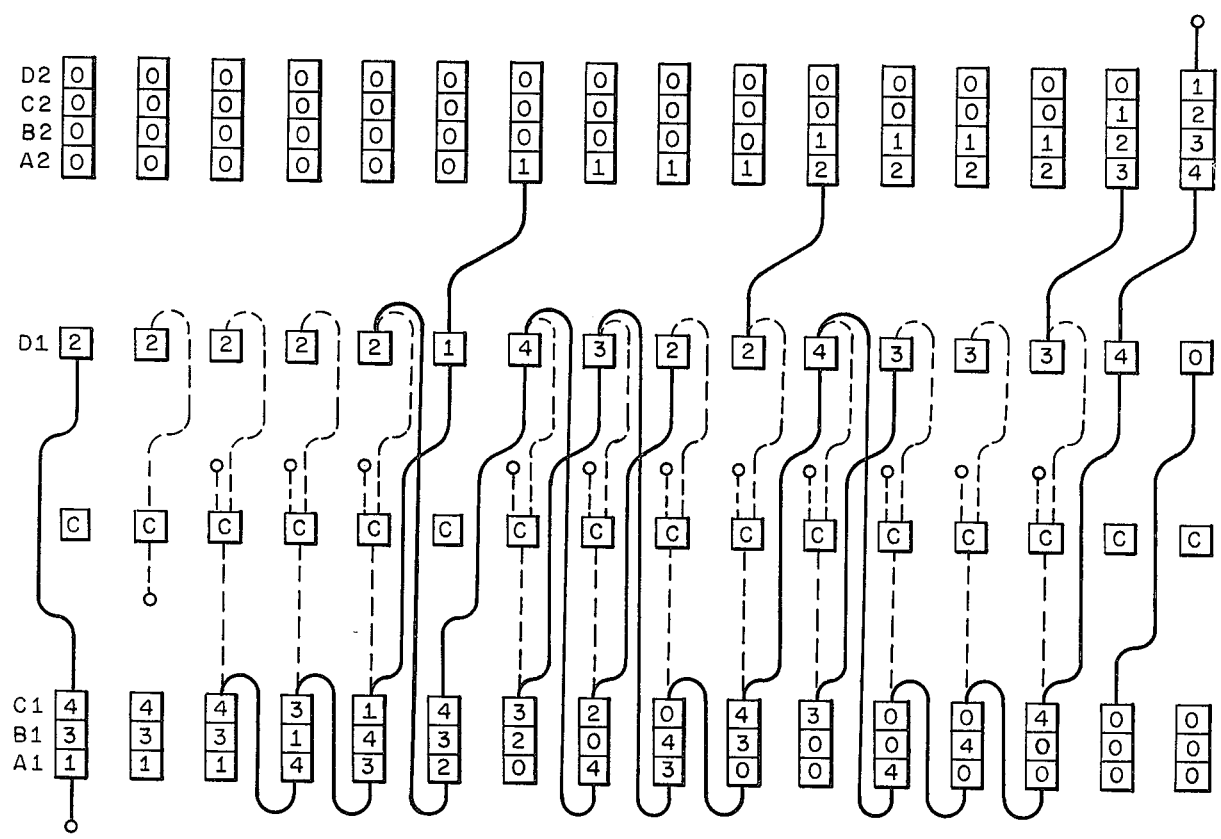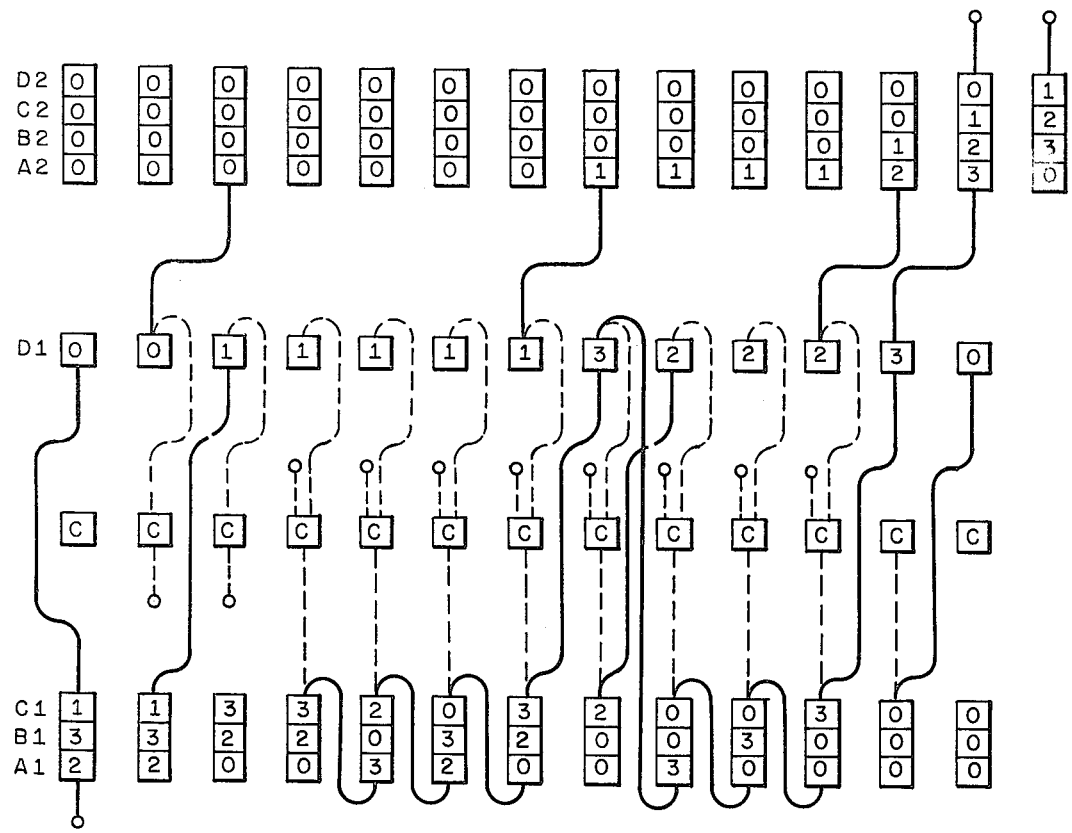
FIG.8E.

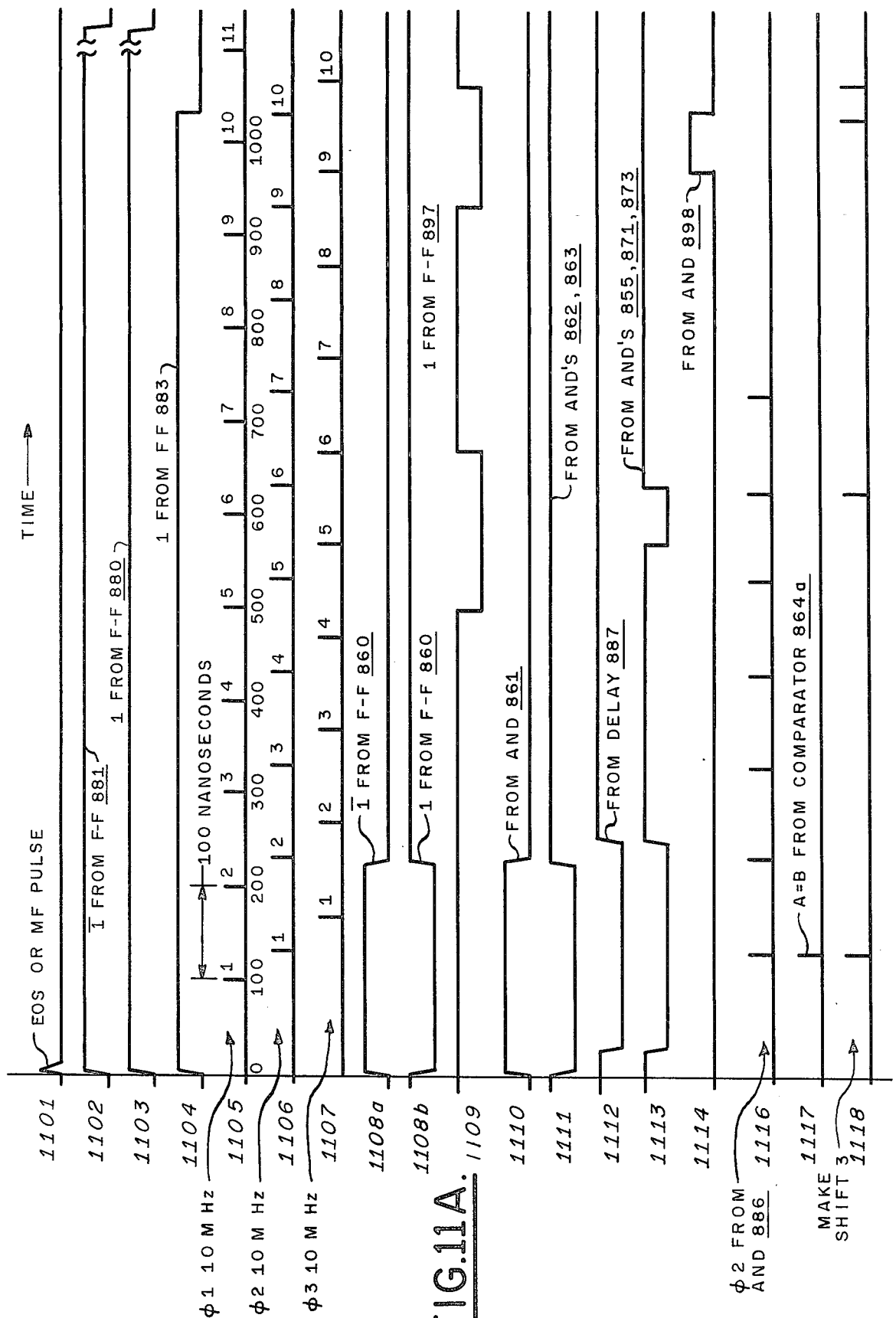

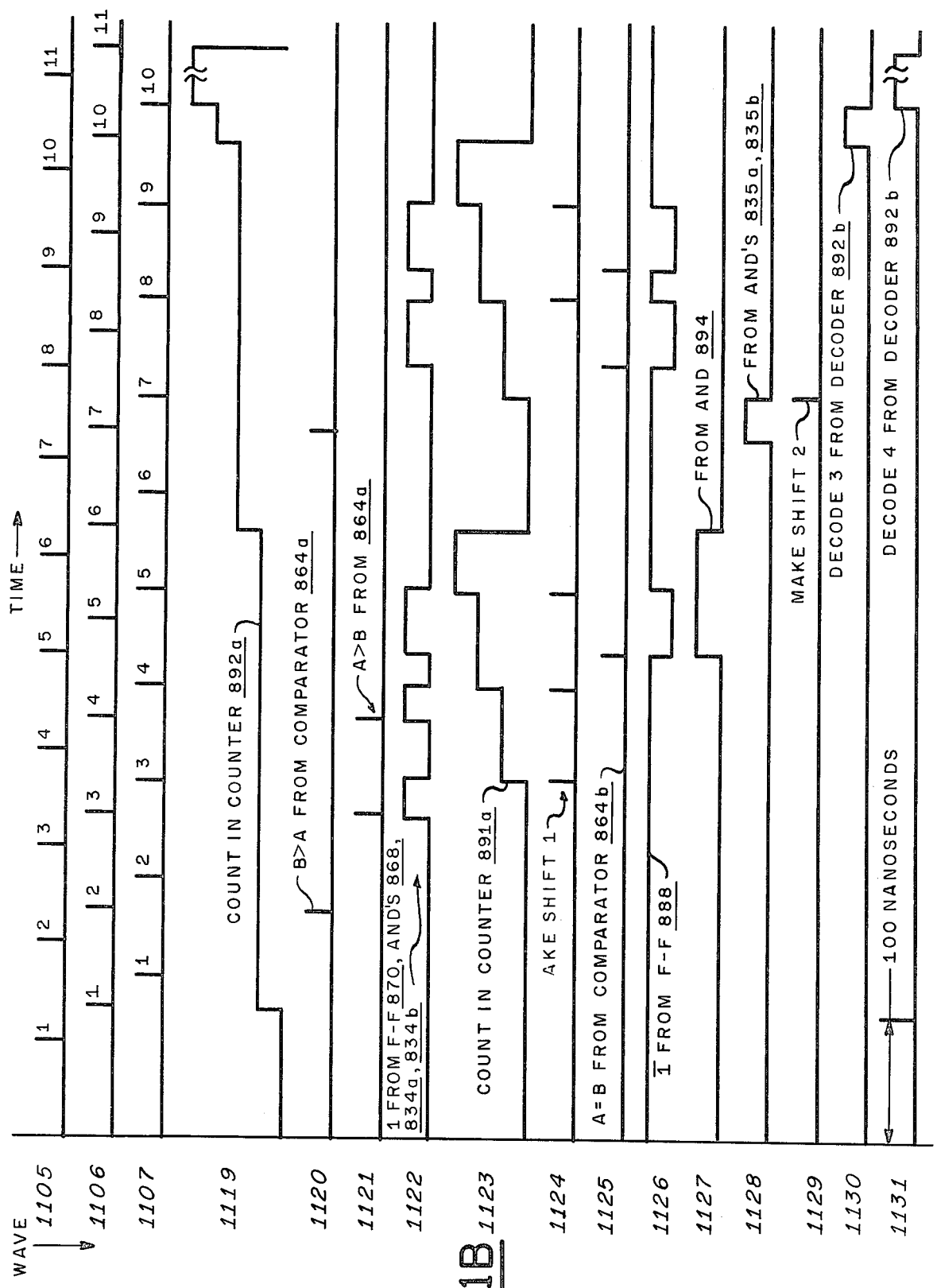

MARINE RADAR INTERROGATOR-TRANSPONDER TARGET DETECTION, IDENTIFICATION, AND RANGE MEASUREMENT SYSTEM

BACKGROUND OF THE INVENTION

1. Field of the Invention

The invention pertains to an integrated radio detection, navigation, and communication system for cooperatively affording safe navigation at sea and more particularly relates to marine radar interrogator-transponder communication systems for use between cooperating vessels or with shore stations, permitting early detection and identification of intruding vessels such as may follow dangerous courses relative to own ship or shore stations.

2. Description of the Prior Art

The literature has dealt extensively with problems associated with safe and efficient navigation in crowded waters of modern marine vessels. For some time, it has been recognized that the annual increase in marine traffic density, in the size and speed of ships, and in their earning power per unit of time has been increasing the need for ship's operators to have complete awareness at all times of the presence of other ships, including small ones, at greater and greater distances from own ship. There has also been a growing need for positive identification of such vessels and for improved methods of navigation and piloting so that marine traffic may move during poor weather conditions and poor visibility, yet with improved safety. Improved flow of information is desired not only between ships, but also between ships and shore installations designed to control vessel traffic with the same goals of increased flow and improved safety. There has long been recognized an increasing need to achieve such goals in an inexpensive manner requiring the use of only a single integrated device on ship board.

In the U.S. Pat. No. 3,806,922 to E. J. Isbister for "Marine Radar Interrogator-Transponder Target Detection, Identification, and Range Measurement System", issued Apr. 23, 1974 and assigned to Sperry Rand Corporation, the merits and shortcomings of shipboard and shore based radar systems for providing these functions have been discussed in some detail. It was observed that radar alone suffers from a number of limitations which must be overcome if the aforementioned goals are to be achieved. One of them lies in the inability of radar to detect other ships, particularly small ones, in inclement weather just when the information is most needed. The radar picture is often cluttered with sea and rain echoes which mask wanted targets. While conventional radar instruments have been of great assistance in ship navigation and in collision avoidance, the typical radar presentation is often difficult to interpret in bad weather.

In the aforementioned Isbister patent, it was recognized that early warning of the presence of an intruding vessel, its identification, and communication with it are requisites for prevention of accidents between vessels, especially in crowded traffic and in the instance of ships having limited maneuverability. Large cargo vessels are slow to respond to applied rudder or to propeller thrust. Such vessels travel large distances before appreciable changes in course or speed can be effected. The greater the tonnage of the vessel or the greater its speed, the greater is that distance. On the other hand, at the reduced speeds often used in heavy traffic, the ship's control may become even less effective. Because of the unwieldy nature of the supership and of the natural desire of all ship masters to keep their ships moving even under conditions of poor visibility, it is necessary particularly in harbors, estuaries, and other narrow waters that traffic move in orderly patterns and follow precise routes. For this to be done safely and successfully, improved means of ship position fixing are necessary.

In the aforementioned Isbister patent, consideration was given to combining features of the conventional marine radar and radio beacon arts in such a way as to overcome their defects, particularly major disadvantages of such systems connected with serious mutual interference situations when large numbers of interrogations are made in the same general time period and eliminating saturating responses generated when a large number of unsynchronized beacon replies obscure the radar or other navigation display, degrading distinguishability of the elements of the display. In general, the more ships found with prior art radar-beacon systems in the vicinity of own ship, the worse these types of clutter became, the adverse situation again resulting just when reliable detection, identification, and communication are most needed by the ship's operator.

The aforementioned Isbister patent, with respect to which the present invention is an improvement, provided an improved radar, interrogator-transponder, navigation and marine piloting equipment of unitary nature affording improved target detection, positive target-identification, and precise range measurement for safe navigation in pilotage waters. The prior invention involved the use of cooperating interrogator-transponders which may be shipborne or may be mounted on fixed obstacles for navigation and collision avoidance purposes. The prior invention is also readily used cooperatively with radar systems of the type conventionally used for marine navigation purposes. The prior Isbister invention overcame many disadvantages inherent in pilotage when using only a conventional marine radar system and additionally is relatively free of susceptibility to mutual interference and other operational problems associated with prior art radar-beacon navigation systems. The prior invention made feasible early target detection, positive target identification, and precision target range measurement under a range of circumstances not provided by prior art radio navigation systems.

SUMMARY OF THE INVENTION

More recently advanced digital processing techniques than employed in the prior Isbister patent have led to an extensive revision of the means for accomplishing functions common to the two inventions, thus providing an improved and novel solution in the present invention of greater reliability and versatility than formerly available. The novel system provides radar target identification in such a way that ships can be selectively called for initiating subsequent communication procedures. It provides valuable enhancement of the primary radar target echo on the radar display. It provides directed or selectively called communication for the automatic and rapid interchange of coded information between ships or between a ship and a shore based station, also providing a means enabling direct ship's radio-telephone communication between operators. Finally, it provides a facility for broadcast communications to all cooperating systems within range, with the source of the broadcast identified on each recipient's radar display.

In addition, the present invention solves remaining problems limiting the effectiveness of the prior Isbister concept in special circumstances. For example, when two marine radar interrogator-transponder systems lie on essentially the same radial azimuth line with respect to own ship, and when their antennas are separated by less than the round trip message length are interrogated, their replies when received at own ship cannot help but overlap in time. The data the replies contain is therefore garbled and, if detected, would normally be dangerously inaccurate.

The traditional solution to this problem for ordinary transponders which reply with only a single very short pulse comparable in length to the interrogating pulse is to delay the replies from each transponder in a random manner. Thus, there is a high probability that both replies will not arrive at own ship's interrogator at precisely the same time. Such traditional solutions are useful only when short pulse transmissions are involved and small errors in range measurements may be tolerated. However, in the present invention, the message pulse burst is relatively very long (for example, 4.6 microseconds or 0.37 nautical miles), and the consequent error is not acceptable. In the present invention, a two-way communication system is inherently involved, so that each replying transponder conveys to the interrogator the specific data defining the delay used in each successive reply in a novel manner. The delays are then removed in a novel manner at the interrogator. The intensifications of the identifications of the replying transponders are then accurately displayed on the radar type P display in their true locations.

Mere use of the random delay concept does not fully solve the problem in special situations. Consider two vicinal vessels whose antennas are separated by somewhat more than a message length. Without random delays, their replies would be received at own ship on each interrogation; when the delay jitter is used, some of the replies will overlap and the data will be garbled. Also, in very dense traffic, impractical levels of jitter are required.

The solution to this further problem is to arrange the interrogator so that it requests replies from only certain vessels per each range scan. This is accomplished by using the same space in the interrogation message that is used in the reply to specify the delay in the reply itself so as to instruct the transponder whether or not to reply. This is not done by operating on individual targets, but by groups of vessels. In order to assure a reasonable certainty of getting a reply from all vessels in range on each antenna scan, the number of groups must be limited. The limit is set by the fact that marine radar systems are designed conventionally to afford a minimum of five hits per any given target per azimuth scan.

According to the present invention, there is transmitted in the interrogation in appropriate places numbers one through five, advancing by one for each subsequent range scan. The injected number sequence cyclically repeats with a period of five. At the remote transponder, the received number is compared to the least significant number in that transponder's current address. Depending upon each successive comparison, different groups of transponders successively reply. In this manner, replies will normally be received from all transponders in ordered succession. Use of the random delay even permits the detection and individual identification of two vicinal transponders that are not only along the same azimuth line, but are found at substantially the same range.

The invention solves additional problems, such as that consequent of the fact that the system, as a matter of convenience, operates with fewer available addresses than the possible number of participating vessels. Accordingly, there is a finite probability that two or more vessels will be found with identical addresses on the same azimuth with respect to own ship. The invention provides means for display of the overused address and for change of one or both of them by radio-telephone communication, since the addresses are not considered to be permanent. On the other hand, it is a feature of the invention that the system itself may cause the desired address change. Such is accomplished by using one of several standard coded message groups as a request for a change of the address. In accord with the standard operating procedure used in the invention, the change of address message is thus sent selectively to the particular group of transponders with the same address. The operators of the receiving systems are alerted upon the receipt of the call, since operator acknowledgement is mandatory. Thus, upon re-interrogation, the interrogating operator receives a response containing the newly selected address.

BRIEF DESCRIPTION OF THE DRAWINGS

FIG. 2 is a block diagram of the control and display system of FIG. 1A.

FIG. 3A is a diagram of typical calls used in operation of the system.

FIGS. 3B, 3C and 3D are graphs of wave forms useful in explaining the operation of the invention.

FIGS. 4A and 4B illustrate in more detail elements of the master transmitting timer, the associated radar video delay, and the master oscillator of FIG. 2 and their electrical interconnections within the invention.

FIGS. 5A and 5B illustrate elements of the master shift register of FIG. 2 and associated circuits and interconnections.

FIGS. 7A, 7B, and 7C are detailed drawings of one embodiment of the received message decoder and range sorter of FIG. 2.

FIGS. 8E and 8F are diagrammatic presentations of signal flow during shift processes in the apparatus of FIGS. 8B, 8C, and 8D.

FIGS. 11A and 11B contain wave form graphs useful in explaining the operation of the display system of FIG. 9.

THE COOPERATIVE SYSTEM

Figure 1A:
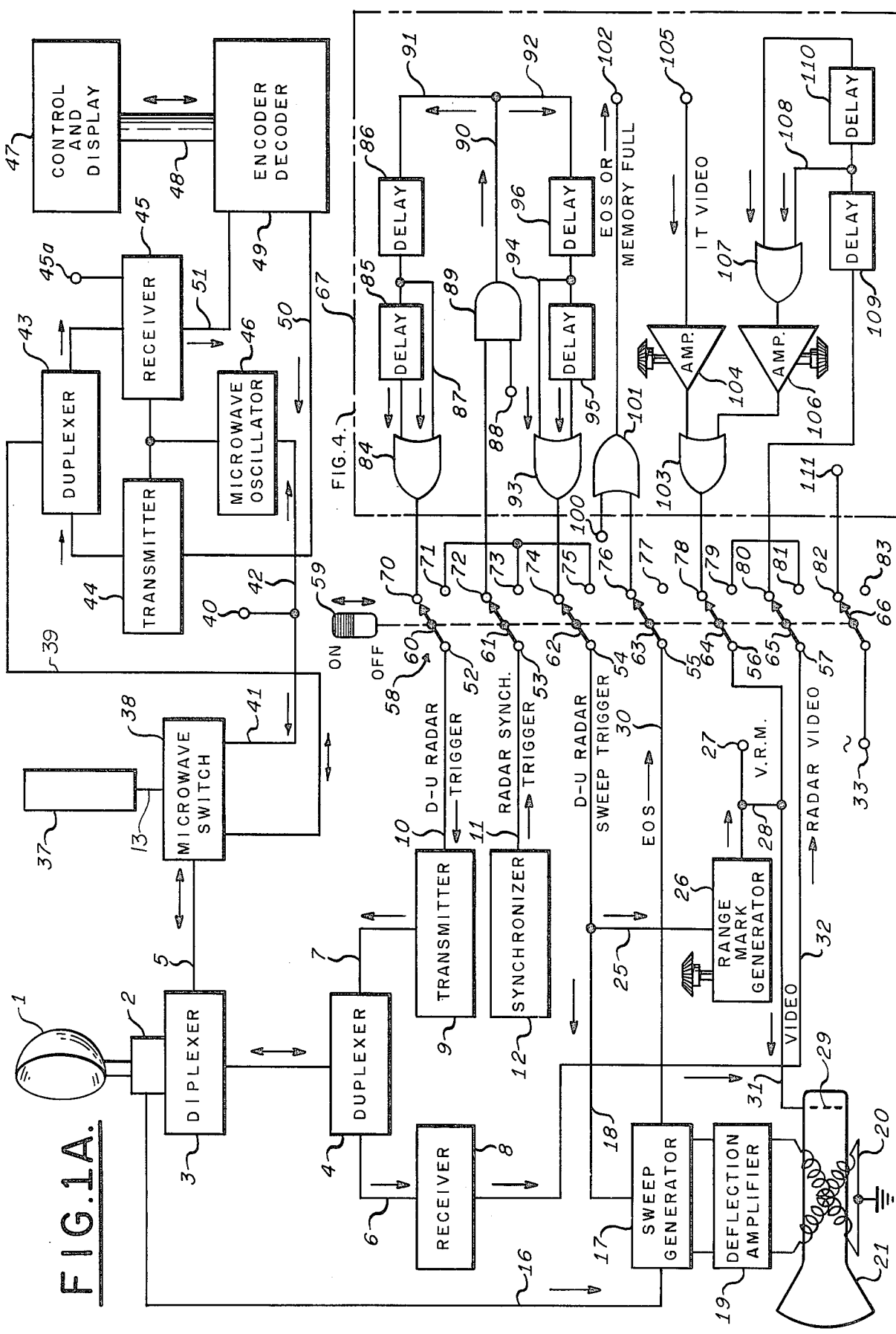
FIG. 1A is a block diagram representing the basic cooperative system of the invention.

A block diagram of the novel interrogator-transponder (I-T) system is shown in the upper right part of FIG. 1A; in providing a general understanding of the invention in its operation alone and in cooperation with the azimuth scanning marine radar system illustrated in block diagram form in the left portion of FIG. 1A, it will be convenient to start with the control and display unit 47. The operator's panel of unit 47 contains necessary switches and numerical displays to enable the operator at least to set up an interrogation message, to make the interrogation, and to display data received in reply, such panel elements being generally illustrated in FIG. 1B. When the novel I-T device is operating in the transponder mode, suitable visual and audible alarms and numerical displays alert the operator in the event a message is received and also display it. Control and display unit 47 is coupled by a multiplicity of electrical leads 48 to the encoder-decoder unit 49, this unit serving to supply any proposed outgoing message in video frequency form via lead 50 to the microwave I-T transmitter 44. Within transmitter 44, the message is used to modulate a carrier frequency signal generated by microwave oscillator 46, which signal is then amplified to a suitable level by I-T transmitter 44 and is coupled through deplexer 43 via transmission line 39 to a conventional microwave switch 38 having two possible inputs 5 and 13. The condition of microwave switch 38 is controlled in a conventional manner by a signal supplied at terminal 40 and over lead 41 from a source yet to be described. For the transponder mode, switch 38 couples transmission line 39 directly to a conventional omnidirectional antenna 37. The same signal source for terminal 40 supplies a signal via lead 42 for determination of the operating frequency of oscillator 46.

When a reply is received by omnidirectional antenna 37, it is directed by switch 38 through duplexer 43 to I-T receiver 45. As in the system of the aforementioned Isbister patent, the replay signal is always on a new microwave carrier whose frequency differs from that of the original outgoing transmission by the intermediate frequency of I-T receiver 45; accordingly, oscillator 46 not only acts to drive I-T transmitter 44, but also serves to supply local oscillator energy to I-T receiver 45.

The received signals are converted within receiver 45 to video signals and are passed via lead 51 to encoder-decoder 49, which device then processes the received message, as will be further described, and presents the information to the operator in the displays of unit 47. As interrogations are always made on own ship on a carrier frequency $f_1$, and replies are always returned at a second carrier frequency $f_2$, where $f_1-f_2$ is the receiver 45 intermediate frequency, the I-T device acts as a true interrogator-transponder.

Of major interest is the operation of the I-T device with a substantially standard marine radar system. In this cooperative application, the I-T apparatus stands by in its transponder mode connected to the omnidirectional antenna 37 and is generally independent of the radar system. However, in its interrogation mode, the I-T transmissions are correlated in time with the pulse transmissions of the radar system; now, the microwave switch 38 is readjusted so that the I-T transmissions are sent and replies are received through the scanning directional radar antenna 1 and radar diplexer 3. The radar transmissions and replies are now directed through a radar duplexer 4, having coupled thereto microwave transmission lines 6, 7. The duplexer, in a conventional manner, directs radar transmission via lead 7 to diplexer 3 and thence to radar antenna 1. It also directs received radar signals from antenna 1 via transmission line 6 to radar receiver 8. When the switch 38 is set to couple the output of the I-T device in its interrogate mode to radar antenna 1, I-T transmissions and replies pass through diplexer 3. Diplexer 3 is a conventional passive device including two or more microwave filters organized to direct radar echo signals to radar duplexer 4 and I-T replies to microwave switch 38 and thence to I-T duplexer 43. So as to prevent the radar transmission from damaging I-T receiver 45, diplexer 3 also inherently attenuates radar carrier signals attempting to flow into the I-T receiver 45.

The marine radar system is preferably of the kind having generally conventional components operating in the usual manner; in addition to duplexer 4 and receiver 8, the radar unit includes a timing synchronizer 12 for controlling the repetition rate of pulsed radar transmitter 9 via leads 10 and 11, a sweep generator 17 using antenna azimuth position data derived via leads 16 from pick off 2, a deflection amplifier system 19, an electron beam deflection yoke 20, and a cathode ray display tube 21. Radar echo signals from the output of radar receiver 8 are coupled by leads 32, 31 in the cooperative mode to the intensifier grid 29 of display tube 21. Sweep generator 17 is also provided in the conventional way with range sweep trigger pulses from the radar synchronizer 12 via leads 11 and 18, producing a type p radar display on cathode ray tube 21. Variable range marker pulses are also supplied in the usual way by coupling sweep trigger from lead 18 via the branching lead 25 to the manually adjustable range mark generator 26. The marker pulses are coupled via leads 28, 31 to the intensifier grid 29 along with video pulses in the usual manner and are also supplied to terminal 27 for purposes yet to be described. As will also be further described, an end-of-sweep pulse EOS is derived in a conventional manner within sweep generator 17 and is coupled to lead 30 and thence to terminal 55.

While the novel I-T system normally stands by as a transponder connected via switch 38 to omnidirectional antenna 37, it may be instantly switched to the radar antenna 1 and is then available to the operator for interrogating or making various calls to other I-T systems standing by in the transponder mode aboard vicinal vessels. When interrogating, the other vessel's positional data derived from the returns from the I-T devices of the other vessels are mixed with own ship's radar video and are displayed on type P indicator 21. The other information exchanged is in digital form, is entered by means of a keyboard 175 (FIG. 2), and is displayed on the I-T control and display panel 47.

CALLS DEFINED

While not limited to use with the particular message items listed in Table 1, the several useful types of calls and replies recited there are of interest:

TABLE 1

| Call | Addressed to | Reply |
|---|---|---|
| EE-Echo Enhancement | All | Automatic |
| ID-Identification | All | Automatic |
| SSI-Selected Supplementary Information | Selected Vessel | Automatic |
| DC-Directed Communication | Selected Vessel | By Operator |
| DCR-Directed Communication Reply | Initiating Vessel | — |
| BI-Broadcast Initiate | All | By Operator |

TABLE 1-continued

| Call | Addressed to | Reply |
|---|---|---|
| BR-Broadcast Reply | Initiating Vessel | — |
| VTSP-Vessel Traffic System Positional | Selected Vessel | — |

The EE call, as its name implies, is designed to enhance the display of the normal radar echo from all ships having an I-T system aboard. A decoded I-T video pulse from a target vessel is displayed on type P indicator 21 in coincidence with the radar echo from that target vessel. As the I-T replies are on a different carrier frequency than the interrogation carrier or the radar carrier, they are free of clutter and have magnitudes independent of target size and much greater than the normal radar echoes from small objects. For this reason, radar clutter may be removed from the display of indicator 21 simply by turning down the radar receiver gain by operating a conventional manual gain control. The amplitude of the target vessel's I-T reply is independent of the vessel's size and is fully automatic.

The ID or identification call is also used by own ship's operator and is designed to yield the identify of a target vessel and to associate that identification with the displayed radar echo of that target vessel. The operator adjusts the range marker position of range marker generator 26 so that it intersects the target of interest as seen on type P display 21; as the scan line on the type P display approaches that target, the operator interrogates its I-T equipment by holding down a key 157 of FIG. 1B, which may be particularly represented by key 228 in FIG. 2. As a result of automatic replies from interrogated I-T systems, a special demarcation will automatically appear on the selected target vessel's echo as seen on display 21, and its address is simultaneously displayed on the I-T control and display unit 47 display panel, as at 155 in FIG. 1B.

The selective supplementary information call SSI permits selective upgrading and renewal of supplementary information from a selected target vessel. It causes a particular demarcation to appear on own ship's type P radar indicator affixed to the target echo of the called or target vessel. The information received is displayed in the supplementary information readout 153 in FIG. 1B. The reply contains the supplementary information and is automatic.

The directed communication call DC permits the operator of own ship (ship A) to make a call selectively to another vessel (ship B); the call will ask a question or will make a statement to the called vessel. Again, a demarcation will be automatically attached to the displayed echo of the called vessel on own ship's display 21. There is an automatic reply showing that the called party's I-T system actually received the message. On the called ship B, the C'GPA and the message will appear in selective read out 149 on the control and display panel 47.

A directed communication reply DCR is an acknowledgment by the operator on the called or target ship B of the receipt of a DC call. As a special demarcation will automatically be attached to the displayed echo of the initiating ship A on the type P display aboard the responding vessel (ship B), it will also identify the source of the DC call.

The broadcast initiate call BI from own ship A announces to all I-T devices within the operating range that an initiating or own ship has a message of probable interest to operators of the neighboring ships. There is no automatic reply from the receiving transponders and no demarcation appears on any of the type P displays. On each ship B receiving ship A's call, the broadcast initiating vessel's address C'GPA and the message appear in read out 147 of FIG. 1B. An alarm is also sounded, alerting the receiving operator to the receipt of the call.

The broadcast reply call BR is a call made by each ship B recipient of a BI or broadcast initiate call, its purpose being to locate on the recipient's radar type P radar indicator the source of the BI call. It is brought to the operator's attention by the appearance of a special demarcation affixed to the display of the broadcast initiating vessel's reply on ship B's type P display. The transmitted message which is the initiating vessel's C'DPA and the supplementary information now appear on ship B's numerical displays 155 and 153, respectively, of the I-T control and display panel 47.

The VTSP call is a reply from a shore based vessel traffic controller to a vessel asking for its own position.

PARTICULARS OF A REPRESENTATIVE E.E. CALL

It will be understood that each call with the exception of the EE and ID calls may in general be made up of two major portions and that the replies will consequently have two major parts. The EE or echo enhancement call is the most used call and, therefore, is a short format call so as to minimize interference problems. The ID call, being a special form of the EE call; is also a short format call. The remaining calls are used in the selective mode, being addressed to a particular, previously identified target vessel. Being radiated in a corresponding particular direction, interference is minimized even though the calls are of relatively long duration or long format calls.

The ID call, as previously noted, is an EE call specially processed after reception at the interrogating I-T device and is used in the primary function of determining the address of a particular I-T device on a target vessel whose reply is only one of many otherwise indistinguishable radar and I-T reply presentations appearing on type P indicator 21. The structure of each fundamental EE call, as a function of message bit number or time when transmitted, is shown in Table 2 and will be further discussed in connection with FIG. 3A. It consists, for example, of a thirteen bit Barker code synchronizing word followed by a mode code for controlling the manner yet to be discussed in which the data is handled both during transmission and reception. The mode code for an EE or ID call might, for instance, be 0001, for a selective supplementary information call 0010, and so on.

Next in the EE call comes the delay word placed, for example, in bit positions 18 through 21. During interrogation, the delay word will appear at different times as binary codes 0001 through 1111, thus representing the decimal numbers one though 15. As will be further described, these delay numbers instruct vicinal transponders whether or not to reply and when. In any one reply, the delay word may have values from one through 15; the reply data will signify which of 15 possible delay values was used in each particular reply, as will be further considered.

TABLE 2

BIT STRUCTURE FOR I-T CALLS
ECHO ENHANCEMENT (EE) CALL OR CONTROL GROUP

| Word | Data | Type | No. of Bits | Bit Pos. in EE Call |
|---|---|---|---|---|
| SYNC | 13 Bit Barker | SPECIAL | 13 | 1–13 |
| MODE | 15 Modes | BINARY | 4 | 14–17 |
| DELAY | 15 Delays | BINARY | 4 | 18–21 |
| C'DPA | 1–999 by 1 | BCD | 12 | 22–33 |
| C'GPA | 1–999 by 1 | BCD | 12 | 34–45 |
| PARITY | — | — | 1 | 46 |

SELECTIVE SUPPLEMENTARY INFORMATION (SSI) CALL

| Word | Data | Type | No. of Bits | Bit Positions | |
|---|---|---|---|---|---|
| SYNC | 13 Bit Barker | SPECIAL | 13 | 1–13 | |
| HEADING | 0–359° by 1° | MODIFIED BCD | 9 | 14–22 | |
| SPEED | 0–99 Kts by 1 Kts | BCD | 8 | 23–30 | |
| SIZE | VS,S,M,L or VL | SPECIAL | 3 | 31–33 | |
| TYPE | Y,P,C,N,T or H | SPECIAL | 3 | 34–36 | |
| CARGO | DANG. OR SAFE | SPECIAL | 2 | 37–38 | |
| DRAFT | 0–99 ft. by 1 ft. | BCD | 8 | 39–46 | |
| MESS | 0–39 Numbers | MODIFIED BCD | 6 | 47–52 | |
| MODE | 15 Modes | BINARY | 4 | 53–56 | Control Group |
| DELAY | 15 Delays | BINARY | 4 | 57–60 | |
| C'DPA | 1–0–by 1 | BCD | 12 | 61–72 | |
| C'GPA | 1–999 by 1 | BCD | 12 | 73–84 | |
| PARITY | — | — | 1 | 85 | |

VTS TO SHIP POSITIONAL INFORMATION CALL

| Word | Data | Type | No. of Bits | Bit Positions | |
|---|---|---|---|---|---|
| SYNC | 13 Bit Barker | SPECIAL | 13 | 1–13 | |
| WP1 | 1–78 Numbers | MODIFIED BCD | 7 | 14–20 | |
| WP2 | 1–78 Numbers | MODIFIED BCD | 7 | 21–27 | |
| DIST. TO WAYPOINT | 0–39.9 N. Miles By 0.9 Miles | MODIFIED BCD | 10 | 28–37 | |
| CROSS COURSE ERROR | 0–9.995 N. Miles By 0.005 Miles | MODIFIED BCD | 13 | 38–50 | |
| C.C.E. DIRECTION | P or S | — | 2 | 51–52 | |
| MODE | 15 Modes | BINARY | 4 | 53–56 | Control Group |
| DELAY | 15 Delays | BINARY | 4 | 57–60 | |
| C'DPA | 1–999 by 1 | VCD | 12 | 61–72 | |
| C'GPA | 1–999 by 1 | BCD | 12 | 73–84 | |
| PARITY | — | — | 1 | 85 | |

After the delay word, the bits representing the called party's address C'DPA appear; the space for it is blank in the outgoing interrogation message from own ship, but the blank is filled in with the C'DPA by each replying transponder and provides the operator on own ship with the desired addresss data for each particular reply. The C'DPA word is transmitted as three binary coded decimal digits giving, for instance, 999 possible addresses and requiring 12 bit positions. The next succeeding word is the calling party's address C'GPA word which, when received at the interrogating I-T device aboard own ship is own ship's address. It is encoded in generally the same way as the C'DPA word; it is returned as received to own-ship's interrogator so that the latter automatically accepts only those replies containing its own address; clutter (fruit) from transponders triggered by other neighboring interrogators is fully eliminated. The EE call is ended by an odd parity bit, as will be further described, making the over-all length of the call in the cited example 46 bits. A representative corresponding time duration of the call is 4.6 microseconds. Table 2 and FIG. 3A also present analogous data, by way of example, showing the structure of a typical SSI call; other calls may be similarly constructed.

The SSI call is a long format call; it again contains a synchronizing word group, but also provides considerable supplementary information with respect to own ship, including variable data on heading and ship's speed, fixed data including ship's size, type, operator-selectable data such as the cargo nature, and draft, a message, the mode code, and C'DPA and C'GPA data, along with a final parity bit. Similarly, the VTS transmission from a shore station will again be a long format message of the directed type and will again have a synchronizing word group, along with mode, C'DPA, C'GPA and parity data. It will contain other information such as the identity of the two harbor or estuary way stations defining the ends of a reach in which the vessel finds itself, cross course error, and cross course direction. Other calls may readily be diagramed by those expert in the art.

TIMING OF THE COOPERATIVE SYSTEM

The heart of the encoder-decoder 49 of FIG. 1A is a master shift register system 203 (FIG. 2) within encoder-decoder 49 which will be discussed later in detail with respect to FIGS. 5A and 5B. In making an interrogation, the message to be sent is set up partly manually by the operator using data keys 176, keyboard 177, and mode keys 178 and partly automatically, and is stored in 13 elements, for example, of master shift register system 203. When interrogate key 228 of FIG. 2 is pushed, the message is shifted from the output end of master shift register system 203 of encoder-decoder 49 via lead 50 into transmitter 44 (FIG. 1A). When there is a reply and the synchronizing word of the incoming message is successfully decoded within encoder-decoder 49, the incoming message is shifted into the opposite or input end of the master shift register system 203 of encoder-decoder 49 via lead 51 and is automatically processed as directed by the character of the mode code.

Two distinct kinds of timing are applied in the radar system relative to the timing characteristic of the novel I-T device, and these timing relations are produced by the several symbolic delay channels seen in the lower right part of FIG. 1A in the dotted box 67 which are actually parts of encoder-decoder 49. The timing and delay regime in control depends upon how the multiple blade, multi-pole double throw switch 58 is set by control 59. When the I-T device is not operating, switch blades 60 through 66 are in low positions opposite to those shown in FIG. 1A, and they connect to the respective terminals 71, 73, 75, 77, 79, 81 and 83. In this case, the undelayed radar synchronizer trigger is conducted by lead 11 through switch blade 61, terminals 73 and 71, switch blade 60, and lead 10 to transmitter 9. The undelayed radar synchronizer trigger is also coupled from blade 61 through terminals 73 and 75, blade 62, and lead 18 to control sweep generator 17, where it initiates the start of each range sweep and through lead 25 to range mark generator 26. The down position of switch blades 60 through 66 also permits signals output by radar receiver 8 to be coupled without delay by lead 32 through blade 65, terminals 81, 79, blade 64 and lead 31 to intensifier grid 29 of indicator 21. In other words, the radar system is simply connected and timed as would be an ordinary marine radar system in the absence of any I-T device.

Figure 3B:
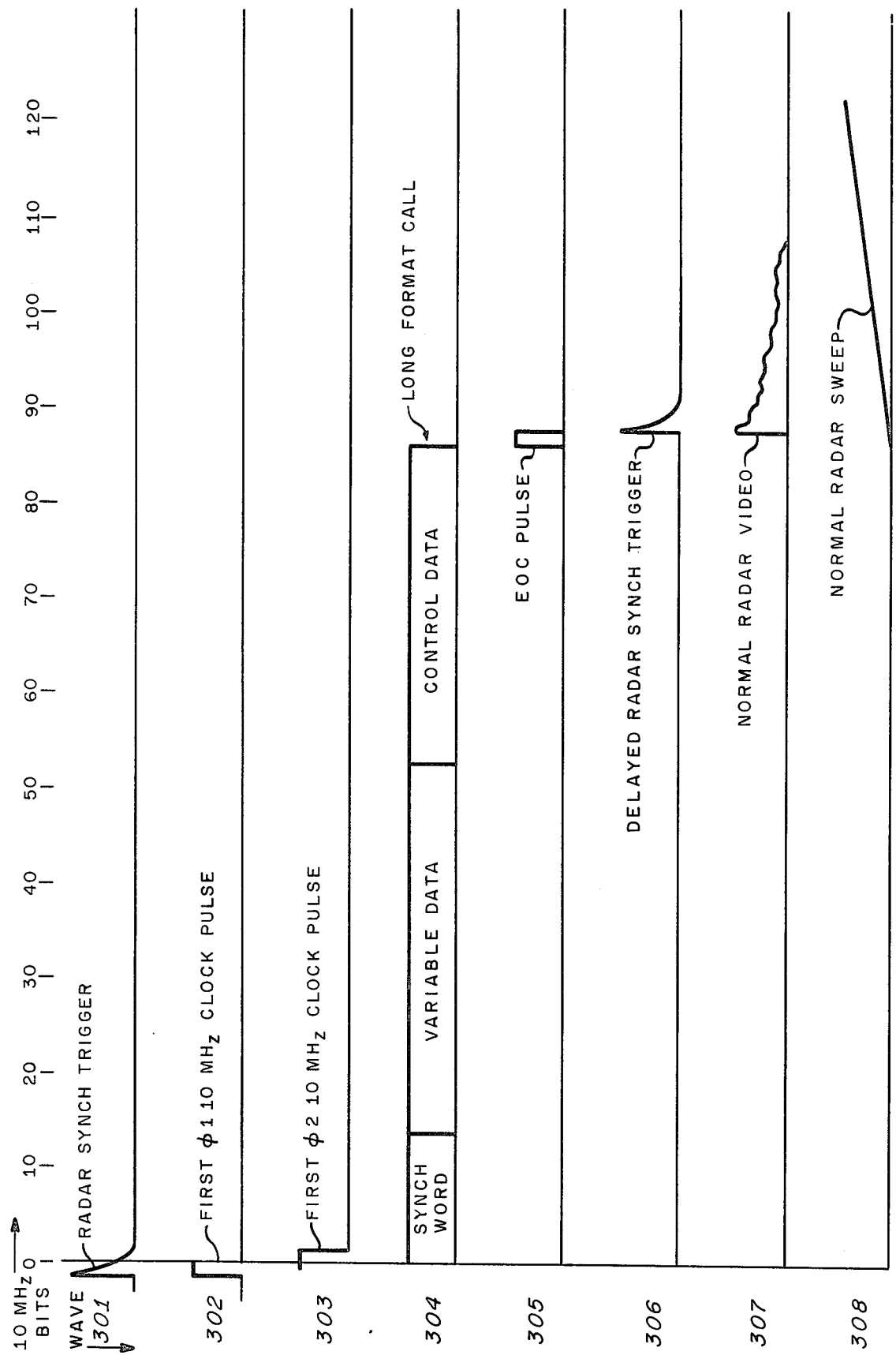

As will be seen in FIG. 3B, a new timing relation is established when the I-T device is to operate in cooperation with the radar because the novel I-T device must transmit its own message before the radar transmits. For this purpose, switch 58 is placed in the ON position as shown in FIG. 1A, the switch blades now contacting respective terminals 70, 72, 74, 76, 78, 80 and 82. In particular, power is supplied to the I-T device via switch blade 66 and terminal 111. With switch 58 on, the undelayed radar synchronizer trigger is passed from blade 61 and through terminal 72 to one input of AND gate 89. The second input 88 of AND gate 89 is supplied with 160 MHz clock pulses of a first phase (01) from a clock oscillator 222 found in FIG. 2. The very next 01 160 MHz clock pulse is thus allowed to pass through AND gate 89. For a short format call, as will be further described, the selected 01 160 MHz clock pulse passes through leads 90, 91 and is delayed in a first delay element 86 and is then coupled directly via lead 87 to one input of OR gate 84. On the other hand, for a long format call, it may pass from the output of delay element 86 through a second delay element 85 and then into a second input of OR gate 84. The actual form of the delay and the route taken depends upon control elements and internal switching yet to be described in relation to FIG. 2 and other figures and primarily depends upon whether the I-T device is to operate in the short format (SF) EE mode or in the long format (LF) mode. In either event, a selected once-delayed or twice-delayed radar synchronizer pulse then passes through OR gate 84, terminal 70, blade 60, and lead 10 to trigger the radar transmitter 9. It will be understood that the specific nature of delay elements 85 and 86 of unit 67 and of the other delays discussed in this section remain to be described.

Still with reference to FIG. 1A, and when switch 58 is in its on position, the radar synchronizing trigger pulse passing through switch blade 61 to AND gate 89 permits the first arriving 01 clock pulse to traverse leads 90, 92 and delay element 96 and to flow along lead 94 directly to a first input of OR gate 93. The pulse may alternatively pass through both of the serially connected delay elements 96 and 95 to arrive at a second input of OR gate 93. In any event, the selected once-delayed or twice-delayed 01 clock pulse ultimately flows through terminal 74, switch blade 62, and lead 18, whereupon it reaches sweep generator 17 as a once- or twice-delayed sweep trigger to initiate the sweep wave formed therein.

With switch 58 in its on position, the radar echo signals also pass in a generally analogous manner as video frequency signals through switch blade 65 to terminal 80 and thence through delay element 109 directly via lead 108 to a first input of a conventional analog OR gate 107. Alternatively, the video frequency pulses may pass through the two serially connected delay elements 109, 110 to the second input of OR gate 107 in dependence upon how the delay elements are controlled, as will be described. After amplification in the adjustable analog amplifier 106, the once- or twice-delayed video signals pass to a first input of the conventional analog OR gate 103. I-T video pulses from terminal 105, after amplification in adjustable analog amplifier 104, are mixed by OR gate 103, whereby the output of OR gate 103 is coupled through terminal 78, switch blade 64, and lead 31 to intensifier grid 29 of type P cathode ray indicator 21 along with range markers found on lead 28. It will be understood that the actual structures of the several delay channels associated with switch 58 are part of encoder-decoder 49 and will be further discussed with respect to FIG. 2 and elsewhere. They are described only in a general manner in this section for the purpose of providing a broad understanding of their functions.

To complete the description of FIG. 1A, it should be observed that the end of sweep pulse EOS from sweep generator 17 is coupled only in the on position of switch 58 by blade 63 to terminal 76 and thence without delay to one input of OR gate 101 for supply to terminal 102 for purposes yet to be described. The second input terminal 100 of OR gate 101 is supplied with a memory-full pulse whose nature remains to be described.

THE I-T ENCODER-DECODER AND ITS CONTROL AND DISPLAY

FIG. 2 presents the general structure of the encoder-decoder 49 of FIG. 1A, its delay section 67, and its control and display 47 in block form so that the locations of apparatus of figures yet to be described may be identified and so as further to advance understanding of the novel I-T system. FIG. 2 illustrates a conventional manual input device 175 containing key groups 176, 177 and 178 found in keyboard 175 by means of which the operator may enter instructions or data to be transmitted into the system, as for use in making calls. This data is shifted into an outgoing interrogation data storage unit 202 and may be simultaneously displayed to the operator, if desired, by suitable conventional alphanumerical or other displays in the display 201 for outgoing transmitted data. As previously noted, the master shift register 203 system is the heart of the encoder-decoder 49 and at the appropriate times receives data stored in the conventional data storage unit 202 for transmission over lead 50 in video from to the I-T transmitter 44.

In this function, master shift register system 203 is under the control of the master transmitter timer 221 which provides clear, read, and shift pulses to master shift register system 203 and is further controlled via lead 240 by 160 MHz master oscillator 222. The keyboard 175, outgoing interrogation data storage unit 202, the display 201, and the details of the master shift register system 203 will be further discussed with respect to FIGS. 5A and 5B. It should be observed here that what is called the master transmitter timer 221 of FIG. 2 includes the multiple delay channels of the lower right part of FIG. 1A for generating outputs at terminals 56, 52, 54 and having inputs on terminals 57, 53 and 27. Key 228 is a representative key that causes interrogation of the I-T system when depressed for connecting the positive supply at terminal 229 to timer 221. The master transmitting timer 221 and master oscillator 222, along with radar video delay 220, form a unit that will be discussed particularly with reference to FIGS. 4A and 4B.

The master shift register system 203 plays a significant role also with respect to received I-T video signals, these signals being ultimately coupled to terminal 242 from the I-T receiver 45 and thence via switch 245 and lead 51 of FIG. 2 to the input side of master shift register system 203. The received I-T video signals are first coupled to switch 245, whose output is coupled to synchronizing word decoder 243 or by lead 51 to master shift register 203. Lead 246 from the master receiving timer 244 carries signals that determine the state of conductivity of switch 245. Master receiving timer 244 receives signals from the synchronizing word decoder 243 and via lead 241 from master oscillator 222. The master receiving timer 244 supplies and receives certain signals from the received message decoder 205, including test and valid message recognition signals and supplies clear, read, and shift signals to the master shift register system 203. Data flows to and from the received message decoder 205 with respect to the master shift register system 203. The synchronizing word decoder 243, the master receiving timer 244, which is controlled via lead 241 also by master oscillator 222, and the received message decoder 205 will be further described with respect to FIGS. 6A, 6B, 6C, 6D.

The received message decoder 205 of FIG. 2 also supplies signals representing target range and address data to range sorter 207. So does the master receiving timer 244 in the form of control signals and a range count. The range sorter 207 is shown in one form in FIGS. 7A, 7B, 7C, and will be discussed in another form with respect to FIGS. 8A, 8B, 8C, 8D. Range sorter 207 also requires a radar range marker signal VRM from the radar system supplied via terminal 27 of FIG. 1A, as well as the radar end-of-sweep signal from terminal 102 of FIG. 1A. Unit 206 is supplied with data and control signals from both the received message decoder 205 and the range sorter 207 and is to be described in detail with respect to FIGS. 8A, 8B, 8C, 8D; it acts to store and to display incoming data to the operator.

THE CONTROL AND DISPLAY PANEL

Figure 1B:
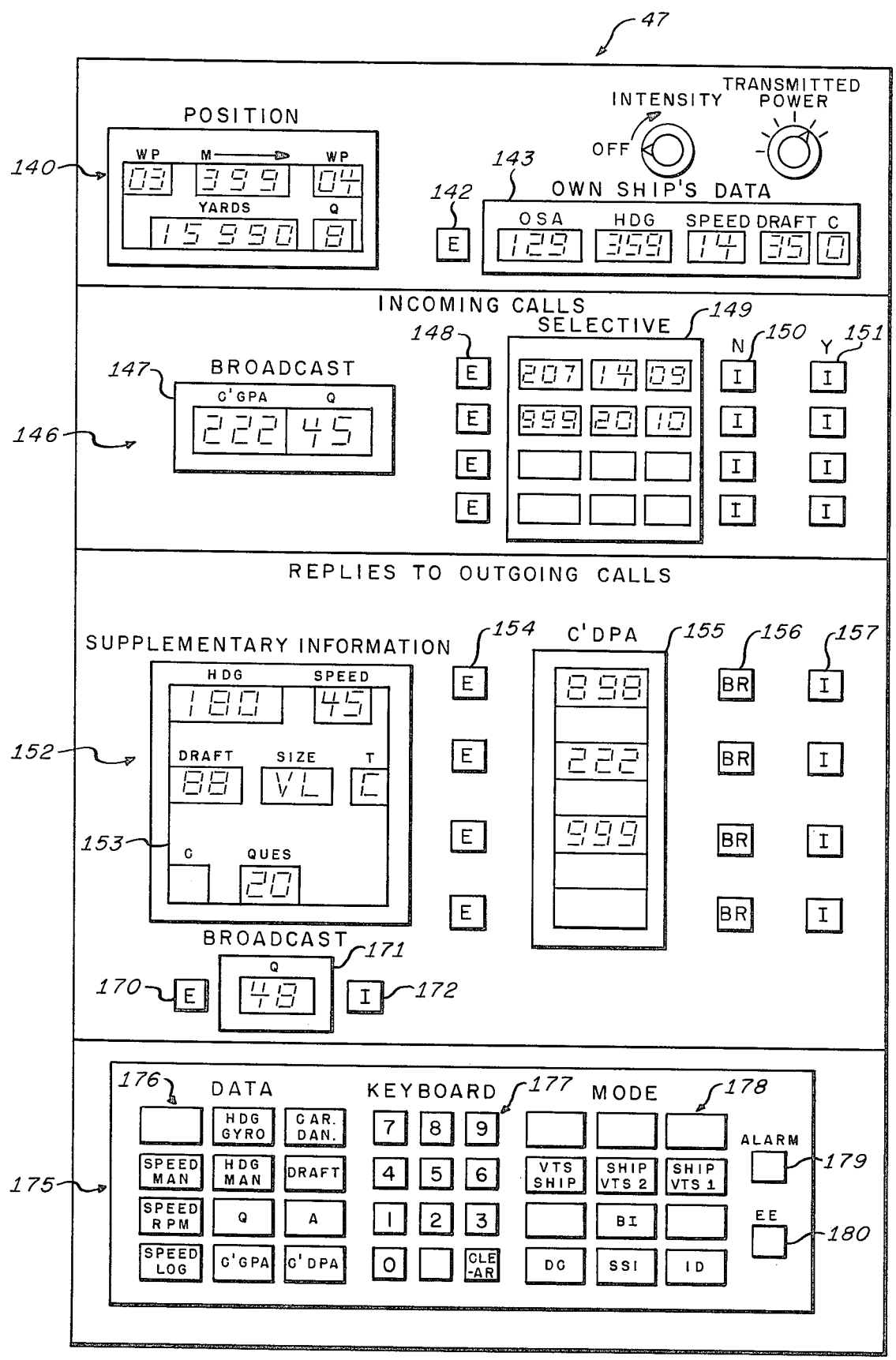
FIG. 1B is a view of the control and display panel of FIG. 1A.

With respect to understanding the operating features of the control and display panel 47 of FIG. 1A, its general appearance is illustrated in FIG. 1B. The various data entry keys are located in section 175 and are divided into three groups 176, 177 and 178. The leftward group 176 determines which readout will display numerical data subsequently keyed into the conventional keyboard 177 by the operator. The right key group 178, titled mode, determines which type of call the I-T system is to make upon transmission. The interrogate (I) button 180 is used to make EE calls and corresponds to key 228 of FIG. 2, as will be explained in connection with FIG. 4B. Above key 180 is an alarm (S) button 179 which may be used to silence any audible alarm energized by an incoming call, as is accomplished by key 924 in FIG. 9, for example.

Above the data entry key section 175 are readout sections 140, 146 and 152 with their associated enter (E) and interrogate (I) buttons. For example, a group 143 of readouts of own ship's data appears in the right side of section 140; these displays show the data that make up own ship's address and supplementary information (SI) about own ship, data that is transmitted automatically by own ship's I-T system in response to incoming ID or SSI calls. The E button 142 to the left of display 143 is used in manually entering the data.

The complete set of own ship's data in display 143 consists of own ship's address, heading, speed, draft and the safe or unsafe nature of the cargo. Ship's size and type, being permanent, are not displayed, and are instead permanently wired into the system. Data may be automatically or manually entered, such as ship's speed, which may be manually entered or automatically provided from the ship's log.

Above keyboard section 175 is a group 152 of displays for outgoing calls and E, BR, and I keys that are used in making ID, SSI, DCR, and BR calls and in receiving their replies, as will be further described. In an outgoing BI call, the operator-selected message appears in readout 171. In a similar manner, section 146 of the display includes readouts and keys for use in handling incoming calls. For incoming broadcast calls, the display 147 is used.

GENERAL OPERATION

Assume that operation is limited, merely for example, to two spaced ships A and B, each of which is equipped with identical apparatus as has been discussed with respect to FIGS. 1A, 1B and 2, and assume that ship A is to interrogate ship B. To make such an interrogation and to receive a reply, four primary events are required:

1. on ship A, the operator sets up the calling message and transmits it,
2. the call is received at ship B; for the types of calls requiring such treatment, the received data is stored and displayed and may operate an alarm,
3. the apparatus at ship B automatically generates a reply call and transmits it, and
4. the reply is received at ship A, the incoming data is stored, and the data is displayed.

When the primary power switch 66 is closed and the I-T device is operating, the master oscillator 222 supplies a steady flow of 160 MHz clock pulses to master transmitting timer 221 and also to the master receiving timer 244.

As has been noted, the I-T device for ship A is timed in part with respect to the radar systm by the radar trigger supplied by radar synchronizer 12. As time must be allowed for the transmission of the interrogation message or call before the radar itself transmits, the synchronizer 12 is disconnected from its normal direct connection to the radar transmitter 9, and its output is passed from terminal 53 through the delay system 67 of FIG. 1A located within the master transmitting timer 221, where it is delayed appropriately, and is then returned to terminl 52 as the delayed radar trigger. Now, in the transponder mode, the I-T device aboard ship B will not reply until after the entirety of ship A's call has been received and the radar signal of ship A has been reflected from ship B. The entire reply is then received at ship A for display on ship A's type P indicator 21;

thus, the received radar video at ship A and the radar range sweep trigger must also be delayed an appropriate amount. This is done so that the radar reply and the I-T replay are displayed at ship A coincidentally in time and at the correct range in the type P display.

The radar video delay device 220, represented in a general way in FIG. 1A in part by elements 109, 110, 107, 106 and 103, includes a shift register of appropriate length through which the received radar video signals are passed, being shifted at an appropriate rate by 10 MHz clock pulses from master transmitting timer 221. The properly delayed radar video signals thus appear on terminal 56. The appropriate delayed radar transmitter and sweep trigger pulses are also generated within timer 221. The radar synchronizer trigger, sweep trigger and video delay circuit parts of timer 221 operate continuously whenever switch 66 is closed and the I-T device is operating.

When the operator on ship A wishes to make an interrogation, such as an EE call, he presses EE key 180. If he wishes to make a long format call, he uses the keyboard section 175 to enter the type of call and, if he wants to ask a question, to enter the question into outgoing interrogation data storage 202. The called party's (ship B) address and the question are displayed on ship A's display 201, as in read outs 155 and 153, respectively, in section 152 of FIG. 1B. The display 201 for outgoing data also displays own ship's address and other supplementary information concerning own ship A, as in read out group 143 of section 140 of FIG. 1B, such as information supplied manually or automatically from sensors such as a gyrocompass heading pick off (not shown).

To transmit the foregoing interrogation, the operator at ship A, for an EE call, holds down key 180 or for any long format call, holds down a key such as key 157 or 228. This action automatically switches the microwave output of the I-T device from the omnidirectional antenna 37 to radar antenna 1 and shifts the carrier frequency generated by microwave oscillator 46 to the interrogating frequency, which is higher by the intermediate frequency than the transponding ship B reply frequency. The carrier frequency output of microwave oscillator 46 is therefore also used as the local oscillator frequency input to the mixer of receiver 45. The very next radar synchronizer trigger pulse to arrive via terminal 53 causes master transmitting timer 221 to clear the main shift register 203. Then, the data stored in the outgoing interrogation data storage device 202 is read into master shift register 203. In addition, it starts the flow of the correct number of 10 MHz clock pulses derived from the 160 MHz pulses in timer 221 to shift the call now stored in master shift register 203 via lead 50 into the I-T transmitter 44 for radiation at the interrogating frequency via antenna 1.

When the correct number of 10 MHz clock pulses for the type of message to be transmitted has been generated by master transmitting timer 221, the flow of 10 MHz clock pulses stops. The I-T receiver 45 remains coupled to radar antenna 1 and the I-T transmitting and receiving local oscillator frequencies remain the same. The I-T receiver 45 is unblocked and its output is switched so that any incoming video signals generated in receiver 45 are connected via terminal 242 to synchronizing word decoder 243 via switch 245, leaving the I-T device ready to receive the reply to its call.

The call transmitted by ship A will, as noted, be received by an I-T device standing by in its normal or transponder mode, such as that aboard ship B. In this mode, the I-T device on ship B is connected to its omnidirectional antenna 37, its microwave oscillator 46 is generating the transponding or reply frequency, its receiver 45 is unblocked, and it is thus ready for receipt of any incoming call, such as ship A's call. When the ship A call is received on ship B, the video output of its receiver 45 will be coupled into its synchronizing word decoder 243 via switch 245. When decoder 243 detects the synchronizing word in ship A's incoming message, the decoder will cause switch 245 to switch the rest of the incoming video signals to the input lead 51 of master shift register 203 and will start the master receiving timer 244. This latter event causes 10 MHz clock pulses derived in receiving timer 244 from the 160 MHz clock pulses from oscillator 222 to shift the remainder of the incoming call video signals into the main shift register 203.

When pulse thirty three of the 10 MHz clock pulses arrives, a test pulse passes from master receiving timer 244 to the received message decoder 205. Circuit 205 tests to determine the receipt of an EE call at that time. If an EE call is detected, an appropriate reply is processed. If the incoming call at ship B is not an EE call, the count continues and when pulse 85 arrives, a second test pulse is supplied by master receiving timer 244 again to test circuits within received message decoder 205, as will be further described. The test circuits within decoder 205 test for the presence of a long format call which must, among other things, contain ship B's address. If the incoming message does contain ship B's address, receipt is indicated of a valid long format message addressed to ship B and an appropriate reply is processed. If the incoming message fails the test at pulse 85, the incoming video from terminal 242 is, at pulse 86, turned by switch 245 back into the synchronizing word decoder 243 and ship B's I-T device is otherwise readied for the receipt of the next call. If the attention of ship B's operator to the receipt of the call is necessary, the appropriate received data is displayed in storage and display 206 for incoming data, where an alarm may be activated, if desired. If a valid EE or long format call has been received, a valid-message-received signal will flow to master receiver timer 244; timer 244 will then prepare to make an appropriate reply to the interrogation, which is the third function of the I-T device.

Except in the receipt of a broadcast initiate call, automatic replies will always be made by ship B's I-T device. A control output of received message decoder 205 will connect the appropriate elements of outgoing interrogation data storage 202 to the corresponding segments of master shift register 203; the next following read pulse from master receiving timer 244 reads them into the master shift register 203. After a standard delay, the master receiving timer 244 sends the correct number of 10 MHz clock pulses to the master shift register system 203, shifting the reply message to the I-T transmitter for radiation via omniazimuthal antenna 37 and on the transponding or reply frequency back toward ship A's interrogating I-T device.

If the call coming into the ship B's I-T device was an EE call, the reply action will be the same as for a long format call, except that the standard delay will be additionally lengthened in a pseudo-random manner for purposes to be described in further detail. A message group is placed in the reply indicating the instantaneous value of the inserted delay. At the end of either an EE or long format reply from ship B, the video output of its receiver is switched from terminal 242 back to the synchronizing word decoder 243 and operation of the master receiving timer 244 is stopped. The I-T device is left connected to omnidirectional antenna 37, with the microwave oscillator 46 and the receiving and transmitting carrier frequencies remaining adjusted for the receipt of future incoming calls. Accordingly, the third or automatic function of ship B's apparatus is accomplished.

During this course of events, the interrogate button 228 on ship A is still being held down, awaiting the reply to the call (in the case of an EE call, replies are awaited). In other words, ship A's I-T system is ready to perform the fourth function of receipt of a reply. The output of the ship A I-T device is still connected to radar antenna 1, its receiver 45 is tuned to perform the receipt of the reply, and antenna 1 has not yet moved off the replying transponder antenna 37. In the usual instance, five or more interrogations will be made and corresponding replies received in the time that it takes radar antenna 1 to sweep through the line of sight to ship B's transponder.

As previously noted, ship A's receiver output is connected to the synchronizing word decoder 243 when the ship B reply is expected. When decoder 243 recognizes a synchronizing word, it starts the master receiving timer 244 and switches the incoming video through switch 245 to the input of master shift register system 203. Accordingly, master receiving timer 244 causes the appropriate tests to be made at the appropriate time for EE or long format calls. In the present situation, the expected type of reply is known, so that only tests for that expected type need be made. Own ship's address (the address of ship A) is always included in replies to an interrogation and is thus always tested for, even when receiving EE replies. In this manner, only those replies addressed to ship A's interrogator are accepted and the display of signals from other transponder replies stimulated by other interrogators is eliminated from the type P display 21.

Accordingly, when ship A is receiving EE replies, and an EE reply which is not addressed to ship A is received at the count of 33 and which is therefore not a valid reply, the master receiving timer 244, at the count of 34 will, via lead 246, operate switch 245 so that the receiver video is passed back into the synchronizing word decoder 243. These elements will then simply await the arrival of the next incoming synchronizing word.

On the other hand, if a valid EE reply is actually received, the amount of additional random change in range (or random delay in time) used aboard ship B in making that reply, as read from the incoming message data, is subtracted from the measured range and the resultant true range between ships A and B is stored in the range sorter 207. In the EE mode, when there are several ships in line within the pattern of antenna 1, a reply is received from each such ship and will be stored in a memory within range sorter 207. However, the random delay feature inherently causes the range data to be stored randomly and often not in the order of increasing range as is required for display during the next range sweep of display 21. A sorting of the randomly stored order is therefore carried out within range sorter 207. Circuits yet to be described within range sorter 207 also take care of identifying the addresses of two targets detected at the same range or two targets with the same address detected at the same or different ranges. When either type of detection is made, an alarm is activated and the addresses are displayed by display 146.

A key use of the novel I-T system is to identify a particular target representation on the cathode ray indicator 21 of, say, ship A so that communication can be established with the corresponding I-T system of, say, ship B either via ship A's I-T system or by voice radio without any doubt that such correspondence has been correctly established. In replying to each EE call, each interrogated I-T device will include its own address in its reply, and these addresses are stored along with their corresponding range data in range sorter 207.

To identify a particular target representation on display 21, the ship A operator sets the mark from his variable range mark generator 26 at a range value just slightly less than the range of the target representation of interest. The pulse that forms the selected range mark on indicator 21 is also transferred via lead 27 to the I-T range sorter 207, where it operates as a range gate. The address of a target whose range falls within the selected range gate is then transferred for display by the storage and display 206 for incoming data. As previously noted, azimuth gating of the desired target is accomplished by the operator by pressing interrogate key 228 as the radar scan line on type P indicator 21 passes the selected target representation. Whenever a selected target falls within the range gate, a short radial line is drawn outwardly on the screen of indicator 21, starting at the target location. As this event happens only when the pattern of antenna 1 passes through the target, the operator can see on the type P indicator 21 that the proper target has indeed been identified.

In receiving an expected reply at ship A to a long format call, which is always directed to a particular address, the checking process is similar and the called party's address C'DPA as well as own ship's address is checked, thus assuring that the reply came from the addressed I-T device. There is no pseudo-random range delay process associated with long format calls. Thus, when an expected reply is recognized by received message decoder 205, the received data are immediately passed to storage and display 206 for incoming data. The data is stored and displayed there until the operator selectively erases the stored data. When the expected reply is received, master receiver timer 244 operates switch 245 to switch the output of the I-T receiver 45 back to the synchronizing word decoder 243 and stops operation, remaining in its interrogating standby status until the next selected radar synchronizer trigger causes the entire process to repeat.

The foregoing operations repeat with each succeeding selected delayed radar trigger from synchronizer 12 as long as the operator holds down interrogate button 228. When he releases button 228, master transmitter timer 221 switches the I-T transmitter 44 and receiver 45 from radar antenna 1 to omnidirectional antenna 37 and switches microwave oscillator 46 back to the transponding frequency. Receiver 45 is also unblocked via terminal 45a and its output is coupled to synchronizing word decoder 243. The I-T apparatus is then in standby condition in its transponder mode ready to answer any valid incoming call.

When operating in the directed EE mode, the numbers one through five are sequentially inserted in each interrogation into the appropriate location in the call by master transmitter timer 221; in this mode, the received message decoder 205 is programmed to compare the numbers in an incoming call with the least significant digit of its own address. If the received number is one, the I-T device will answer only if its least significant address digit is zero or one. If the received number is two, the I-T device will answer only if its least significant digit is two or three, and so on, until the received number is five, when the I-T device will answer only if its lowest significant digit is eight or nine. In this manner, as there are always at least five hits per target in each radar scan, all vicinal I-T devices are interrogated at least once in each scan. However, if traffice is dense, never more than 20 per cent of the targets will actually reply on any one sweep of antenna 1, thereby providing adequate time for the processing of the replies.

MASTER TRANSMITTING TIMER AND CONTROL

To explain the details of the structure and operation of the master transmitting timer 221, the associated radar delay 220, and master 160 MHz oscillator 222 of FIG. 2, reference may be had to FIGS. 3B, 3C, 3D, 4A and 4B.

With respect to FIG. 3A, it illustrates the fundamental bit structure of the three calls used by the invention. There are two calls having two different lengths. One is the EE short format calls made up of 46 bits and the other is the long format call which adds 39 bits to the EE call. The 39 bits represent variable data and are used to transmit supplemental information. The bits of the variable data group may have different formats within the scope of the present invention. By way of example, one such group is the supplementary information group, while another is the shore or VTS-to-ship position information group. FIGS. 3B, 3C, and 3D show the master timing relationships of the two types of calls and their replies, by way of example.

In order for the I-T replies that are displayed on type P indicator 21 to coincide in range with the normal radar echoes of the same target, operation of the I-T device and the radar system must be controlled by the same synchronizing trigger. As shown in wave forms 301 through 306 of FIG. 3B, the I-T transmitter 44 must transmit before the radar system transmits. Wave forms 310, 311, 312 and 313 of FIG. 3C show that the entire I-T reply must be received before it can be decoded and displayed. Therefore, the start of the radar range sweep and the radar video must be delayed by a matching amount. As has been discussed, it is convenient to disconnect the radar synchronizer pulse from its normal input to radar transmitter 9 and to delay it by the proper amount in the I-T device, and then to return it to the radar transmitter.

The selection of the desired zero delay or the finite delay is aided by the switching system symbolically represented in association with the ganged manual switch 58. It will be understood by those skilled in the art that the functions of switch 58 will normally be carried out by a plurality of relays or other switches appropriately located at corresponding signal sources in the system. As seen in FIG. 1A, switch 58 is in its on position; in this position, terminals 53 and 72 are connected by blade 61 so that the undelayed radar synchronizer trigger pulse 301 on lead 11 may pass from terminal 53 to the clock terminal of the conventional flip flop 477 in FIG. 4B. As the set terminal of flip flop 477 is permanently wired to a source of positive voltage, the leading edge of the undelayed radar synchronizer pulse 301 sets flip flop 477. The now-high, one output of flip flop 477 enables AND gate 476, permitting the very next pulse from 160 MHz oscillator 222 to pass through AND gate 476. As the pulse outputs from AND gate 476, it is fed back via lead 408 to reset flip flop 477. The now-low one output of flip flop 477 inhibits AND gate 476, preventing the flow of additional 160 MHz clock pulses from oscillator 222 from passing, even though the undelayed radar synchronizer pulse from terminal 53 may still be present at the clock terminal of flip flop 477. For purposes yet to be described, $\phi 1$ and 100 2 signals from 160 MHz oscillator 222 are respectively supplied via terminals 478 and 480 for use in the apparatus of FIG. 6C. When there is a selected pulse at the output of AND gate 476, it resets flip flop 477, it follows lead 408 to the set terminal of flip flop 404 and lead 460 to clear the divider 470 and also to the clear terminal of the conventional counter-decoder 440, it follows lead 408 to an input of AND gate 482 which controls flip flop 481, and it follows lead 465 to the set terminal of flip flop 464. Thus, the divide-by-16 circuit 470, counter-decoder 440, and binary range counter 407 are zeroes and synchronized in a jitter-free manner by a particular selected 160 MHz pulse from oscillator 222. This establishes the time zero or reference time for all further transmitter-receiver wave froms, as shown in FIG. 3B, and for range measurement. The continuing flow of 160 MHz pulses from oscillator 222 causes divider 470 to produce a continuing flow of $\phi 1$ and $\phi 2$ 10 MHz clock pulse at one set of its output leads 411 and 410.

The 10 MHz $\phi 1$ pulses on lead 411 are coupled by lead 461 through AND gate 462 to the input of counter-decoder 440, where they are counted. Circuit 440 emits delayed radar synchronizer trigger pulses 306 at terminal 52 and delayed radar sweep trigger pulses 311 at appropriate times. The delayed radar synchronizer trigger pulses 306 appear at terminal 52 of OR gate 451 in FIG. 4A; the delayed range sweep trigger 311 appears at terminal 54 of OR gate 450. Terminals 52 and 54 appear also in FIG. 1A so that the symbolic switch 58 has, in effect, substituted the delayed radar synchronizer trigger 306 for the undelayed equivalent 301 and the delayed sweep trigger 311 for its corresponding undelayed trigger 308.

The generation of the delayed radar synchronizer trigger 310 and of the delayed sweep trigger 311 and the delay of the incoming radar video go on continuously when switch blade 66 is closed, generally independently of whether the I-T device is in is interrogate or transponder mode. All timing of the I-T device is thus derived from the 160 MHz oscillator 222, which preferably is a stable crystal controlled device. In this description, it operates at the nominal frequency of 160 MHz; this is merely for the sake of simplicity, since calibration of the system strictly in terms of the internationally accepted nautical mile would require its operation at 161.828 MHz. The standard bit rate for operation at 160.828 MHz is 10.114 MHz and is standard for all cooperating systems. For simplicity, the nominal value 10 MHz is used herein. The nominal 160 MHz pulses are divided by a factor of 16 in divider 470 to form $\phi 1$ and $\phi 2$ nominal 10 MHz pulses, the $\phi 2$ pulses being phased to follow the $\phi 1$ pulses 314 by a half period or a nominal 50 nanoseconds, for example.

With counter-decoder 440 in operation as discussed in the foregoing, the 160 MHz $\phi 1$ clock pulses are supplied directly via lead 409 to the input of binary range counter 407 where they continue to be counted until counter 407 is reset by the next arriving undelayed radar synchronizer trigger at terminal 53. From AND gate 476, the 160 MHz pulses selected by the latter trigger passes via lead 408 to set flip flop 404. The now-high one output of flip flop 404 combined in AND gate 403 with the next delayed sweep trigger 54 from OR gate 450, via lead 402, and the phase two pulse on lead 410 from divider 470, permits the next $\phi 1$ 160 MHz pulse from oscillator 222 on lead 400 to pass AND gate 403 and lead 405 to reset counter 407. This pulse also resets flip flop 404. As will be explained in further detail, this counting and resetting process continues as long as switch blade 66 is closed and the range count in counter 407 will be sampled (but undisturbed) at various times as different calls are received and supplied via multiple-conductor lead 406 to subtractor 745 in FIG. 7B.

In addition to clearing divider 470 and binary range counter 407, the selected incoming radar synchronizer trigger 301 sets flip flop 464 via lead 465. The now-high one output of flip flop 464 enables AND gate 462 via lead 463, permitting the passage of the first $\phi 1$ 10 MHz clock pulse 302 after radar synchronizer trigger pulse 301 and those following the latter trigger 301 (see also wave forms 302 and 303 of FIG. 3B) to counter and decoder 440. The standard long format call of 85 bits is shown in wave form 304, as is the timing of the delayed radar trigger 306.

When the system stands by in its transponder mode, or when in any interrogation mode except the EE mode, the EE mode selecting flip flop 447 is reset by signals applied to it via lead 458 and it, in turn, via lead 430 and 431, inhibits AND gates 446, 444, 442, and 427 and enables AND gates 445, 443, 441 and 422. As a consequence, when counter-decoder 440 emits a pulse upon the count of 87, it will pass through the enabled AND gate 443 and OR gate 451 to appear on terminal 52 as the delayed radar synchronizer trigger 306.

Normally, as shown by wave forms 307 and 308, the return of a zero-range radar echo would begin immediately as would the normal radar range sweep. In the present system, however, there can be no I-T video output until an entire incoming message is received. Also, in order to allow for circuits to settle after each radar pulse transmission, the start of a reply is delayed by 30 clock pulses, for example. As is shown in wave form 310, the radar video output pulse that would result from the receipt of a zero range I-T reply is made to occur at the time of the $\phi 1$ 10 MHz clock pulse occurring at count time 200. Therefore, when the counter-decoder unit 440 emits a pulse at the end of count 200, the latter passes through the enabled AND gate 441 and OR gate 450 to terminal 54 as the delayed range sweep trigger 311 for range sweep 313. The output pulse from terminal 54 is also coupled via lead 455 to the reset terminal of flip flop 464, stopping the flow of $\phi 1$ clock pulses into counter-decoder 440. In this manner, it is ensured that only one delayed radar synchronized trigger 306 and only one delayed radar range sweep trigger 311 for range sweep 313 are generated for each undelayed radar synchronizer pulse 301.

At the same time, the synchronized flow of $\phi 1$ 10 MHz clock pulses on lead pulses on lead 411 from divider 470 shifts the seventy four stage radar-video-delay shift register 428 and the 39 stage radar-video-delayed shift register 421. In this situation, AND gate 427 is inhibited and AND gate 422 is enabled according to signals on leads 425, 426 and the delays inherent in shift registers 421 and 428 are therefore connected in series via AND gate 422. A total radar video delay of 113 counts is provided which, by way of example, is the required radar video delay for long format calls (see wave form 312).

The timing for the 36 bit long EE call is shown in wave 315 of FIG. 3D; the delayed radar synchronizer trigger occurs at the count 48. As the 46 bit message is added to the 3 microsecond delay in a replying transponder, the radar video output pulse, being coincident with last bit of the incoming message, occurs on ship A at the count of 122.

When in the interrogate mode and when the operator has elected to make an EE call, the mode selecting flip flop 447 is set by signals applies via lead 457. This event inhibits AND gates 445, 443, 441 and 422 and enables AND gates 446, 444, 442, and 427. Consequently, when the counter-decoder 440 emits a pulse at the end of count 48, it will pass through the enabled AND gate 444 and OR gate 451 to appear at terminal 52 as the delayed radar synchronizer trigger 315. When the counter-decoder 440 emits a pulse at the end of count 122, it passes through enabled AND gate 442 and OR gate 450 to terminal 54 as the delayed range sweep trigger 316. As before, this pulse also resets flip flop 464, thus assuring that only one delayed radar synchronizer trigger pulse 315 and only one delayed range sweep trigger 316 are generated for each undelayed radar synchronizer trigger.

At the same time, AND gate 422 is inhibited, so that radar video cannot pass from shift register delay 428 to shift register delay 421. Instead, the enabled AND gate 427 directs the radar video output of delay 428 to pass via OR gate 420, video amplifier 418 and lead 419 to terminal 56 directly to cathode ray display 21 with only a 74 count delay. The latter is the delay required to match the EE call as shown by wave 317.

The radar video system operates continuously for either the EE or long format calls and all radar echoes, regardless of when they arrive, are delayed by the amount proper to permit their display coincident with the I-T video pulse and both are displayed by indicator 21 at the proper range. As the I-T timing is derived from the radar synchronizer trigger which is generated in radar synchronizer 12 according to the operator-selected range scale, operation of the radar is the same as it was before the I-T device was ever connected to it and is independent of whether the I-T device is on or off.

Figure 4B:
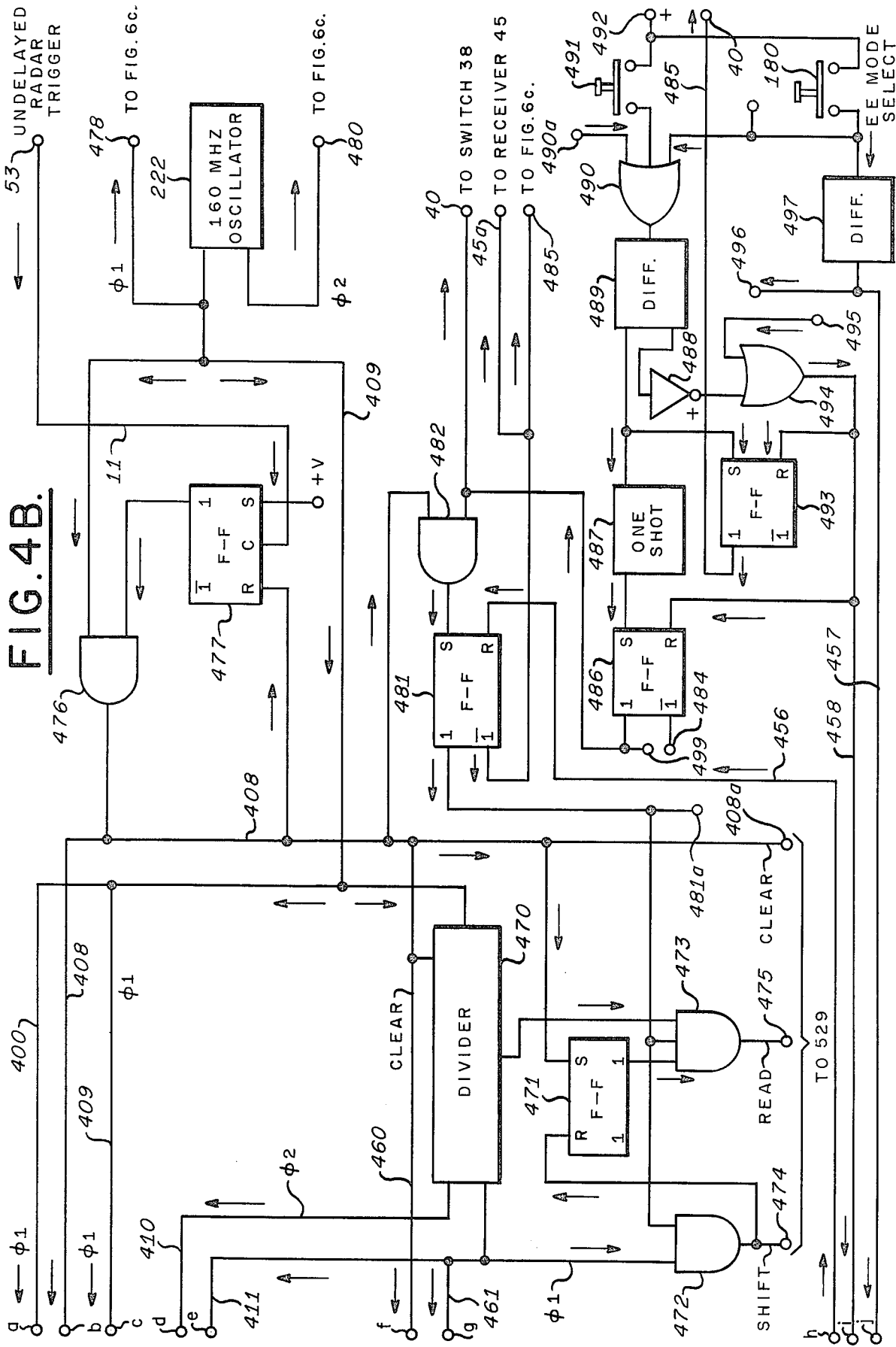

As will be further explained, the master timing circuits of FIGS. 4A, 4B are also used in the making of interrogations. This is not true when receiving a reply to the interrogation or when receiving and replying to an interrogation from some other I-T device. Such timing is generated by a separate and distinct pair of respective divider and counter-decoder circuits associated with master receiving timer 244 of FIG. 2 and discussed in further detail in FIGS. 5A and 5B. The functions of the binary range counter 407, flip flop 404, AND gate 403, and the associated leads 400, 401, 402 will be further discussed in connection with FIGS. 7B and 7C.

PREPARING THE I-T SYSTEM FOR USE

When the operator first starts to operate the I-T system, or whenever the stored data about own ship is to be changed, the operation must set in certain variable data for use by the I-T device in answering interrogations from other ships. The variable data will include at least own ship's address, draft, and nature of the cargo. As has been discussed, the operator, after touching an entry key (E) in section 140, 146, or 152, uses the keyboard 177 of FIGS. 1B and 5A to key in such variable data. As a result, the data bits are then stored in the keyboard buffer register 511. Variable data of other kinds may also be automatically and continuously supplied in the conventional way from sources 532 to the register 511, where all of the data is then available when needed for making or replying to a long format call.

It will be recalled that when own ship makes an interrogation, own ships's address is part of the transmitted message in the C'GPA space and is returned in the reply so that the interrogating vessel may accept only replies addressed to it. In selective calls, the called party's address C'DPA is included both in the interrogation and in the reply. In an EE call, which solicits replies from all parties at all ranges, the call goes out with the C'DPA group blank, but each transponder that replies automatically adds its own address in the space provided in the message, thus iddentifying the addresses of remote transponders.

When the I-T system of a receiving vessel is standing by in the transponder mode, that vessel is the called party and its transponder seeks to identify its own address in the C'DPA space in each incoming long format message. If its own address is detected in the C'DPA space, it is determined that a long format call selectively addressed to it has been made and that an answer must be generated. In other words, own ship's address and the C'DPA are interchanged between interrogating and transponding. Therefore, the segment 529b of the main shift register 529a through 529m lying across FIGS. 5A and 5B, in which the vessel making an interrogation inserts its own address, is called the C'GPA segment. On a vessel making a reply, however, own ship's address is inserted in the C'DPA segment 529c.

It is the one (499) and not one (484) outputs of flip flop 486 (FIG. 4B) that automatically interchange these addresses when such an event is required. As the transponding action is automatic, the operator on the called vessel is not concerned with this switching function.

The address interchange aboard the calling vessel is accomplished in the following manner. After pressing entry key 142, the operator, using keyboard 177, sets own ship's address into buffer storage register 574 and via multiple conductor 568 into the own ship's address read out 143. The output of own ship's address register 574 feeds AND gates 595 and 572. The output of AND gate 595 is connected via OR gate 596 and leads 559 to the read side of the C'DPA segment 592c of the master shift register 529. The output of AND gate 572 is connected via multi-lead cable 560 to the C'GPA segment 529b. When making a long format interrogation, the high not-one output of flip flop 447 on lead 430 is connected to terminal 592 and partially enables AND gates 594 and 595; when making an EE call, the low not-one output of flip flop 447 on lead 430 and terminal 592 inhibits AND gates 594 and 595, ensuring that all zeroes are transmitted in the C'DPA segment 529c. However, when the I-T device is in its transponder mode, flip flops 447 and 486 are reset, and the low-one output of flip flop 486 on terminal 499 inhibits AND gates 594 and 572, preventing the C'DPA from being read into the C'DPA segment 529c and the OSA from being read into the C'GPA segment 529b. The high not-one output of flip flop 486 on terminal 484 enables AND gate 595, permitting own ship's storage register 574 to be read via OR gate 596 into the C'DPA register segment 529c.

MAKING AN INTERROGATION

As shown in FIG. 5B, any one of a variety of available modes, such as 14 for example, may be selected in making an interrogation. To select any one mode except the EE mode, the operator uses his keyboard 178 by touching any one key 550a through 550n, thus connecting a lead from a +V voltage source to mode encoder 555. In making an EE call and as shown in FIGS. 4B and 5B, selection of the EE mode and the interrogation are combined when the operator holds down the interrogate key 180. The positive going step voltage resulting from pushing key 180 passes through differentiator 497 to the EE selection input of mode encoder 555 via terminal 496, causing that mode to be selected. As shown in more detail in FIGS. 4A and 4B, the output pulse from differentiator 497 also sets the EE mode selecting flip flop 447 via lead 457. The positive voltage established by pushing key 180 also passes through OR gate 490 to cause the interrogation, as will be further discussed.

The output of mode encoder 555 is coupled by multi-wire cable 548 to the mode storage register 556. The conventional encoder performing the function of mode encoder 555 has an output that goes low when any one of its input circuits is closed; after inversion by inverter 551, this signal automatically causes the selected mode code to be read over multi-wire cable 548 into mode storage register 556. There, it will remain available to be read into mode segment 529e of the master shift register at the appropriate time prior to transmitting the interrogation.

If the operator intends to make a directed communication (DC) or broadcast (BI) call containing a message code, he must again use keyboard 178 to key in the selected mode code as will be further discussed. In making any selectively addressed call such as an SSI or DC call, the operator must also key in the C'DPA code. He first touches the C'DPA key in the data section 176 of the keyboard and the enter key of the readout row he intends to use when making the call. Using keyboard 177, he then keys in the desired address, whereupon it will appear in a C'DPA storage register, such as register 591 and in read out 155.

When making an interrogation as discussed with respect to FIGS. 4A, 4B, 5A, and 5B, the flip flop 486 is first set. Its now-high one output on terminal 499 will partially enable AND gate 594. If the call is a long format call, the high not-one output of flip flop 447 passes along lead 430 to complete the enabling of AND gate 594 and to pass the C'DPA code via OR gate 596 to the read side of the C'DPA segment 529c of the master shift register 529. The C'DPA will also flow along leads 559 and 566 to comparator 580. The high one output at terminal 499 of flip flop 486 also enables AND gate 572, passing own ship's address to the C'GPA segment 529b of the master shift register 529 and also via leads 560 and 569 to one side of comparator 581.

Having made these preparations, actual interrogation begins when the operator holds down an interrogate key such as key 491 of FIG. 4B. The +V voltage level on terminal 492 is applied through OR gate 490 to differentiator 489. The differentiated signal may be generated by holding down any other interrogate key, such as any key coupled to terminal 490a.

Holding key 491 closed produces a positive pulse via OR gate 490 at the output of differentiator 489, which triggers one-shop 487 and sets flip flop 493. The now-high one output of flip flop 493, passing along lead 485 to terminal 40, switches microwave oscillator 46 from its transponding to its interrogating frequency via lead 42. Via lead 41, it causes microwave switch 38 to switch the microwave output of the I-T device from omnidirectional antenna 37 to radar antenna 1. When one shot 487 relaxes, its high one output triggers flip flop 486, the delay provided by one shot 487 affording sufficient time for the switching to take place before further processing takes place. The one output of flip flop 486, which is now high, enables AND gate 482, permitting passage of the very next and all subsequent radar synchronizer pulses, modified as will be explained, as long as the interrogate key 491 is held down.

When the radar synchronizer pulse 301 arrives at terminal 53, flip flop 477 is set by its leading edge. The now-high one output of flip flop 477 enables AND gate 476; AND gate 476 now passes the very next 01 160 MHz clock pulse from oscillator 222. The pulse output of AND gate 476 immediately resets flip flop 477, inhibiting passage of clock pulses from oscillator 222 until the arrival of the next radar synchronizer pulse at terminal 53. In this manner, it is assured that the I-T device will be triggered by the leading edge of the basic radar trigger or synchronizer pulse 301, thus making the I-T device timing independent of the width of the radar synchronizer pulse.

The modified radar synchronizer pulse from AND gate 476 on lead 408 passes via terminal 408a and lead 506 to clear all of the master shift register sections 529a through 529m, as well as the parity checker 576. It passes along lead 460 to clear divider 470 and counter-decoder 440. Additionally, it sets flip flops 471, 464, and 404, all of which readies the I-T system for transmission of the call. It also sets flip flop 481 through AND gate 482 which was enabled when flip flop 486 was set.

The now-low not one output of flip flop 481 passes to terminals 45a for blanking the front end of the I-T receiver 45, preventing the transmitted radar signals from saturating the receiver 45. It is also coupled by terminal 485 for use in FIG. 5B to prevent any I-T video energy from entering the input end of the master shift register 529.

The now-high one output of flip flop 481 enables AND gate 472 and partially enables AND gate 473. The now-high one ouput of flip flop 471 completes the enabling of AND gate 473 and permits a pulse from divide-by-10 device 470 occurring, for example, about 67 nanoseconds before the first 01 10 MHz clock pulse, to pass through AND gate 473 to terminal 475. This pulse is a read pulse and is coupled through terminal 475 to lead 507 of FIGS. 5A, 5B, there to cause all previously selected data required for the desired call to be read into appropriate master shift register sections 529a through 529m. Thus the first following 01 10 MHz clock pulse, on passing through the enabled AND gate 472 will reset flip flop 471; its now-low one output inhibits AND gate 473, so that no new data can be read into the master shift register 529 until the next undelayed radar synchronizer trigger arrives at terminal 53.

The continuing output of 01 10 MHz pulses passing through the now enabled AND gate 472 and terminal 474 to OR gate 585 causes the stored data in the main shift register 529 to be shifted into I-T transmitter 44 and to be radiated by radar antenna 1.

As the shifting process continues, the odd parity checker 576 (FIGS. 5B, 6A), checks the parity of the control group of the message; that is, as shown in wave form 304 of FIG. 3B, the 32 bits between bit 53 and bit 84 will be checked. The thirty third bit will always be a zero at the input of parity checker 576; the checking process is stopped at the 01 clock pulse count of 32. At the count of 33 from counter-decoder circuit 440, AND gate 575 is enabled. An odd parity system is used so that if the parity at the count of 32 is odd, the output of checker 576 is zero and nothing is added to the message. If the parity at the count of 32 was even, there would be a one at the output of parity checker 576 and this would be added via AND gate 574' and OR gate 561 to the message at count 33 to make the message parity odd.

It will be noted that only the parity of the last 32 bits of the message, its control portion, is checked, making the check independent of the form of the message used. Neither the parity of the synchronizing word or the variable data in the long format message are checked. Particularly, the synchronizing word never changes and has to be correct to be detected so that there is no need to check or adjust its parity. The arrangement for checking the variable data in long format calls remains to be described.

The shifting process continues until all the data in master shift register 529 has been shifted out and thereby the call has been transmitted from the radar antenna 1. The process stops at either the count of 47 or 86, according to the type of call, from counter and decoder 440. This end of call EOC pulse passes through OR gate 452 and via lead 456 resets flip flop 481. Resettihg flip flop 481 switches the I-T device into a listening mode ready to receive the reply to its call.

The foregoing process repeats with each radar synchronizer pulse as long as the operator holds down interrogate button 491. When he releases the button, the resultant negative pulse from differentiator 489 will, after inversion in inverter 488 and passing through OR gate 494, reset flip flops 493, 486, and 447, reversing all the above switching and leaving the I-T in the transponder mode.

THE LONG FORMAT MODE

When making a long format call, the EE call-selecting flip flop 447 is reset as previously described; consequently, AND gates 446, 444, 442, and 427 are inhibited and 445, 443, 441, and 422 are enabled. As a result, the flow of 01 clock pulses from divider 470 continues, as shown in wave forms 304 and 305 of FIG. 3B, until the end-of-call pulse EOC at the count of 86 from counter-decoder 440 passes through AND gate 445 and OR gate 452 via lead 456 to reset flip flop 481. Resetting flip flop 481 reduces its one output to its low value, thus inhibiting AND gate 472, and stopping 01 shift pulses on lead 508 from terminal 474 and OR gate 585 from shifting the master shift register 529a through 529m. The complete message has, of course, now been transmitted. Accordingly, the now-high, not-one output of flip flop 481 unblanks receiver 45, partially enables AND gates 588 and 684 (FIG. 5B), and readies the I-T system to receive all replies to its interrogation. As shown by wave form 306 at the count of 86, the enabled AND gate 443 will then pass the delayed radar synchronizer trigger pulse via OR gate 451 through terminal 52 to radar transmitter 9. This trigger pulse occurs at the count 87 of the counter-decoder 440.

Counter-decoder 440 continues counting until it reaches the count 200; then, the enabled AND gate 441 passes the delayed radar range sweep trigger 311, which occurs at count 200, from counter-decoder 440 through OR gate 450 and terminal 54 to indicator 21. The delayed sweep trigger 311 also resets flip flop 464. The now-low one output of flip flop 464 inhibits AND gate 462, stopping the flow of 01 clock pulses into the counter-decoder circuit 440 until the next radar synchronizer trigger pulse 301 arrives. Each pulse 301 causes another interrogation to be made and the process continues until the operator releases key 491. Events which occur upon the release of key 491 will be further described after a discussion of the apparatus for making an interrogation in the EE mode.

THE EE CALL

To make an interrogation in the EE call mode, the operator holds down the EE mode interrogate key 180, applying a +V voltage to differentiator 497. As the output of differentiator 497 is connected via terminal 496 as seen in FIGS. 4B and 5B to the select EE mode input connection of mode encoder 555, the EE mode is automatically selected. The positive output pulse from differentiator 497 also passes via lead 457 to set flip flop 447; the now-low, not-one output of flip flop 447 inhibits AND gates 445, 443, and 441, which event prevents the long message counts 86, 87, and 200 from flowing from the counter-decoder 440. It also inhibits AND gates 594 and 595 via lead 430, preventing the transfer of any C'DPA and OSA data from storage registers 591 and 574 to the main shift register segments 529c and 529b, respectively, when the pulse from AND gate 473 causes the variable data to be read into the main shift register 529 via terminal 475 and lead 507. The now-high one output of flip flop 447 on lead 431 enables AND gates 446, 444 and 442, permitting the EE call counts 47, 48, and 122 to flow from counter-decoder 440.

When making an interrogation and receiving replies thereto, the one and not-one outputs of flip flop 447 also act to switch out the unneeded portion 529f through 529l of master shift register 529 and the unneeded portion of the radar video delay in the form of the 39 stage shift register 421. The switching of the radar video delay is independent of whether or not the I-T device is in the interrogating or transponding mode and is controlled by the setting of flip flop 447. The control of the portion of the main shift register 529 is performed by flip flop 447 when the I-T device is in the interrogate mode and is performed by flip flop 644 when the I-T device is in the transponding mode. The selection of the controlling flip flops is made by the one and not-one outputs of flip flop 486.

Figure 5A:
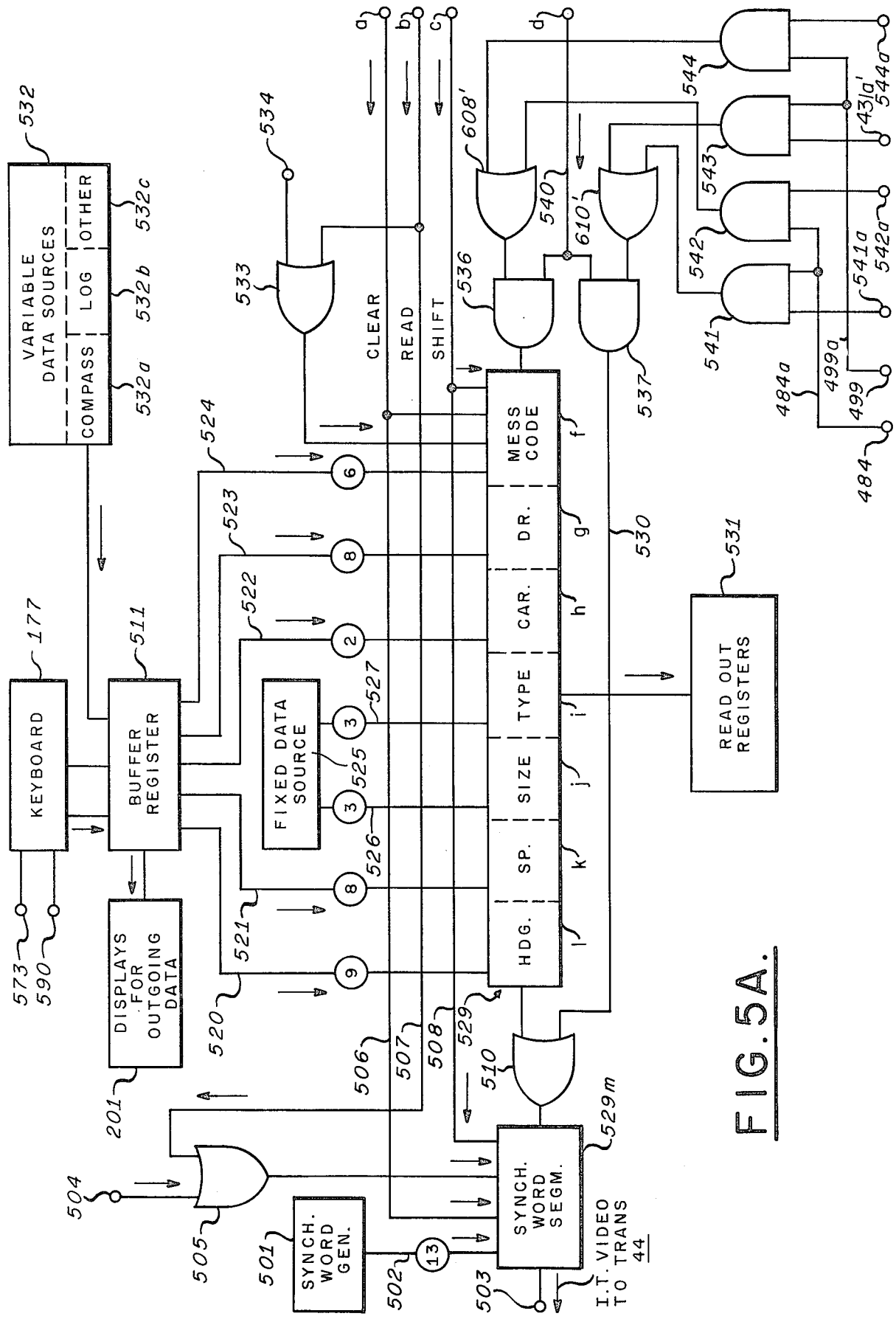

In detail, as seen in FIGS. 4B and 5A, when making an interrogation, the flip flop 486 is set. Its then-high one output on lead 499a partially enables AND gates 543 and 544 while its then-low not-one output via lead 484a inhibits 541 and 542. This transfers control to flip flop 447. In the transponding mode, flip flop 486 is reset and its then-low one output via lead 499a inhibits gates 543 and 544, while its then-high not-one inhibits gates 543 and 544, while its then-high not-one output partially enables gates 541 and 542, transferring control to flip flop 644.

The one and not-one outputs of flip flop 447 also act to switch out the unneeded portion 529f through 529l of the master shift register 529 and the unneeded portion of the radar video delay in the form of the 39 stage shift register 421.

Refer to FIG. 4A, the now low level signal not-one output of flip-flop 447 is coupled to terminal 592 via lead 430. Referring now to FIG. 5B this low level signal is coupled from terminal 592 to AND gates 594 and 595 and ultimately, via lead 540, through AND gate 561 to terminal *d*. This event prevents the data in segment 529e from being shifted to mode segment 529f shown in FIG. 5A.

Refer once again to FIG. 4A, the now high level signal one output of flip-flop 447 is coupled via lead 431 to terminal 431a which is shown as 431a' in FIG. 5A. Refer now to FIG. 5A, the high level signal at terminal 431a' is coupled through AND gate 543 and OR gate 610' to enable AND gate 537, thus permitting the output of segment 529e (shown in FIG. 5B) to pass directly from terminal *d* through OR gate 510 into the synchronizing word segment 529m.

In the same general manner, the now-low, not-one output of flip flop 447 on lead 426 inhibits AND gate 422, which event prevents radar video signals from being shifted out of the seventy four stage video delay shift register 428 from entering the 39 stage shift register 421. At the same time, the now-high one output of flip flop 447 on lead 425 enables AND gate 427, allowing the direct passage of radar video being shifted out of register 428 through OR gate 420 and amplifier 418 via lead 419 and terminal 56 to the type P display 21. With the exception of using the shortened count from counter-decoder 440, the EE call is otherwise completed as was the long format call.

In either mode, the interrogation process continues as long as the operator holds down one of the interrogation keys 491 or 180. When he releases the key, the event will, through OR gate 490, remove the positive voltage +V on terminal 492 from differentiator 489, which circuit consequently produces a negative pulse. After inversion by inverter 488, the negative pulse causes flip flops 486, 493 and 447 to reset. The one output of flip flop 486 then goes low, inhibiting AND gate 482 and preventing the synchronizing triggers on lead 408 which are selected by radar synchronizer trigger pulses from terminal 53 from setting flip flop 481. The one and not-one outputs of flip flop 486 switch own ship's address and the C'DPA code as required. As the one output of flip flop 481 remains low, the 01 clock pulses are prevented from reading and shifting master shift register 529.

Regardless of the mode selected, binary range counter 407 is started at the beginning of each interrogation, so that 01 160 MHz pulses are continuously present on lead 409. When a 160 MHz pulse selected by a radar synchronizer pulse arrives on lead 408, it sets flip flop 404, and the now-high one output of the latter partially enables AND gate 403. When a delayed sweep trigger 316 is generated, it passes via lead 402 and enables AND gate 403, permitting the passage of the very next 01 160 MHz clock pulse from lead 400 to lead 405. This latter pulse clears binary range counter 407, starting it to count from zero at the start of each radar range sweep. It will continue to count 01 160 MHz clock pulses until the next radar synchronizer trigger pulse toggles flip flop 447, thereby selecting a particular 160 MHz pulse from master oscillator 222. Having completed the description of the basic method of interrogation, it may be noted that how the count in binary range counter 407 is made remains to be discussed in further detail.

RECEIVING THE REPLY: EE MODE

When a call is to be received at the initiating I-T system, elements of that I-T device are operating in the interrogation mode. It should be remembered that the replying I-T system is in its transponder mode and delays its reply for 3 microseconds. Now, the master oscillator 222 of the initiating I-T device is oscillating and the count of signals output by divide-by-16 circuit 470 and being counted by counter-decoder 440 has reached 122. The EE mode has been set, as interrogation by 180 is being held down; as a result, all of the flip flops have been set to the proper state to receive an EE reply.

Figure 6A:
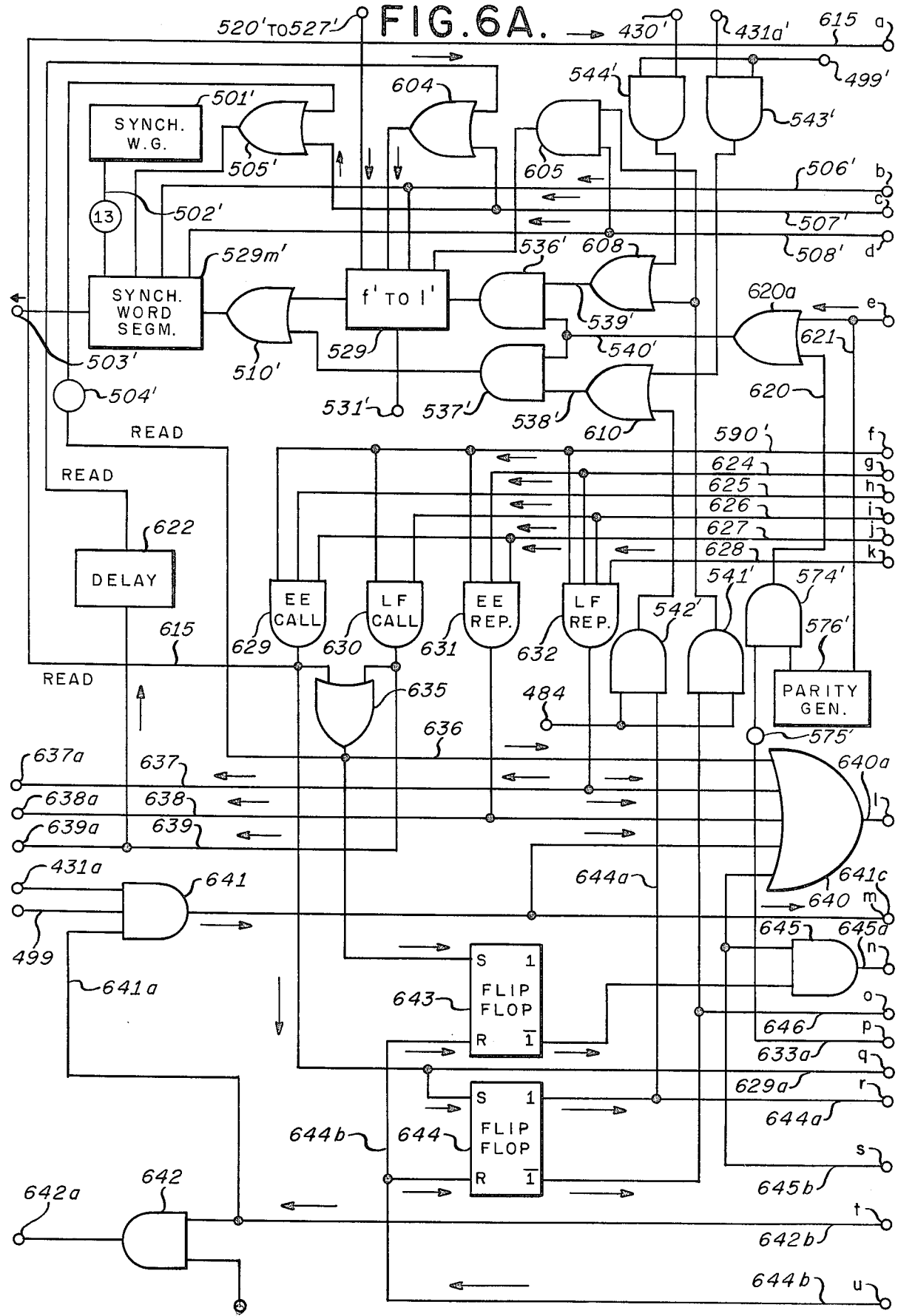
FIGS. 6A, 6B, 6C, and 6D provide details of the master receiving timer and synchronizing word decoder of FIG. 2 and their interconnections in the system.
Figure 6B:
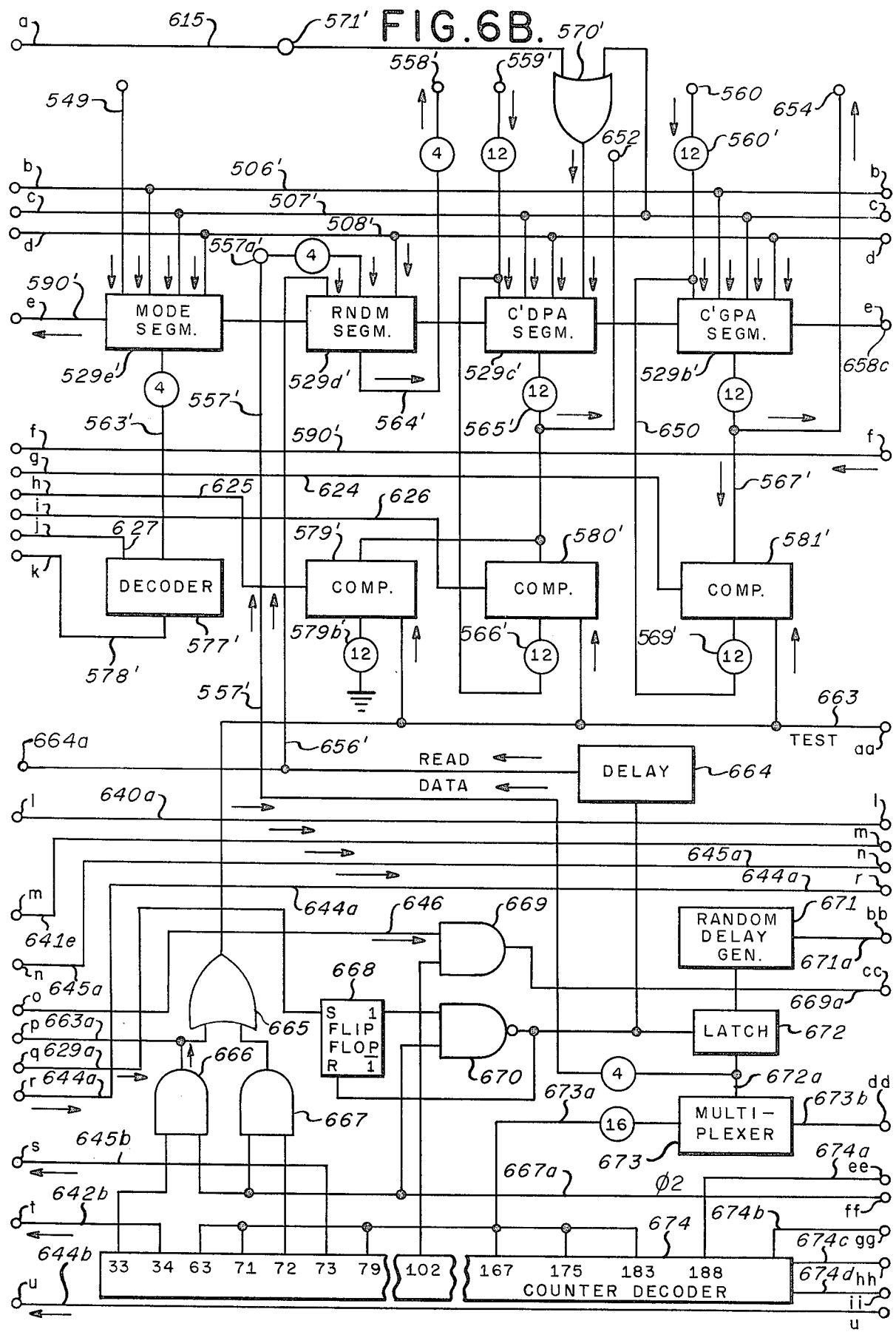
Figure 6C:
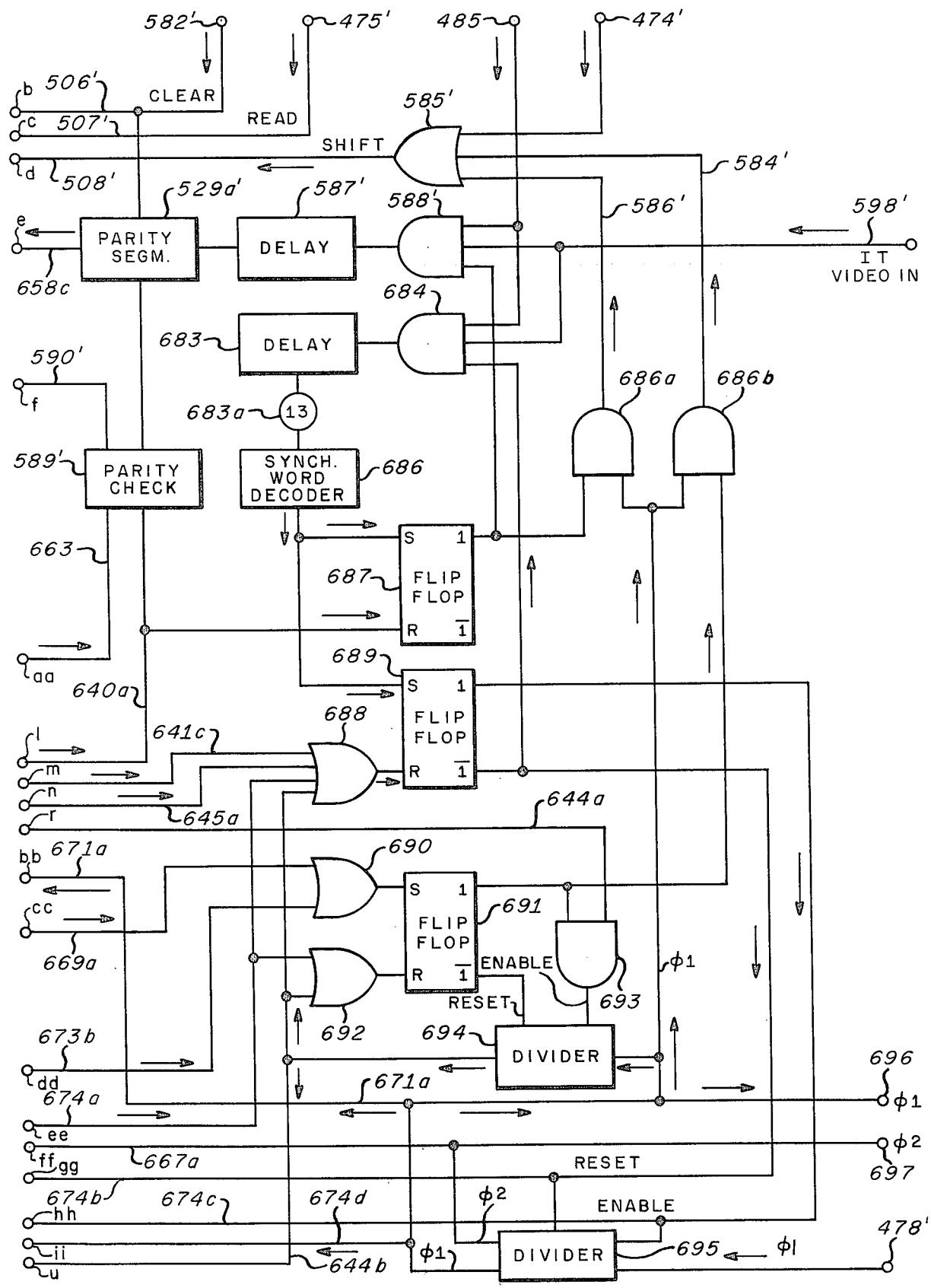

Consideration of the apparatus of FIGS. 6A, 6B, and 6C, and its mode of operation will now be introduced; and it will become immediately apparent that many elements of FIGS. 6A, 6B, and 6C are similar to those of FIGS. 5A and 5B and that many such elements are similarly connected. It will at once be apparent to those skilled in the art that such redundant elements may be made jointly to perform certain functions of the system, or that fully redundant systsms may be chosen. For example, in FIGS. 5A and 5B, the shift register 529 made up of elements 529a through 529m has the same elements and the same basic functions as the shift register of FIGS. 6A, 6B and 6C made up of elements numbered 529a' through 529m'. In the following text, the primed numbers will refer directly to the elements and particular functions of FIGS. 6A, 6B and 6C, just as if they were in the 600 reference number series, but will inherently indicate that they are also part of the 500 series of FIGS. 5A and 5B. It will be understood that the complexity of the invention makes it necessary to limit FIGS. 5A and 5B and FIGS. 6A, 6B, and 6C to showing primarily those elements involved in their respective modes of operation. It will be understood that reasonable simplification of the figures and accompanying specification makes the separate showings inviting and that each figure, in itself, discloses completely the apparatus required for the respective different sets of functions. In general, it will be obvious to those skilled in the art that separate shift registers like registers 529 and 529' may be employed, or that the functions of the two registers may be performed at different times in a single shift register. The latter arrangement is, of course, preferred since such shift register devices are relatively expensive and also consume considerable power.

As indicated in FIG. 2 in connection with the synchronizing word decoder 243 and the master receiving timer 244, and in more detail in FIGS. 6A, 6B, and 6C, when the video signals on lead 598' from the I-T receiver 45 find AND gate 684 enabled by the now-high, not-one voltage of flip flop 481 on terminal 485 and the now-high, not-one output of flip flop 689, the video signals pass into delay 683. The now-low, one output of flip flop 687 inhibits AND gate 588', preventing the message from entering the master shift register 529' via delay 587'.

If the incoming message is a valid message, when its first 13 bits are distributed along and stored in delay line 683, the 13 bit Barker code will be recognized by the conventional synchronizing word decoding circuit 686 and its now-high, one output will set flip flops 687 and 689. As the not-one output of flip flop 689 now falls to its low value, it inhibits AND gate 684, preventing any further signals from entering delay device 683. This feature prevents any subsequent part of the message which might accidentally form a 13 bit Barker code from entering delay 683, undesirably causing resynchronization in mid-message, and consequently destroying the call.

Figure 6D:
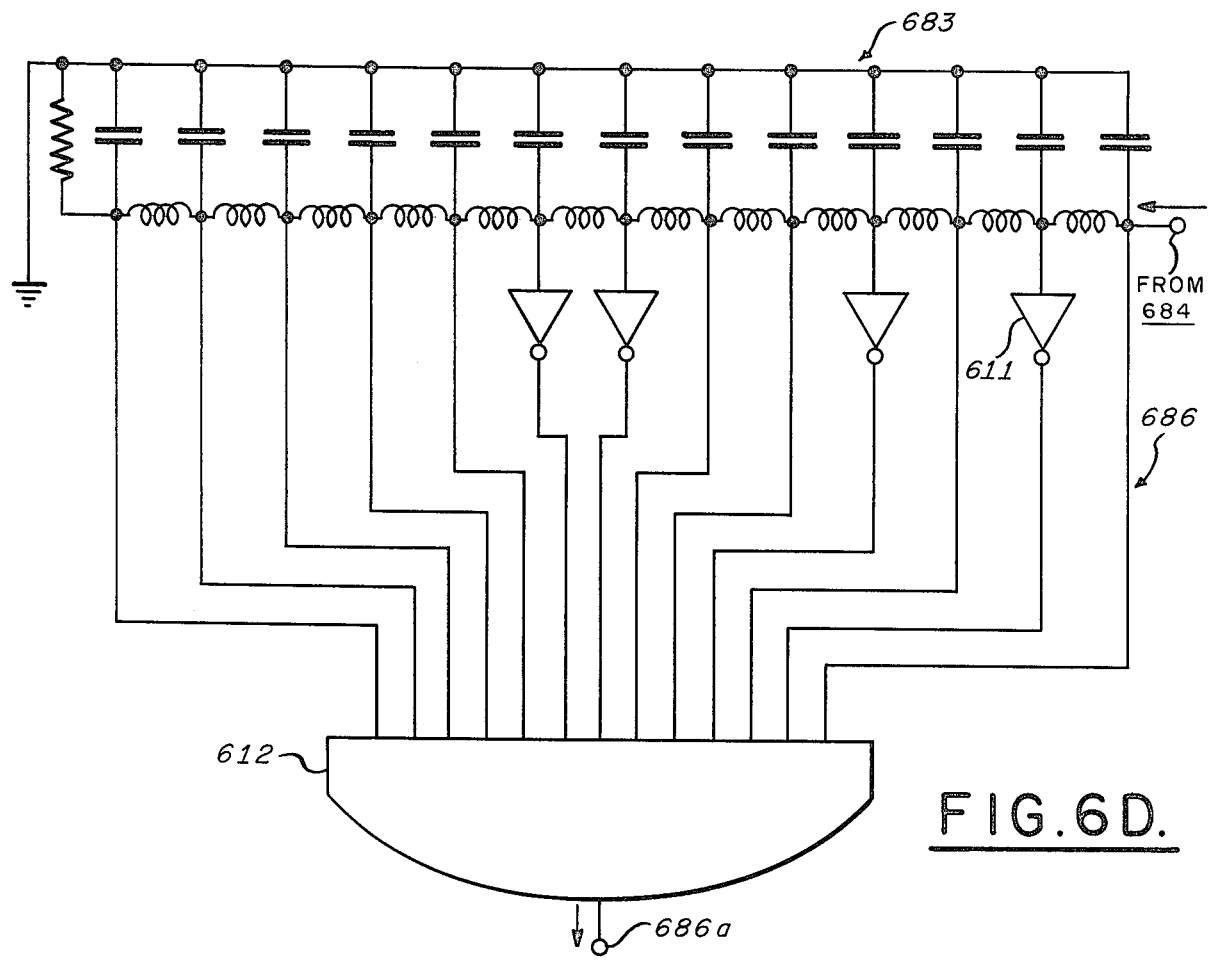

The parallel connections between the delay line 683, which is a conventional multiple-tapped regular delay line, and the synchronizing word detector 686 are shown in more detail in FIG. 6D. The delay of line 683, in a representative system, may be 1200 nanoseconds long, and it will be tapped at 100 nanosecond intervals. Where the input video signals from AND gate 684 of FIG. 6C are amplitude modulated, non-return-to-zero coded signals, the thirteen bit Barker code is:

| BIT NUMBER | 1 | 2 | 3 | 4 | 5 | 6 | 7 | 8 | 9 | 10 | 11 | 12 | 13 |
|---|---|---|---|---|---|---|---|---|---|---|---|---|---|
| AMPLITUDE | 1 | 1 | 1 | 1 | 1 | 0 | 0 | 1 | 1 | 0 | 1 | 0 | 1 |

According to the particular code used, inverters such as inverter 611 are inserted in the appropriate output tap leads; for the foregoing code, inverters are placed in the sixth, seventh, tenth, and twelfth tap leads. The outputs of all taps are summed by AND gate 612 for appearance on lead 686a. There will be an output on lead 686a when and only when a signal equivalent to the 13 bit Barker code is properly distributed along delay line 683.

Other known synchronizing word or pattern recognition circuits may be employed. A known analog or digital cross correlating type of technique may alternatively be employed. The synchronizing word could be a 13 bit or other length Barker code word or may have an entirely different sequence, but it is required that all cooperating systems use the same synchronizing word code. It is well established in the communication art that the Barker code is particularly useful in the synchronization process in single channel systems, and it is therefore preferred for the present application.

Returning to FIG. 6C, the now-high one output of flip flop 687 and the still-high, not-one input of flip flop 481 on terminal 485 enable AND gate 588'. The rest of the incoming message is thereby directed through a short delay 587' into the input or parity section 529a' of the master shift register 529', being coupled by lead 658c into the apparatus of FIG. 6B. As it goes high, the one output resulting from setting flip flop 689 on lead 674c enables the divide-by-16 circuit 695 and the counter-decoder 674. Divider 695 divides the 01 160 MHz clock pulses appearing on lead 478' from master oscillator 222 so as to produce 01 and 02 10 MHz clock pulses at its respective outputs. The 01 10 MHz clock pulses are counted by counter-decoder 674 to produce a series of pulses required for subsequent processing of the various calls.

To continue the receipt of the EE reply, the now-high one output of flip flop 687 also enables AND gate 686a, which event will permit the 01 10 MHz clock pulses from divider 695 to pass through OR gate 585' into the master shift register 529' on lead 508'. Delay 587' is adjusted during manufacture of the system so that about 10 percent of each of the fourteenth and all subsequent incoming video pulses will have passed by the time that the 01 10 MHz clock pulse shifts the main register 529'. In other words, each incoming video pulse will be about 60 percent passed when the next following 02 10 MHz pulse causes the appropriate segments of the main shift register 529' to read into the various corresponding storage registers for further processing. Near this particular point in time, each incoming I-T video pulse will have reached substantially full or zero amplitude, so that correct operation is assured.

The 01 10 MHz clock pulses continue to shift the message through the main shift register 529' until the counter-decoder 674 emits a count of 33. This latter count enables AND gate 666 just prior to the arrival of a 02 10 MHz clock pulse at the second input of AND gate 666. At the count of 33, the incoming video message, less the synchronizing word, is distributed along the first thirty three stages of master shift register 529'. Thus, at the count of 33, the mode code word resides in the mode code segment 529e' and will automatically be decoded by the conventional one-of-16 decoder 577'. A consequent output of decoder 577' appears on EE decode lead 627, which lead is connected to EE call AND gate 629 and EE reply gate 631. As the I-T system is in its interrogate mode, the presence of this output identifies the incoming video message as an EE reply.

Apparatus will now be described for ensuring that this incoming video is actually a valid reply addressed to own ship. This information is derived at the count of 33 by the 02 10 MHz clock pulse from OR gate 665 which causes comparator 581' to compare the content of the master shift register segment 529b' with the code representing own ship's address OSA, which is always connected to the lead 569' side of comparator 581' when an interrogation is being made. If there is a match in comparator 581', identifying the received message as a reply addressed to own ship's I-T system, a coincidence output is generated on lead 624. The 02 10 MHz pulse from OR gate 665 also causes comparators 580' and 579' to compare the content of the C'DPA master shift register segment 529c' and 529d'; there will be no output as will be further described. Parity checker 589' is operated at the same time in cooperation with the parity segment 529a' by the pulse output of OR gate 665 on lead 663; if parity is odd, as is required, an output appears on lead 590' which is also connected to EE reply AND gate 631.

As a consequence of the foregoing action, the three inputs to the EE reply AND gate 631 all go high, enabling AND gate 631 and thereby identifying the actual existence of the expected EE reply. The three inputs to AND gate 631, under this circumstance, indicate that an EE call has been detected, that the reply is addressed to own ship, and that parity is odd and therefore correct.

The lack of a coincidence output of comparator 579' inhibits the EE call AND gate 629 and the lack of a coincidence output of comparator 580' on lead 626 inhibits the long format call AND gate 630 and, coupled with the fact that no long format mode is detected in the incoming message, also inhibits the long format AND gate 632. As a result, the now-high pulse from AND gate 631 resets flip flop 687 via OR gate 640 and lead 640a and will supply a signal to terminal 638a to cause further processing, as will be described.

Resetting flip flop 687 inhibits AND gate 588' and that event prevents any further I-T video signals from entering the master shift register input end segment 529a'. It also inhibits AND gate 686a, preventing any further shifting of the master shift register 529' by the 01 10 MHz clock pulses. In this manner, the data remains stored in the master shift register 529' where it is available for further use when required.

Flip flop 689 remains set, so that counter-decoder 674 is still counting. This is apparent when it is recalled that, in making an EE interrogation, both the transmit-receive flip flop 486 and the EE call select flip flop 447 are set. As a result, the now-high, one outputs 499 and 431a of the two flip flops enable AND gate 641. This, in turn, allows the count of 34 from counter-decoder 674 to pass on leads 642b and 641a and via OR gate 688 to reset flip flop 689 and, via OR gate 640 and lead 640a, to reset flip flop 687. Resetting flip flop 687 inhibits AND gates 588' and 686a; inhibiting AND gate 588' inhibits entry of incoming video into the master shift register section 529a', while inhibiting AND gate 686a prevents further shifting of any data stored in the master shift register 529'. Resetting flip flop 689 resets the divide-by-16 circuit 695 via lead 674b and counter-decoder 674, ending the counting operation. The now-high, not-one input of flip flop 689 enables AND gate 684, thus directing the next incoming message video signals into delay line 683.

If, after the start of a decoding operation of the synchronous word decoder 686, the incoming message is found not to be the expected valid EE reply, the count of 34 pulses from AND gate 641 resets flip flop 689 through OR gate 688. In either event, the I-T system has been readied for operation in the shortest possible time to receive further EE replies still arriving from ships on the same azimuth. The signal processing required upon the receipt of a valid EE reply will be further discussed, as it is a further key feature of the invention.

PROCESSING THE REPLY TO A LONG FORMAT CALL

If the operator has made a long format call rather than an EE call, a distinct kind of operation is involved. To make the long format call, the operator holds down an interrogate key, such as key 491. When the EE reply test is made at the count of 33, a zero would be present on the EE output lead 627 of mode decoder 577', so that signal processing would automatically continue. Furthermore, as in the case of the long format mode, the EE call select flip flop 447 is reset and its now-low, one output passes through lead 431 and terminal 431a and inhibits AND gate 641, preventing the flow of the count of 34 pulses from counter-decoder 674 from resetting flip flops 687 and 689. As a result, the count of 01 10 MHz clock pulses continues until the count of 72. The call bit sequence shown at SSI in FIG. 3A illustrates the structure of a typical long format call as distributed in the master shift register 529'.

At the count of 72, the high output of counter-decoder 674 enables AND gate 667. The very next 02 10 MHz clock pulse from divide-by-16 circuit 695 then passes via lead 667a through AND gate 667 and OR gate 665 and causes the sampling of the contents of the C'GPA segment 529b' of the main shift register 529' of the C'DPA segment 529c', and will also flow along lead 663 to cause a parity check by circuit 589'. It will, of course, be recalled that long format calls are addressed to a specific address and that the same specific address will be stored in the C'DPA register segment 529c: also, the mode code used in making the call is always returned with the reply.

In recognizing the presence of a reply to a long format call, the received mode code detected by the one-of-16 decoder 577' is compared with the mode previously selected by the operator; if they match, a high pulse is provided as input to the long format reply AND gate 632 via leads 578' and 628'. If the expected valid long format reply is actually received, the test shows that parity is odd, own ship's address OSA is stored in the C'GPA segment 529b', and that the C'DPA code is that originally selected by the operator. If the three factors are true, all four inputs on leads 590', 624', 626', and 628 to the long format reply AND gate 632 are high and the consequent output pulse of that gate confirms the reception of the expected long format reply. There will be no outputs at that time from AND gates 629, 630, or 631.

As will be further discussed, the pulse output of long format reply AND gate 632 will also be made via terminal 637a to cause the contents of the master shift register 529' to be read into appropriate readout devices and storage latches and to initiate the subsequent data processing specified by the received mode code. The pulse output of AND gate 632 also passes through lead 637 and OR gate 640 to reset flip flop 687 which will, in turn, stop the flow or 01 10 MHz clock pulses via AND gate 686a and OR gate 585' so that shifting of the master shift register 529' is prevented. In this manner, the entire long format reply remains properly distributed throughout the appropriate segments of the master shift register 529'. Resetting of flip flop 687 also inhibits AND gate 588', preventing any following video signals from entering the master shift register 529'.

As before, flip flop 689 is set and the count continues. Flip flop 643 is still reset because neither an EE nor LF call has been received. The now-high, not-one output of flip flop 643 enables AND gate 645, resetting flip flop 689 at the count of seventy three through lead 645a and OR gate 688. As before, the resetting of flip flop 689 stops the count and, by enabling AND gate 684, it permits entry of any incoming video into delay line 683. If, however, the synchronizing word decoder 686 having detected a synchronizing word, the test for a valid LF reply failed, the count of 73pulses resets flip flop 687 via OR gate 640. This event inhibits AND gates 588' and 686a, preventing further shifting of video signals into the main shift register 529'. Because the expected long format reply was not received, there is no output from the long format reply AND gate 632 to start further message processing. In either event, the I-T device is prepared for receiving the next incoming video message. Thus, the processing required to receive but not to interpret the long format call is completed. The interpretation process remains to be discussed.

AUTOMATIC REPLY TO AN INCOMING INTERROGATION WHEN THE I-T DEVICE IS IN ITS TRANSPONDER MODE

Most of the time, the I-T devices of cooperating ships stand by in the transponder mode and the apparatus involved in this function will now be discussed. As seen in FIGS. 4B and 6C, when the I-T device is standing by in the transponder mode, flip flops 493, 481, 486, 687, 689, and 691 are reset. The now-low, one output of flip flop 493 on terminal 40 and leads 41, 42 switches the I-T device to its transponder frequency and couples it to omnidirectional antenna 37. The now-high not-one output of flip flop 481 unblanks the front end of receiver 45 via lead 45a; also, by partially enabling AND gates 588' and 684 via terminal 485, it prepares the I-T system to receive incoming video messages; flip flop 687 being reset, it inhibits AND gate 588' preventing the incoming video from reaching the input of shift register 529'. Flip flop 689 being reset, its now-high, not-one input enables AND gate 684, directing the incoming video message into delay line 683.

After a time period corresponding, for example, to the time taken by thirteen of the 10 MHz counts, the first 13 bits of the message are distributed along delay line 683. If the incoming message is a valid one, the 13 bit segment will be the 13 bit Barker code and it will be decoded by the synchronizing word decoder 686. The resultant pulse output of decoder 686 sets flip flops 689 and 687, which in turn inhibits AND gate 684, enabling AND gate 588', and transferring the incoming video message into the main shift register 529' through delay 587'.

When it goes high, the one output of flip flop 689 enables divider 695 and counter-decoder 674. Divider 695 begins to count 01 160 MHz clock pulses which are continuously arriving on terminal 478' from master oscillator 222. The now-high, one output of flip flop 687 also enables AND gate 686a; this permits the passage of 01 10 MHz clock pulses from divider 695 to pass through OR gate 585' to shift the incoming video message into main shift register 529'. As previously noted, delay 587' provides a factory adjustment for assuring the desired time relatIon between incoming message video and the clock pulses.

RECEIVING AND REPLYING TO AN EE CALL

The processing of the EE and long format (LF) calls differ and it is convenient first to discuss how the incoming EE call is handled. The shifting and counting processes described in the preceding section continue until the thirty third 01 10 MHz clock pulse appears, which event produces an output from counter-decoder 674 that enables AND gate 666 and permits the very next 02 10 MHz clock pulse from divider 695 and lead 667a to pass through AND gate 666 and then through OR gate 665. The output of OR gate 665 is a test pulse that causes comparators 579', 580', and 581' to test for an EE call by comparing the contents of their respectively associated segments in main shift register 529' with the particular test code patterns supplied at the respective opposite sides of the comparators when the system is in the transponder mode. The pulse from OR gate 665 will also test for odd parity, as before. The test code patterns are as follows:

(1) all zeroes are permanently connected via the multi-conductor cable 579b' to comparator 579',
(2) own ship's address OSA is coupled to comparator 580' by the multi-lead cables 566', and
(3) as the AND gate 572 is inhibited, all zeroes are connected to comparator 581' by leads 589.

If the incoming video message is from a valid EE call, parity will be odd and therefore correct and there will be a match with the all-zero word in the C'DPA mode segment 529c' at comparator 579', but not with own ship's address OSA at comparator 580'. Comparator 581' will not find a match between the all-zero code and the C'GPA now in the C'GPA segment 529b'. The one-of-16 decoder 577' produces a high one output in its EE mode output lead 627. The consequence of this combination of events is to produce a high one output from the EE call AND gate 629. A low output from comparator 580' on lead 626 inhibits the long format call AND gate 630 and the long format reply AND gate 632, while the low output from comparator 581' on lead 624 inhibits EE reply AND gate 631 and the long format reply AND gate 632. Thus, the call is identified as a valid EE call.

The high output pulse from EE call AND gate 629 starts the signal processing needed for generation of a reply to the EE call. That high output pulse passes via lead 615, terminal 571', and OR gate 570' to read the OSA word from OR gate 596' into the master shift register segment 529c'. That same output pulse of AND gate 629 passes through OR gate 635 and via terminal 504' and OR gate 505' to read the synchronizing word from the synchronizing word generator 501' into the synchronous word segment 529m'.

The high output of AND gate 629 passes via OR gate 635 and also passes through lead 636 and OR gate 640 and via lead 640a resets flip flop 687. It also clears parity checker 589'. The now-low, one output of flip flop 687 inhibits AND gate 686a, preventing the 01 10 MHz clock pulses from shifting the incoming message video any further through main shift register 529'. The now-low, one output of flip flop 687 also inhibits AND gate 588', preventing any following video from entering the main shift register 529'.

In the transponder mode, the incoming call may be either an EE or LF call. In either case, the one outputs of flip flops 486 and 447 are low, and AND gate 641 is inhibited, preventing the count of thirty fourth pulse from counter-decoder 674 from resetting flip flops 687 and 689. The still low, not-one output of flip flop 689 leaves AND gate 684 inhibited, preventing any following video from entering delay line 683. If flip flop 687 has not otherwise been reset by the detection of a valid EE call, the shifting process continues until a test for a long format call is made by the count of 72. As in this case, an EE call has been detected and the inhibition of AND gates 588' and 684 will be seen to prevent any following message video from interrupting the reply of the I-T device to the first EE call.

The EE call output pulse from AND gate 629 will, via OR gate 635, also set flip flop 643. The now-low, not-one output of flip flop 643 inhibits AND gate 645, preventing the seventy third count pulse from counter-decoder 674 from resetting flip flop 689 via lead 645a and OR gate 688. As flip flop 687 was reset at the count of 33, the passage of the seventy third count pulse through OR gate 640 and lead 640a to the reset terminal of flip flop 687 is of no consequence.

The output pulse from EE call AND gate 629 also sets flip flop 644. Then, the now-low, not-one output of flip flop 644, passing via lead 646, inhibits AND gate 669, preventing the one hundred second count pulse from counter-decoder 674 which would pass via lead 669a and OR gate 690 from setting flip flop 691. The now-low, not-one output of flip flop 644 also passes through AND gate 541' and OR gate 608 to inhibit AND gate 536', while the now-high one output of flip flop 644 passes through AND gate 542' and OR gate 610 to enable AND gate 537'. These two events cause the mode segment 529e' to be directly connected via lead 590' and OR gate 670a to the synchronizing word segment 529m' so that the short format EE reply may be transmitted. The now-low, not-one output of flip flop 644 via AND gate 541 also inhibits AND gate 605, preventing the contents of master shift register segments 529f' through through 529l' from being shifted when the reply to this EE call is made.

It will be understood that another of the key features of the invention lies in the reduction of synchronous garble; this is accomplished by the insertion of a random delay in the reply to the EE interrogation and the inclusion of a code representing the delay used within the reply itself. Thus, the interrogator may determine the correct range to the transponder. This process is actually started when the high output pulse from the EE call AND gate 629 via lead 629a sets flip flop 668. When divider 695 is enabled, its 01 10 MHz clock pulses are fed over lead 671a to a four-stage shift register 671 which is supplied with the necessary conventional feed back connections to make it serve in the usual manner as a maximum-length, pseudo-random pulse code generator; device 671 will be called a random delay generator in what follows. The four-bit code read in parallel from circuit 671 changes continuously in a pseudo-random manner.

When flip flop 668 is set, its now-high one output enables AND gate 670. Thus, the very next 02 10 MHz clock pulse from divider 695 passes via lead 667a through the enabled AND gate 670 and causes latch 672 to read and to store the delay code occurring at that instant in random delay generator 671. The same 02 clock pulse will also pass through a short delay 664 and via lead 651' to the read terminal of delay segment 529d' to cause the same instantaneously read random delay code to be read via lead 557' into shift register delay segment 529d' for subsequent transmission to the calling interrogator. The same 02 10 MHz clock pulse resets flip flop 668, permitting the passage of only one such 02 clock pulse through AND gate 670. It will be noted that the shift register of random delay generator 671 is being shifted by 01 10 MHz clock pulses, and that reading it by use of 02 clock pulses assures that readout is in between successive shifts and is therefore precise. The random delay generator may be a longer shift register or other device as long as the transmitted codes have the same meaning to all parties.

As has previously been discussed, the I-T device, when in the transponder mode, normally waits 30 counts (3 microseconds) after receipt of a valid call before replying. In the reply to an EE call, the count of 63 from counter-decoder 674 represents zero random delay. Counter-decoder 674 also has 15 additional output pulses, ech successively delayed by eight counts from the preceding count. The maximum random delay occurs at the count of 183, corresponding to 0.96 nautical miles in range. The 16 outputs of the counter-decoder 674 are connected in parallel by leads 673a to a conventional one-of-16 multiplexer 673. Which count is passed through multiplexer 673 is determined by the pseudo-random four-bit code entering from latch 672.

Whichever random delay signal is accordingly passed by multiplexer 673 and lead 673b and OR gate 690 will set flip flop 691. The now-high one output of flip flop 691 enables AND gate 686b, enabling 01 10 MHz clock pulses to pass through OR gate 585' and to shift the message now stored in master shift register 529' to transmitter 44 for radiation by omnidirectional antenna 37 and for receipt by the calling interrogator. The radiated message consists of the synchronizing word of segment 529m', the EE mode code of segment 529e', the random delay used in this particular transmission that was found in random delay segment 529d', the own ship address of this transponder from the C'DPA segment 529c', and the address of the calling interrogator of the C'GPA segment 529b'. As the message is being shifted through the master shift register, its parity is monitored by parity generator 576' and will be made odd, as required by the make-up of the foregoing message.

The transmission requires 47 shift pulses to clear register 529', a count controlled as follows. When flip flop 644 is set, its now-high one output on lead 644a enables AND gate 693. When flip flop 691 is set, its now-high one output passes through AND gate 693 to enable the divide-by-47 circuit 694; divider 694 then counts 01 10 MHz clock pulses. When the count reaches 47, the output of divider 694 resets flip flops 643 and 644 via lead 644b. It also passes through OR gate 692 to reset flip flop 691 and passes through OR gate 688 to reset flip flop 689.

The now-low one output of flip flop 691 inhibits AND gate 686b, stopping the shifting of the main shift register 529'. The now-high, not-one output of flip flop 691 resets divider 694. The now-high, not-one output of flip flop 689 enables AND gate 684, permitting any subsequent message video to enter delay device 683. The now-high, not-one output of flip flop 689 also resets divider 695 and, via lead 674c, resets counter-decoder 674. This event completes the reception of the EE call and places the I-T device in condition to receive the next incoming call.

RECEIVING AND REPLYING TO A LONG FORMAT CALL

Whenever a synchronizing word is detected, flip flops 687 and 689 are set and signal processing continues, as described previously in the section entitled RECEIVING AND REPLYING TO AN EE CALL, until the test pulse at the count of 33 from OR gate 665 actually makes the EE call test. As a long format call is being made, the variable data words making up the first part of the LF call will, at the thirty third count, not be fully distributed along the master shift register 529'. As has been observed, care is taken to see that no selected arrangement of words in the variable data portion of the call ever looks like the mode code word 1 1 0 1, so that portion of the long format message in the mode code segment 529e' at the count of 33 of counter-decoder 674 will not be the mode code 1 1 0 1. As a result, the EE call AND gate 629 is not enabled at the count of thirty three and the count will continue. Thus, the continuing flow of 01 10 MHz clock pulses passing through AND gate 686a and OR gate 585' continues to shift the remaining message through master shift register 529'. This process continues until the long format test pulse occurs at the count of 72 of counter-decoder 674.

The seventy second count pulse enables AND gate 667, permitting the next 02 10 MHz clock pulse to pass via lead 667a through gate 667 and OR gate 665 to cause comparators 579', 580', and 581' and parity checker 589' to test for a valid LF call addressed to own ship's I-T device.

If the call is such a valid call, the parity will be correctly odd, comparator 581' will not find own ship's address OSA in the C'GPA register segment 529b', comparator 580' will find the OSA code in the C'DPA segment 529c', and mode decoder 577' will not find an EE mode code in mode code segment 529e'.

As a result, the low coincidence output from comparator 581' on lead 624 inhibits both the respective EE reply and LF reply AND gates 631 and 632. The low output of mode decoder 577' on lead 627 inhibits EE call AND gate 629, but the high coincidence output of comparator 580' via lead 626 and the high correct parity output of parity checker 589' via lead 590' enable the long format call AND gate 630. The output pulse from AND gate 630 passes from FIG. 6A via terminal 639a to perform whatever processing is required by the received mode code as will be further described. The output pulse from AND gate 630 will also be passed through delay 622 and OR gate 604 to cause the variable data called for by the mode code to be read into the various variable data segments 529f' through 529l' shown symbolically in FIG. 6A. The delay through delay device 622 must be more than 100 nanoseconds (one count) in order to permit the output pulse from AND gate 630 to cause read out, via terminal 531' of any incoming data in shift register segments 529f' through 529l' before it is destroyed by new data being read in by the output of delay device 622.

Furthermore, the output pulse from AND gate 630 will accomplish certain other functions. It will pass through OR gate 635 and via lead 636 and OR gate 640 to reset flip flop 687 and to clear parity checker 589'. The now-low one output of flip flop 687 inhibits AND gate 686a, stopping the flow of 01 10 MHz clock pulses from shifting the message farther along shift register 529'. The now-low one output of flip flop 687 also inhibits AND gate 588' which, in cooperation with the inhibited AND gate 684, prevents any further message video from disturbing the reply to the long format call. The output of AND gate 630 also passes through OR gate 635 to set flip flop 643. The now-low not-one output of flip flop 643 inhibits the count of 73 from passing via lead 645b through AND gate 645 and OR gate 688 for resetting flip flop 689.

As before, the failure to receive either a valid EE or LF call addressed to own ship's I-T system after a synchronizing word decode leaves flip flop 643 in its reset condition, permitting the count of 73 to pass through AND gate 645 and OR gate 688 and to reset flip flop 689, readying the I-T device to receive another call.

Given a valid LF call decode so that flip flop 689 remains set, the result is that counter-decoder 674 continues to count the 01 10 MHz pulses from divider 695. As an EE call was not detected at the count of 33, flip flop 644 remains reset. Its now-high, not-one output pulses on lead 646 enables AND gate 669, permitting the count of 102 from counter-decoder 674 to pass via lead 669a through OR gate 690, setting flip flop 691.

At this time, the high, not-one output of flip flop 644 continues to pass through AND gate 541' and OR gate 608 to enable AND gate 536', while its now-low one output passes through AND gate 542' and OR gate 610 to inhibit AND gate 537'. This arrangement leaves the output of mode segment 529e' connected through OR gate 573' and AND gate 536' to the 529f' segment of shift register 529'. The 529e' shift register segment is connected via OR gate 510' to the synchronizing word segment 529m'. In this manner, the entire master shift register remains connected to reply to the long format call.

The now-high, not-one output of flip flop 644 also enables AND gate 605 via AND gate 541' permitting the 01 10 MHz clock pulses from OR gate 585' to shift the variable data as well as the control data through shift register 529' when the time comes to make the reply.

When flip flop 691 is set upon the arrival of the one hundred second count pulse, it enables AND gate 686b, permitting the 01 10 MHz clock pulses to pass through OR gate 585' and AND gate 605 to shift the reply message now stored in the master shift register 529' to the transmitter 44 for radiation by omnidirectional antenna 37 to the calling I-T system. The now-low, one output of flip flop 644 passes along lead 644a and inhibits AND gate 693, leaving divider 694 in its reset condition. The master shift register shifting process continues until the count of 188 from counter-decoder 674. This latter count pulse passes via lead 674a through OR gate 688 to reset flip flop 689 and through OR gate 692 to reset flip flop 691. As previously explained, resetting flip flops 689 and 691 in conjunction with the previously set flip flop 687 readies the I-T transponder to receive the next incoming call. In this manner, the descriptions of the master timing and control functions of the invention and the associated apparatus is completed. These are the functions needed in the interrogate mode to transmit EE and LF calls and to receive corresponding replies and needed in the transponder mode to receive and reply to incoming EE or LF calls.

PROCESSING THE REPLY TO AN EE CALL: FIRST ARRANGEMENT

As has previously been noted, it is inherent in the system so far described that EE replies from closely spaced ships aligned on a same azimuth with respect to own ship generally overlap upon arrival at own ship. As a means for reducing the effects of such synchronous garbling, a random time delay is inserted at the interrogating I-T device in each reply so that there is a positive probability of replies being usefully received in non-overlapping relation. However, this strategem causes a serious problem where range to each target ship is to be measured. According to the invention as thus far described, the consequent range error is removed by transmitting the reply from ship B with a data group representing the particular time delay used in each individual successive reply. At the interrogating I-T station, each particular delay is then subtracted from the measured range so as to yield true target range.

Within own ship's interrogating device, the prescribed time or range delay is readily subtracted from the measured range to arrive at the true range of the replying transponder. As to displaying the range-corrected returns on the type P display 21, however, the corrected range becomes available only after the range sweep on indicator 21 has passed that corrected range value. Therefore, the corrected range data is stored and is played back at the time of the next occurring radar range sweep.

An important additional difficulty appears in that the delayed replies are generally not received in the actual order of increasing range and so must be sorted and stored so as to be available in their actual order of increasing range. A preferred arrangement for providing the necessary range correction and sorting the sweep-to-sweep storage will be discussed in connection with FIGS. 7A, 7B, and 7C, which figures illustrate the details of apparatus particularly concerned with range sorter 207 of FIG. 2.

Figure 7A:
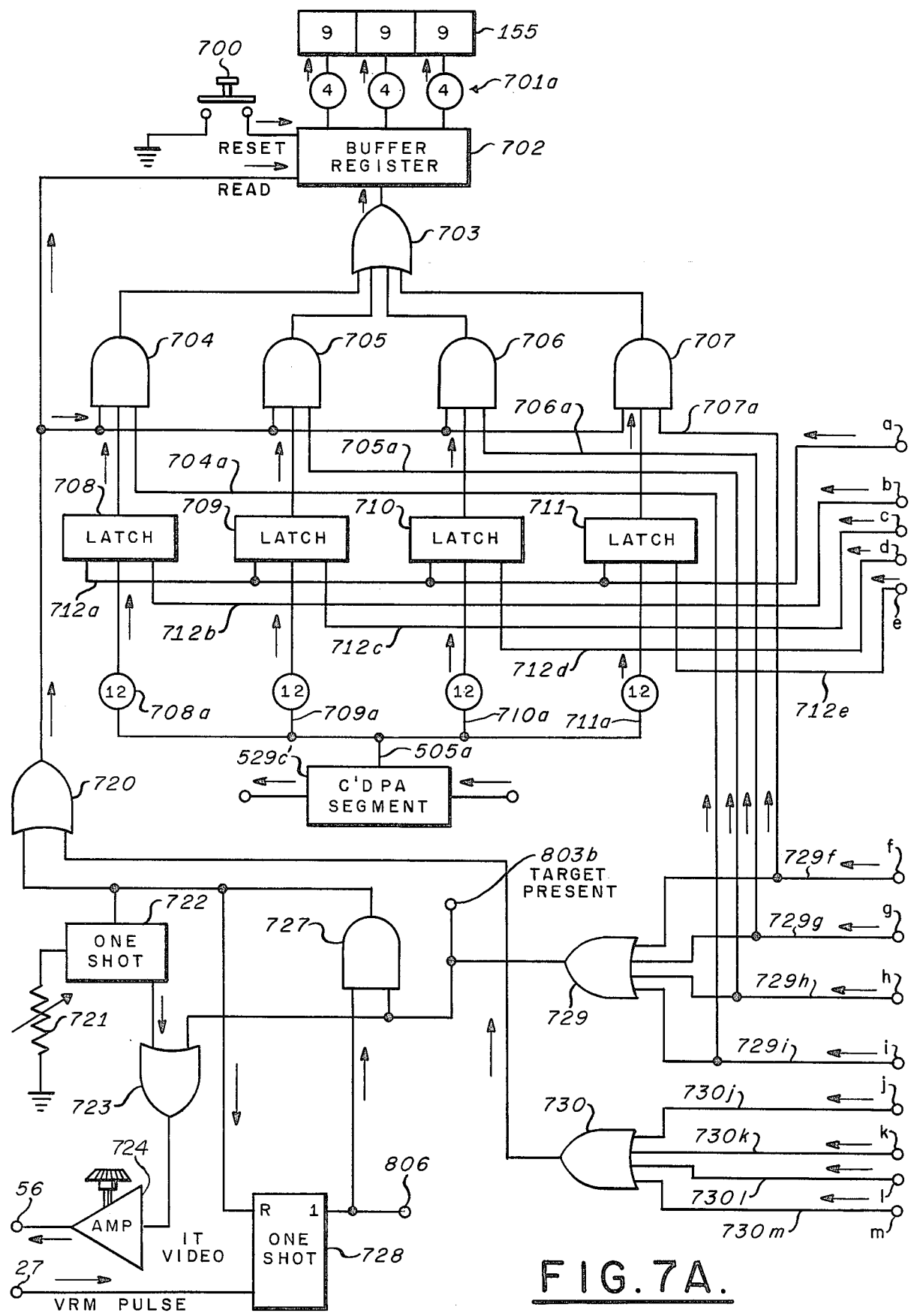
Figure 7C:
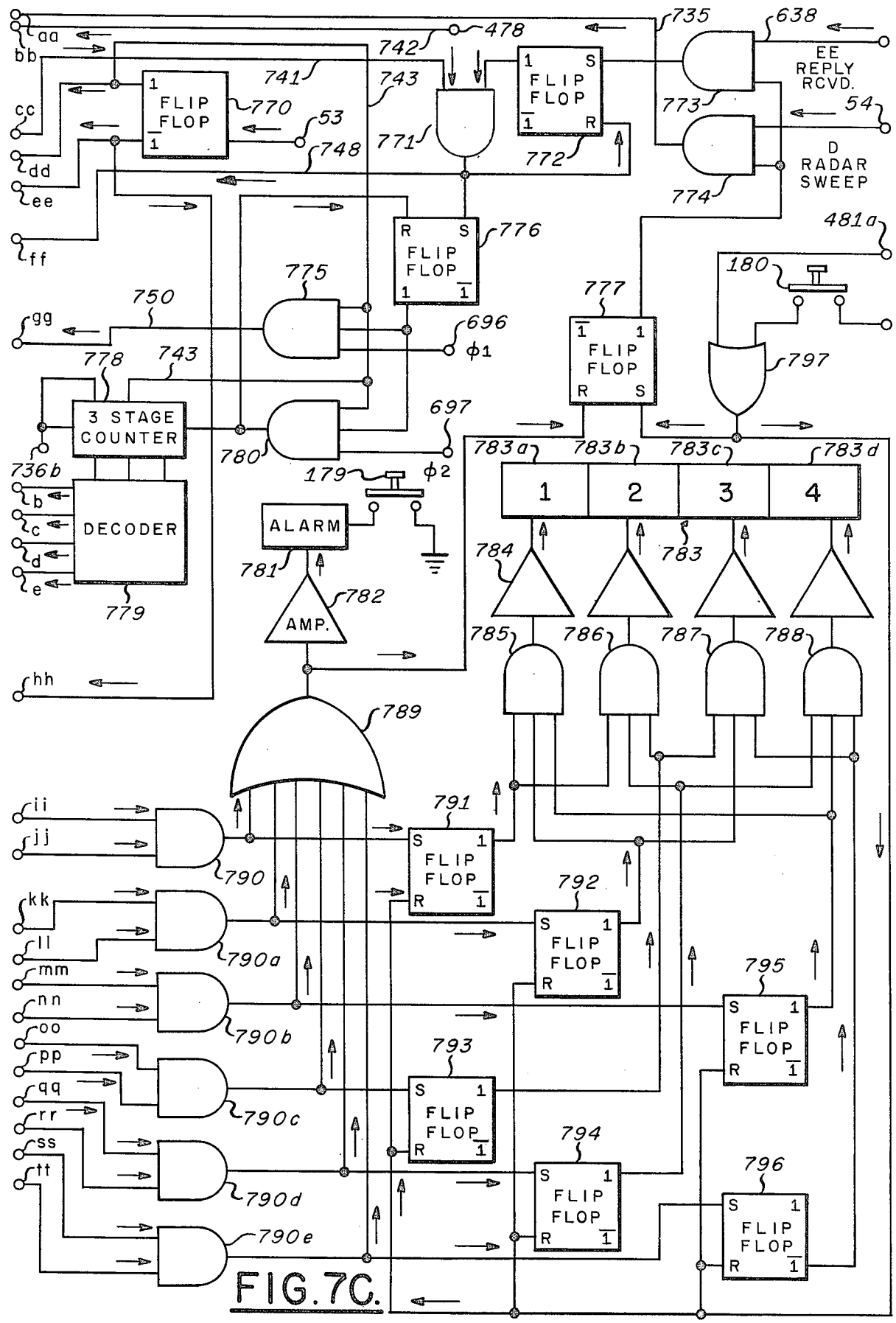

The system of FIGS. 7A, 7B, and 7C is advantageous because of its relative simplicity, and is generally suited for use in most applications though in the specific form illustrated, it is intended adequately to handle the situation in which there are expected to be relatively few ships, such as the four ships on the same azimuth with respect to own ship at any one time used in the example.

Shown as element 407 in FIG. 4A and in more detail in FIG. 7B as the twelve stage counter 739 amd divider 740, the binary range counter 739 is started by the delayed sweep trigger pulse from terminal 54 flowing via enabled AND gate 774 along lead 735 to the set terminal of flip flop 737, setting flip flop 737. The now-high, one output of flip flop 737 enables the twelve stage binary counter 739 and also enables divide-by-8 circuit 740, which latter then starts to count the 01 160 MHz clock pulses on the input lead 742 of divider 740. While other divisors may be selected, the present invention is illustrated as using the divisor eight within divider 740, so that its output clock frequency is arbitrarily 20 MHz.

To effect the subtraction required to produce the target's correct range, the multiple lead output 738 of the twelve stage binary counter 739 is connected via AND gate 747 to the conventional latch circuit 746, which has a multiple lead output 746a to the conventional twelve bit subtractor 745. Delay word segment 529d' of the master shift register 529', which contains the code for the delay used in the discrete reply, is connected via multiple leads 558 as a second input to subtractor 745. The outputs of delay segment 529d' are in particular coupled by multiple leads 558 to inputs of subtractor 745; the lowest significant bit output of delay word segment 529d' is connected to the $2^4$ terminal of the delay word input of subtractor 745, the next higher bit to the $2^5$ terminal and so on. The $2^1$ through the $2^3$ and the $2^8$ through the $2^{12}$ terminals of subtractor 745 are grounded as generally shown in FIG. 7B at level zero. In this manner, the inserted range error is removed and the output of subtractor 745 on the multi-conductor connecting cable 752 contains the correct range to the particular transponder operating at that moment of time. As will be explained, the ranges are stored in the order received by latches 753 through 756.

As the nominal frequency of the output of divide-by-8 circuit 740 was selected as 20 MHz, each 02 20 MHz pulse follows a preceding 01 20 MHz pulse by 25 nanoseconds. Once operating, the divider 740 and binary counter 739 run continuously until the arrival of one of two pulses, whichever arrives first on terminal 736a or 736b. These pulses are the end-of-radar-sweep pulse and the memory-full pulse from the three stage counter 778 of FIG. 7C, respectively. The arrival of either pulse via OR gate 736 resets flip flop 737, whose now-high, not-one output resets all stages of circuits 739, 740. By virtue of this relatively simple apparatus, the incoming replies are received and their corrected ranges and addresses are stored and then displayed on cathode ray tube 21 on its very next range sweep.

The selection between the storage and the read out operations is made by the toggled flip flop 770 of FIG. 7C; this flip flop changes state with the receipt of each undelayed radar synchronizer trigger pulse on terminal 53. In the storage operation, the one output of flip flop 770 is high and AND gate 747 is enabled. The enabled AND gate 747 connects the output terminals of binary counter 739 via leads 738 to the input side of latch 746 so that for each valid-EE-reply received pulse arriving on lead 748, latch 746 is enabled and the range of each responding transponder is stored. The next succeeding undelayed radar synchronizer trigger on terminal 53 initiates the read out operation by toggling flip flop 770. Its now-high, not-one output enables AND gate 749 (FIG. 7B), connecting the multiple terminal output side of binary counter 739 in parallel via multiple leads 738 and 761 to one side of each of the four comparators 757 through 760. Whenever the content of range counter 739 matches a corrected range stored in one of the latches 753 through 756, a target-present pulse is generated; thus, target-present signals are generated at the correct range, but are delayed by the insignificant time required for one radar range sweep.

In further detail, operation of the apparatus of FIGS. 7A, 7B, and 7C beginning at the start of the storage phase starts when, with the arrival of a radar synchronizer pulse at terminal 53, the one output of flip flop 770 goes high and via leads 743 and 712a, resets or clears latches 708 through 711 and via lead 751 resets or clears latches 753 through 756, making them ready for the receipt of new data. The one output of flip flop 770 also enables AND gate 747 and, via lead 743, three stage counter 778, and partially enables AND gates 775 and 780. The now-low, not-one output of toggled flip flop 770 inhibits comparators 757 through 760, making the system ready to store the range and address of each reply received during the immediate radar range sweep.

Action begins upon the arrival of the delayed radar sweep trigger pulse from terminal 54 of FIG. 4A associated with AND gate 774 of FIG. 7C; it passes through AND gate 774 to set flip flop 737. The functions of AND gates 773 and 774 remain to be further explained, since it is now proposed to discuss, by way of example, reception of two replies at the same corrected range as a worst case example.

The now-high one output of flip flop 737 enables divider 740 and counter 739 and the divider 740 immediately starts to divide down the 01 160 MHz clock pulses arriving on lead 742 from terminal 478 of FIG. 4B. In this manner, the range binary counter 739 is started at the proper time and it continues to count until stopped by the arrival of a memory-full or radar end-of-sweep pulse which resets flip flop 737. While the latch 746 is connected to the binary counter 739 during the storage cycle, reception of a valid EE reply sends, at the end of count 33 of counter-decoder 674 of FIG. 6B, a pulse via lead 638 and AND gate 773, which sets flip flop 772. The now-high one output of flip flop 772 enables AND gate 771, permitting passage via leads 741 and 748 of the very next 02 20 MHz clock pulse to the latch 746; this clock pulse causes latch 746 to read the content of binary counter 739 and to store the range read at that instant.

The high output pulse from AND gate 771 is fed back to reset flip flop 772, assuring that the range data will be read only once for each EE reply. It will be understood that this stored range includes the differential range increase corresponding to the particular random delay associated with the particular reply. The pulse from flip flop 772 and AND gate 771 also sets flip flop 776; thus, AND gates 775 and 780 are both enabled in the presence of the now-high one output of flip flop 770. The enabling of AND gate 775 permits passage of the very next 01 10 MHz clock pulse from divider 695 via terminal 696 and lead 750 to subtractor 745, causing it to read via multi-conductor 746a, the range data stored in latch 746 as well as to read via leads 558 the particular random range delay value stored in the delay word segment 529d' of the master shift register 529' and thus to perform the desired subtraction.

At this instant in time, the controlling clock function is transferred from the 20 MHz range clock signals to the 10 MHz clock receiving clock signals for permitting slower processing. Time is conveniently available, since successive replies must be separated by at least an EE call length (or in this example about 4.6 microseconds) to prevent overlapping.

The 02 10 MHz pulse from receiving divider 695 found on terminal 697 following the subtraction event passes though AND gate 780 and causes three stage counter 778 to advance from zero to the count of one. This event causes the one output lead of one-out-of-five decoder 779 to be raised to its highlevel. The same following 02 10 MHz pulse resets flip flop 776, inhibiting AND gates 775 and 780 and thereby blocking the flow of further 01 and 02 10 MHz clock pulses so as to ensure only one reading per decode of the EE reply of latch 746 and of the delay segment 529d'. the now-high one output of the one-of-five decoder 779 causes the content of subtractor 745, which is the correct range of the replying transponder, to be read into latch 756. At the same time, it causes via lead 712e the address of the replying transponder stored in the C'DPA shift register segment 529c' to be read multi-lead cable 711a into latch 711.

If there are additional cooperating ships in line with own ship at the instant of the radar sweep under consideration, each subsequent EE decode from terminal 638 causes the foregoing process to be repeated. Each repetition causes three stage counter 778 to advance one count so that each successive set of correct range is stored in the appropriate next lower numbered latch of latches 753, 754, or 755 and the C'DPA in the next lower numbered latch of latches 708, 709, and 710. In this manner, range and C'DPA data for a second ship are stored in the respective latches 755 and 710, range and C'DPA for a third ship in latches 754 and 709, and so on. If there are fewer than four ships in line, the process continues in the reply reception and storage state until the radar end-of-sweep pulse arrives at the terminal 736a of OR gate 736. In an example in which four ships or more lie along an own ship's azimuth line, the fourth EE decode signal causes three state counter 778 to generate a memory-full pulse for application to lead 736b of OR gate 736. In any event, the first pulse to arrive at OR gate 736 of either of the two pulses will, via OR gate 736, reset the 12 stage binary counter 739 and the divider 740, stopping all further processing until the next undelayed radar synchronizer trigger pulse toggles flip flop 770.

The read out operation begins when the very next radar synchronizer pulse on terminal 53 toggles flip flop 770. Its now-high, not one output enables AND gate 749 and the comparators 757 through 760. Then, after the occurrence of the next radar synchronizer trigger pulse, the delayed sweep trigger pulse arrives at terminal 54 of FIG. 7C, setting flip flop 736 via AND gate 774 and lead 735, as explained, restarting the range counter components 739 and 740.

As AND gate 749 is enabled, the output of range counter 739 is connected via multi-conductor cables 738 and 761 in parallel to one side of each of the comparators 757 through 760. The other sides of the comparators are respectively connected in increasing order to latches 753 through 756 wherein are stored any corrected target range data received during the previous cycle. As a result, when the range count in the 12 stage binary counter 739 is equal to the range of the closest-range stored target, a pulse is emitted from the coincidence output of the appropriate one of the set of latches which, of course, need not be the particular latch that first received target range data. As the count of binary counter 739 continues, each latch with a stored range will generate a coincidence output when the appropriate range count is reached. In this way, a target-present pulse is generated and read out at the correct time and always in the order of increasing range.

The coincidence outputs of comparators 757 through 760 are respectively connected by leads 757a through 760a through OR gates 765 through 762 to inputs of OR gate 729. Thus, all of the coincidence outputs or target-present pulses that are the final results of valid EE replies in one radar sweep pass through OR gate 729, OR gate 723, and driver amplifier 724 to terminal 56 and thence via lead 31 to the intensifier grid 29 of cathode ray tube 21. These pulses brighten the phosphor screen of type P display tube 21 in coincidence in time and location with the action of the corresponding radar echoes, resulting in enhancing the display of the desired target echo, this being another of the principal features of the apparatus involved in making the EE call. The gain of driver amplifier 724 is manually adjustable so that the amplitudes of the I-T signals may be controlled independently of the amplitudes of the radar signals. The operator is therefore free to increase the gain of the I-T signals and to decrease radar gain when the radar presentation is seriously cluttered.

An important feature of the apparatus concerned with making the EE reply lies in means for identifying the address of a cooperating transponder. In this process, the operator selects the target to be identified by first setting the range marker of type P indicator 21 just ahead (nearer own ship in range) of the selected target and then, as the radar scan line approaches the location of the target presentation, holds down the EE interrogate key 180 until the scan line passes through the azimuth of the target. At that time, a characteristic demarcation line grows radially outward from the target presentation and the C'DPA or target address appears on the readout 155 of the I-T control display panel (FIG. 1B).

An explanation of this operation may conveniently be made by way of an example in which the selected target's range happens to be stored in latch 755 and, therefore its address is stored in the corresponding latch 710. Now, as previously explained, when the increasing range count in the 12 stage binary range counter 739 equals the range stored in latch 755, there will be an output on the coincidence output lead 759a of the corresponding comparator 759. This output will pass through OR gate 763 and via lead 729g through OR gates 729 and 723 and driver amplifier 724 to brighten the screen of indicator 21 in the proper place. At the same time, the lead 729g output will flow on lead 706a and will partially enable AND gate 706 which connects latch 710 to the C'DPA readout 155 via OR gate 703 and buffer register 702. AND gates 704, 705 and 707 function in a similar manner.

When the variable range marker pulse arrives from the radar terminal 27, it triggers one shot 728. One shot 728 remains conducting for a time suitable to allow operation of the variable range mark to capture the address of the target. The high one output of one shot 728 enables AND gate 727, which acts as the radar range gate.

As the operator has adjusted the variable range marker to the selected target's range, AND gate 727 opens very shortly before the arrival of the coincidence pulse from comparator 759. As a result, the coincidence pulse passes through the AND or range gate 727 and does two significant things. The first is to trigger one shot 722 so that its now-high output is fed back through OR gate 723 and hence through driver amplifier 724 to indicator 21 for forming the radially outgrowing demarcation line from the selected target, thereby confirming that the operator has identified the selected target. The length of the radial demarcation may be adjusted by operator manipulation of variable resistor 721, for example. Secondly, the output of AND gate 727 is fed back to reset one shot 728, thus ensuring that data in the next storage element, even if it has nearly the same range, will not also be read out, undesirably garbling the previously read out data.

At the same time that the foregoing action is taking place, the coincidence pulse from AND gate 727, via OR gate 720, completes the enabling of AND gate 706 and enables the readout of buffer register 702. This causes the C'DPA data stored in latch 710 to read into buffer register 702 and then to appear via cables 701a in the C'DPA readout 155 of control and display panel 47. This address will remain displayed by readout 155 until a new address obtained in the same manner displaces it or until the operator pushes key 700. The next arriving radar synchronizer trigger pulse returns the circuit to its initial mode and the process cyclically repeats. Though the input data for alternate other radar range sweeps are lost, this matter is not of significance because marine radar systems are conventionally designed to provide at least five hits per target per scan and targets are not normally missed.

A further problem solved by the invention results from the fact that the jittered or random range delay injection of the apparatus as so far described may result in the attempted storage in different storage elements of data concerning two targets if at substantially identical ranges. As a result in the read out operation, when the range count equals the corrected range number common to the two targets, there would be simultaneous coincidence outputs from two of the comparators in the set 757 through 760. If the two targets were those to which the variable range market had been set in range, both C'DPA addresses would be presented to buffer register 702 and, being garbled, wrong data would be presented.

According to the invention, this malfunction is prevented by apparatus now to be described. The four coincidence outputs 757a, 758a, 759a, 760a of the set of comparators are respectively connected to six AND gates 790, 790a, 790b, 790c, 790d, and 790e, as illustrated in FIG. 7C, the connections representing all possible combinations of the four outputs taken two at a time. As a result, if there are two targets at substantially the same azimuth and corrected range, there will appear simultaneous coincidence pulses at two of the inputs of one of the set of AND gates 790 through 790e.

For example, assuming that the troublesome target data was in the first latch or latch 756 and in the third latch or latch 754, only the consequent instantaneous coincidence outputs of comparators 760 and 758, respectively, would arrive simultaneously at the inputs of AND gate 790a, producing an output indicative of the specific situation.

The coincidence output of the representative AND gate 790a, for example, plays three roles. First, it sets flip flop 792. Second, it passes through OR gate 789 to reset flip flop 777. Third, it passes through OR gate 789 and amplifier 782 to activate an audible or visual alarm 781. The now-low one output of flip flop 777 inhibits AND gates 773 and 774. As a result, the read out operation will be completed, but further processing of incoming replies is inhibited.

The first part of the read out operation is completed when the now-high, one output of flip flop 792 passes through AND gate 785 and amplifier 784 to activate light or display element 783a, so that an illuminated numerical one is seen. The same now-high one output of flip flop 792 simultaneously passes through AND gate 787 and an amplifier similar to amplifier 784 to the display element 783c, so that an illuminated numeral three is seen.

After deactivating alarm 781 by pressing the silencing key 179, the operator is now ready to find the actual addresses of the two troublesome targets. The keys 769a through 766a are physically close to the respective lights 783a through 783d; to find the address associated with the numeral one of display element 783a, the operator presses key 769a of the plurality of keys 766a through 769a, setting one shot 769. One shot 769 relaxes, for example, after about a 100 nanosecond interval, producing a pulse similar in character to a coincidence output of one of the comparators 757 through 760. Then, the output of one shot 769 will, via OR gate 762 and lead 729f, partially enable AND gate 707 which, when completely enabled, will connect the output of latch 711 via AND gate 707 and OR gate 703 to the input of buffer register 702. At the same time, the output pulse from one shot 769 passes via lead 730j through OR gates 730 and 720 to complete the enabling of AND gate 707 and also the enabling of buffer register 702. The C'DPA stored in latch 711 is read into buffer register 702 and appears in readout 155.

To find the address of the second vessel identified by the illuminated numeral three in display element 783c, the operator pushes key 767a which triggers one shot 767. Referring to FIGS. 7A and 7B, the output of one shot 767 passes through OR gate 764 and via leads 729h and 705a partially enables AND gate 705 and will pass, via lead 730l, through OR gates 730 and 720 to complete the enabling of AND gate 705 and to complete the enabling of register 702. As a result, the C'DPA associated with the second ship and the numeral three of display element 783c will appear in the C'DPA readout 155.

Normally, the ambiguity problem will be limited to two target vessels substantially at the same range, though theoretically, three or more vessels might have closely similar ranges and be close enough together in azimuth so as to fall in own ship'radar antenna pattern. In the unusual case of three such targets, the coincidence outputs of the comparators would pass through corresponding AND gates, setting three flip flops and lighting the required three display elements. Should there be four such vessels, all four display elements of display 783 would be illuminated in a similar manner. In any event, the operator may determine the actual addresses of either of the three or the four targets in the same manner as used with only two targets. Accordingly, it is seen that the novel construction fully overcomes problems of the prior art, yielding an arrangement useful with great flexibility in a variety of possible situations. When the operator has completed the identification, flip flop 777 is set and the next interrogation is started via OR gate 797 when the operator holds down the EE interrogate key 180 or when, via terminal 481a, the output of OR gate 797 goes high as the result of any type of interrogation. This act also resets flip flops 791, 792, 793, 794, 795 and 796, which event extinguishes whichever readouts 783a through 783d were illuminated.

PROCESSING THE REPLY TO AN EE CALL: SECOND ARRANGEMENT

A second embodiment of the apparatus for processing the replay to an EE call will now be presented. The second arrangement is of more complex nature than the first, but is suitable where larger numbers of cooperating vessels may appear on the same azimuth line with respect to own ship. Furthermore, this second embodiment has further advantages which will become apparent as its structure and operation are presented.

It is reasonable, in order to limit the complexity of the apparatus, to limit the number of available discrete addresses, as has been discussed. The present embodiment will again consider limitation to 999 discrete addresses, though this number is small compared to the ultimate number of vessels which might be expected to become cooperating vessels in using this invention. As a consequence, there is a finite probability that there may be found two vessels on the same one ship's azimuth with precisely the same addresses assigned to them. The second processing arrangement not only provides means for sorting EE replies into the proper order of increasing range, but also provides means for finding and displaying data about two cooperative target ship I-T systems with the same addresses that have replied to the same EE call by own ship. The operator is expected to observe a full scan of type P indicator 21 at regular intervals and to do this with the I-T system operating in its EE mode. In doing so, he will find not only all cooperating I-T equipped vessels, including those which are in line at substantially the same range, but will also locate all vessels having the same address which fall in line with own ship, a situation in which he has true interest. When such pair is found, an alarm is activated and the watch officer would call the pair of vessels by bridge-to-bridge radio-telephone, asking at least one of them to select a new address. Alternatively, one of the message codes in a selected type of call may be additionally assigned for this purpose.

The new system is shown in FIGS. 8A through 8D and, since it represents a modification of the system of FIG. 7, similar reference numerals are used where appropriate. In the FIG. 8A through 8D system, two shift register memories are used so that incoming data can be read into one while stored and sorted data is being read into the other. In this manner, incoming data is never discarded.

Figure 8A:
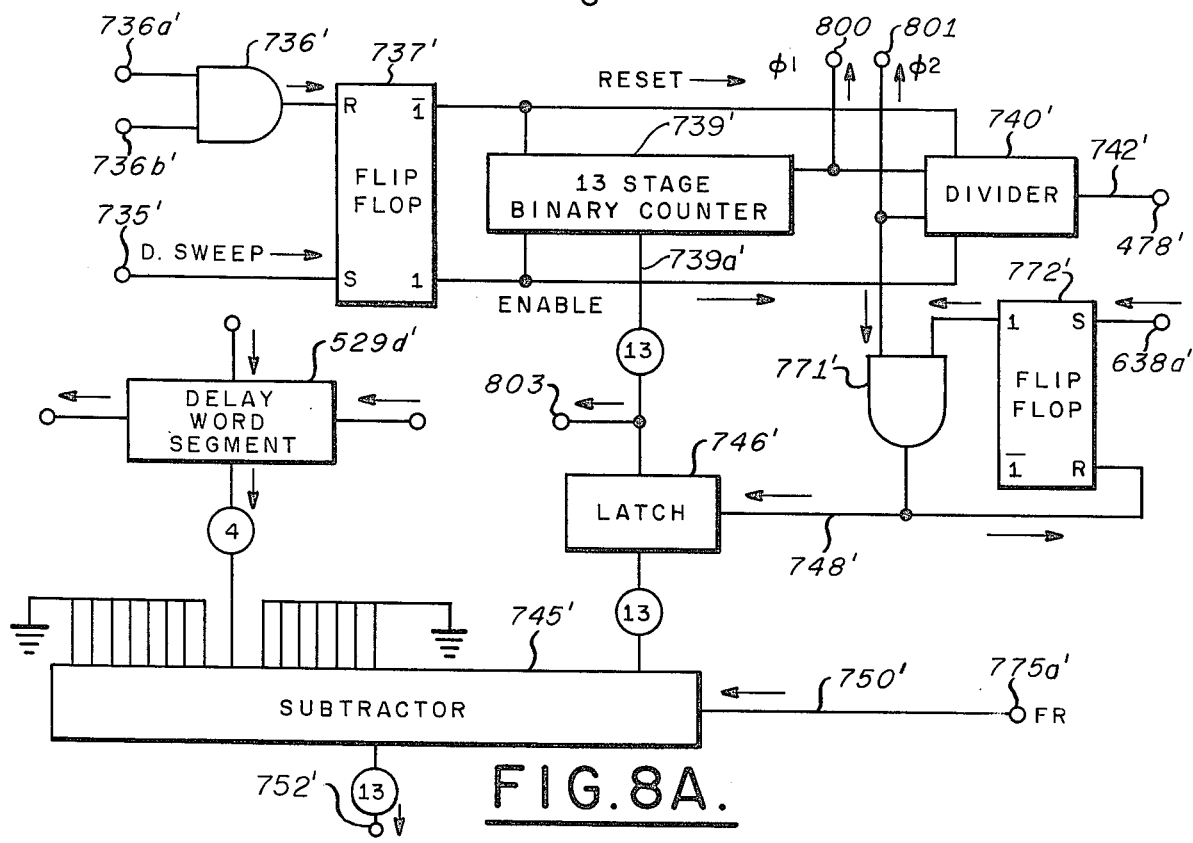
FIG. 8A represents a further form of a portion of the range measurement system of FIG. 7B.

In FIG. 8A, as in FIG. 7, a delayed radar sweep trigger arriving via lead 735' at the set terminal of flip flop 737' from AND gate 774 and terminal 54 of FIG. 7C sets flip flop 737', whose now-high one output, in turn, enables divide-by-eight divider 740' and the 13 stage binary counter 739'. As before, divider 740' immediately starts counting 01 160 MHz clock pulses arriving on terminal 478' and lead 742' from the master oscillator 222 of FIG. 4B. Operation is similar to that in FIG. 7B, except that the output of the binary range counter 739' is connected directly to latch 746' by a multi-conductor cable.

The arrival of a valid EE reply decode which occurs at the count of 32 of counter-decoder 674 of FIG. 6B at terminal 638a' of Fig. 8A sets flip flop 772'. The now-high one output of flip flop 772' enables AND gate 771', allowing the next 02 20 MHz clock pulse from divide-by-8 circuit 740' to read the range count present at that instant in binary range counter 739' in parallel into latch 746'. It will also reset flip flop 772', thus assuring that only one range reading occurs per EE reply decode. Using the 02 20 MHz clock pulse to read range counter 739' assures reading counter 739' in a settled state between 01 clock pulse times.

At the count of 33, the delay word which tells this receiving I-T device what delay the replying transponder used for the particular transmission is being stored in the delayed word segment 529d' of the master shift register. The arrival of the count 34 pulse on lead 750' then causes the content of latch 746' and of delay word segment 529d' to be read into the conventional subtractor 745'. 16 bit subtractors are readily available on the market, so use of a 16 bit device is shown by way of example. Subtractor 745' immediately subtracts the set-in random delay value from the total range count and presents the correct range at its parallel output side 752' as before.

Figure 8B:
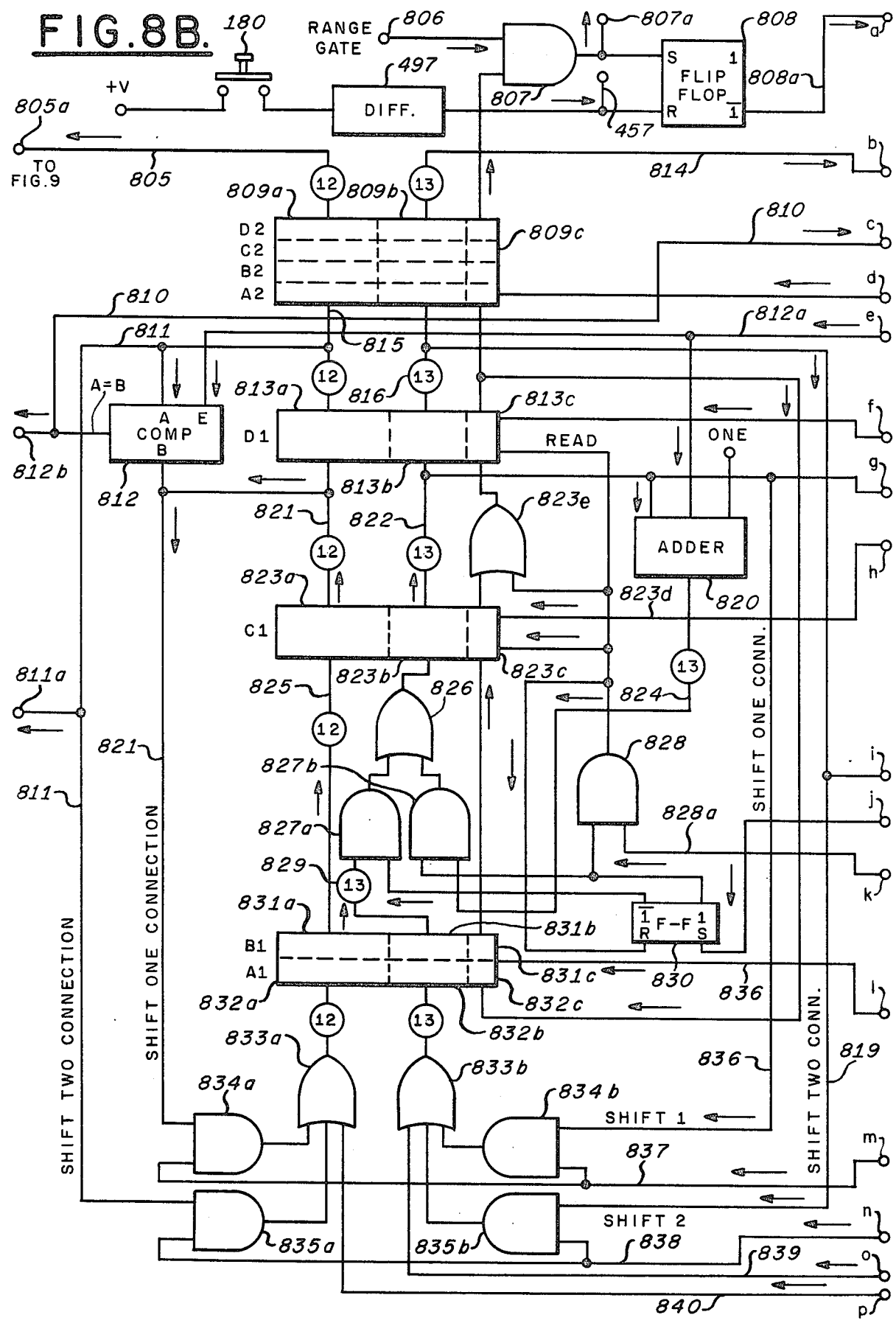
FIGS. 8B, 8C, and 8D present details of a further embodiment of the apparatus of FIGS. 7A, 7B, and 7C.
Figure 8C:
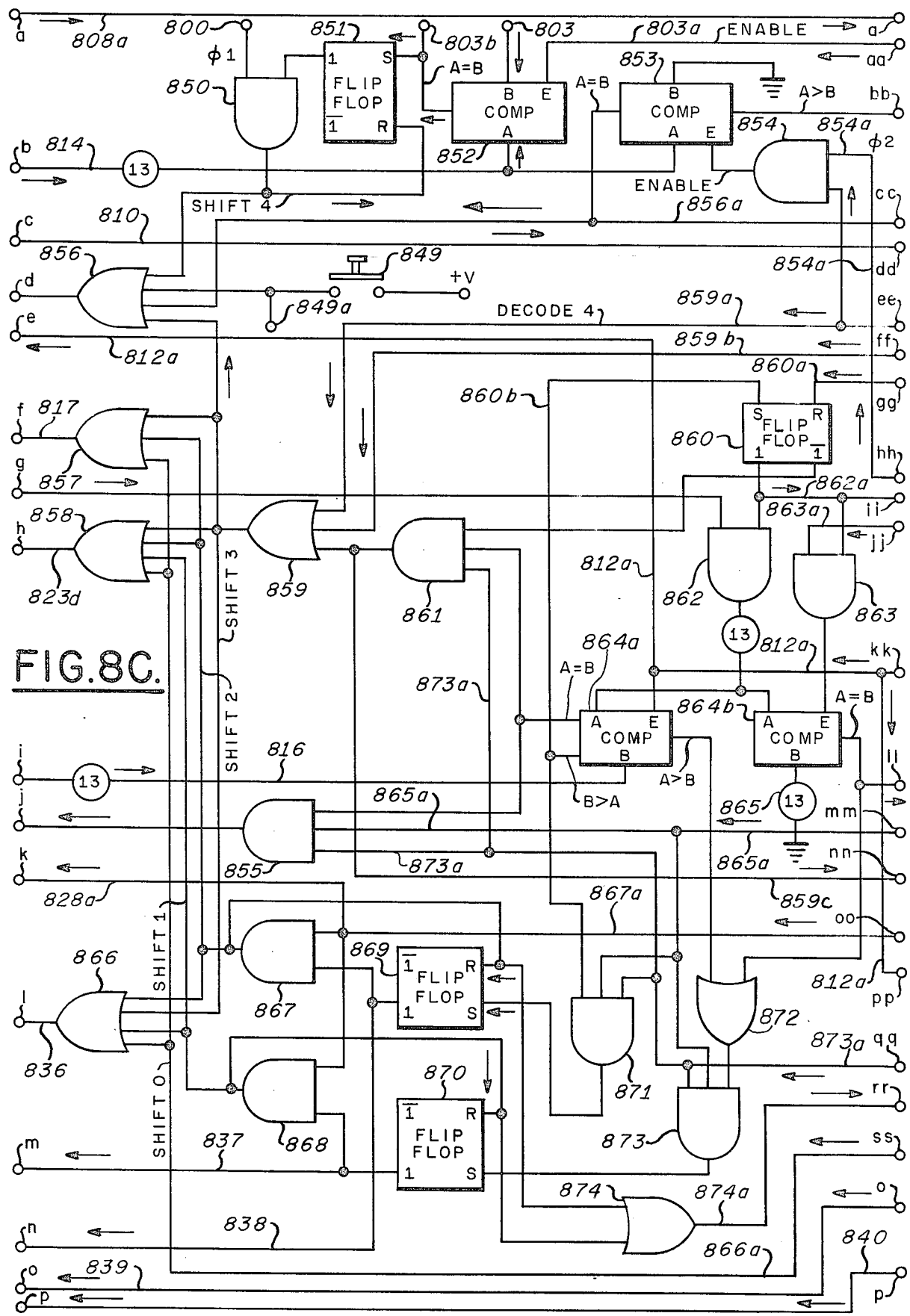
Figure 8D:
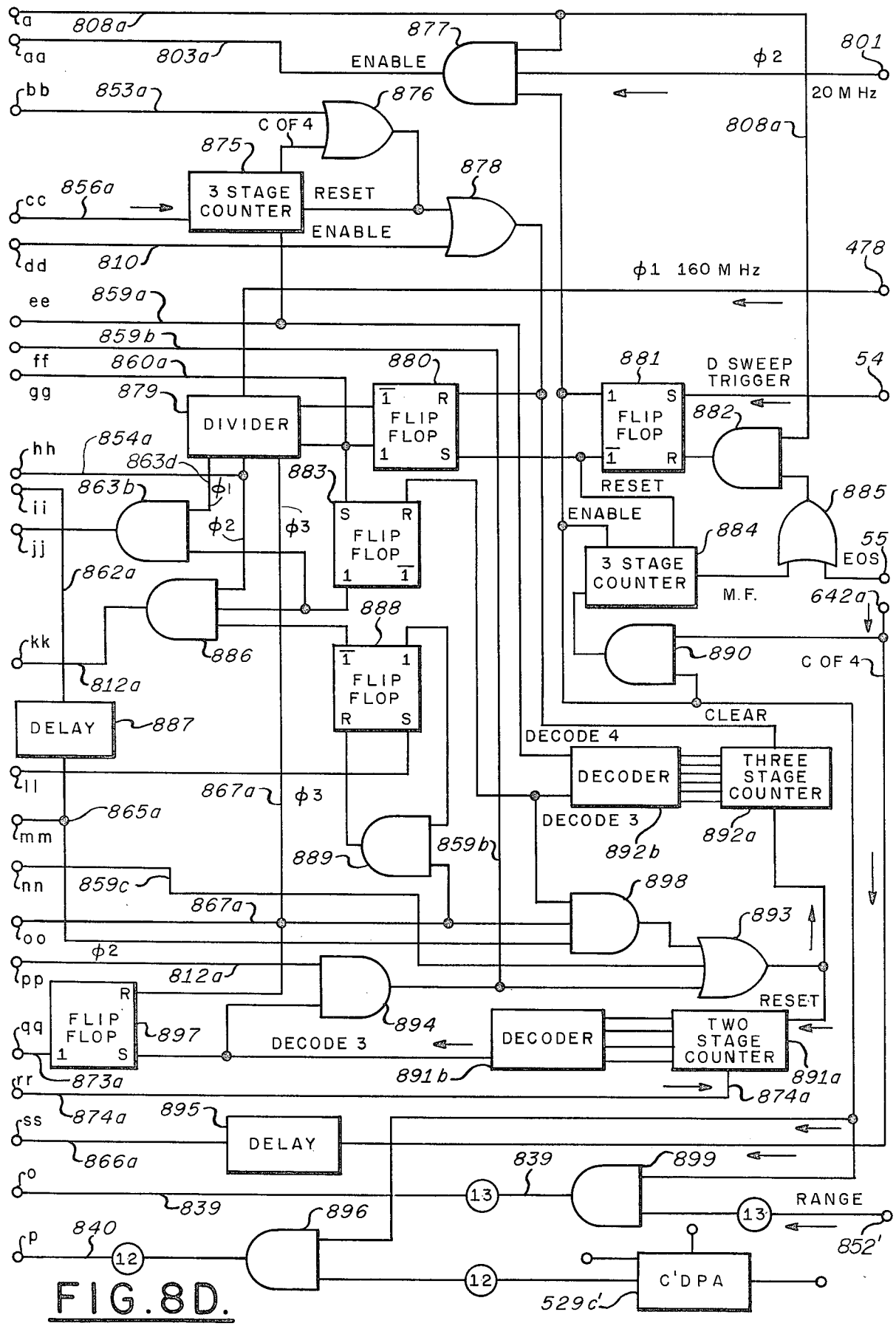

With particular attention to FIGS. 8B, 8C, and 8D, it is seen that the arrival of a delayed sweep trigger pulse, which in the EE mode occurs at the count of 122 of counter-decoder 440 at terminal 54 in FIG. 8D, resets flip flop 881. This event starts the memory loading and readout cycle of the present embodiment of the system. The now-high one output of flip flop 881 enables AND gates 877, 890, 896, and 899 and the three stage counter 884. Enabling AND gate 877 has to do with the start of the read out portion of the cycle, as will be further discussed; the memory loading portion of the operating cycle will be considered first.

In the memory loading process, when a valid EE reply is received, the associated count of 34 pulse arriving at terminal 642a in FIG. 8D passes through the enabled AND gate 890 and this event will place a one in three stage counter 884. The maximum count available in counter 884 must equal the number of rows in the four row memory composed of rows A1, B1, C1, D1 in FIG. 8B, as used in this example. It must also, of course, equal the number of rows in the four row memory composed of rows A2, B2, C2, D2. Thus, when the counter 884 reaches the maximum value of four, indicating that the memory is full, the consequent output of counter 884 passes through OR gate 885 and AND gate 882. Flip flop 881 is accordingly reset, an event which starts the range sorting process. If, however, fewer than four replies are received during a radar range sweep, the end-of-sweep pulse EOS will arrive from the radar indicator system on terminal 55 in FIG. 8D. It will pass through OR gate 885 and AND gate 882 and will reset flip flop 881, thus starting the range sorting process. Until one or the other of the EOS or memory-full pulses arrive to reset flip flop 881, the enabled AND gates 896 and 899 connect the respective outputs of the C'DPA segment 529c' and of substractor 745' of FIG. 8A via mult-conductor cables 840 and 839 throughl OR gates 833a and 833b to the input stages 832a and 832b of the input memory, respectively.

The input memory and the output memory of the range sorting system are simiar and for the sake of simplicity, the general characteristics of the structure of the output memory will be discussed first. It will be understood that these devices are conventional, so that they are illustrated in a generally simplified manner in FIG. 8B. The vertical memory section 809a, for example, includes twelve shift registers, each having four stages and arranged in parallel connection with the respective 12-conductor input and output leads 815 and 805. The vertical memory section 809a holds address data. Memory section 809b is similar to section 809a, but has 13 four-stage registers cooperating with the respective 13 conductor input (816) and output (814) leads. Section 809b stores range data. Memory section 809c has only one four-stage shift register which stores an odd bit for purposes yet to be described. The combination stores the addresses in order of range particularly so that such ordered data may be read out on plural leads 805 and 814, as is desired. While shift and other control signals are used for all three columns 809a, 809b, and 809c, they are shown entering the right side of the memory for the sake of simplifying the drawing.

The structure of the input memory system is similar, but in the drawing, certain stages are broken apart because signals must be processed between those certain stages. There is a vertical memory section including sub-sections 813a, 823a, 831a, and 832a which again comprises twelve shift registers, each having a total of four stages and arranged in parallel connection with respective 12-conductor leads such as at 825, 831 and 815. This vertical memory section again holds address data. Memory section 813b, 823b, 831b, 832b is similar to memory section 813a, 823a, 831a, 832a, but has 13 four-stage registers cooperating with respective 13 conductor leads such as lead 829, 822, 816. This section stores range data that, along with the address data, has not been placed in the desired order. Similarly, disordered data in the form of a single bit resides in a single shift register whose four sections include sections 813c, 823c 831c 832c, as will be further described. Shift and other control signal leads are again supplied for all shift registers in the usual manner. It will be understood that the row designations A1, B1, C1, D1, and A2, B2, C2, D2 correspond to the locations of the successive stages of the 26 shift registers used in this example.

As a result of having connected the respective outputs of subtractor 745' of FIG. 8A and the C'DPA segment 529c' to the input side of the respective memory stages 832a, 832b of row A1, each count 34 pulse arriving at terminal 642a passes through the short delay 895, lead 866a, and in parallel through OR gates 857, 858 and 866 and will cause a shift called a shift zero which will read the then existing corrected range count and its associated C'DPA respectively into the input memory stage including the register sections 832b, 832a of row A1, respectively. Several shift paths are required in the range sorting process as defined in the following Table 3:

TABLE 3

SHIFT PATHS FOR RANGE SORTING

Figure 9:
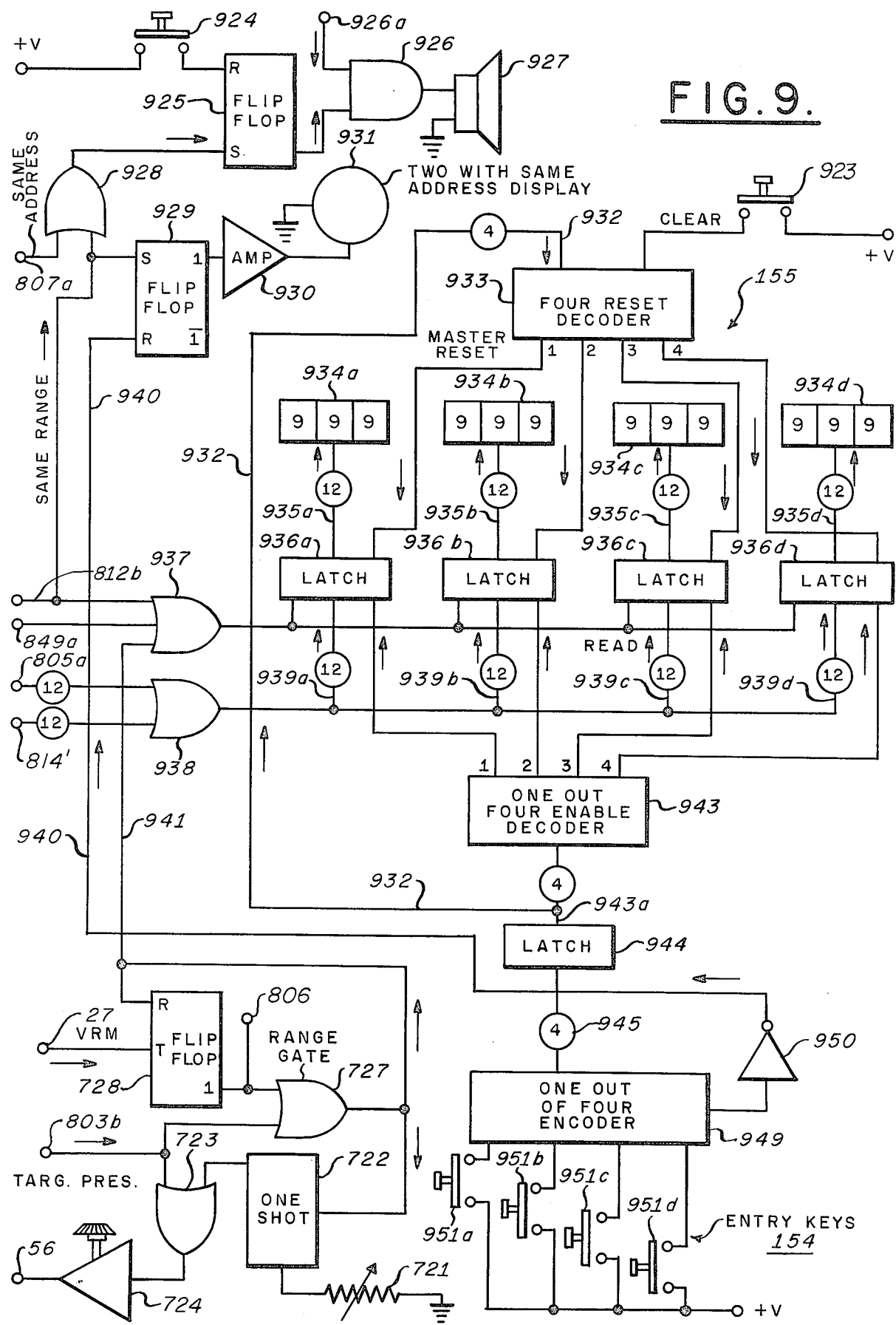
FIG. 9 is a detailed drawing of a display system cooperating with the apparatus of FIGS. 8A through 8D.

| Shift Number | Connections | Purpose |
|---|---|---|
| 0 | Source to A1 to B1 to C1 to D1 | Loads the corrected range and C'DPA data into memory stages 832b through 813b and 832a through 813a, respectively. |
| 1 | A1 to B1 to C1 to A1 | Range sorting |
| 2 | A1 to B1 to C1 to D1 to A1 | Range sorting |
| 3 | A1 to B1 to C1 to D1 to A2 to B2 to C2 to D2 | Removes the leading zeroes from memory 832b through 813b and loads the contents of the memories 832b through 813b and 832a through 813a into memories 809b and 809a, respectively. |
| 4 | A2 to B2 to C2 to D2 to latches 936a through 936d in FIG. 9. | Removes leading zeroes from memory 809b and produces |

TABLE 3-continued

SHIFT PATHS FOR RANGE SORTING

| Shift Number | Connections | Purpose |
|---|---|---|
| | | as an output from 809a C'DPA data for targets to be identified to latches 936a through 936d. |

As is seen from Table 3, shift zero not only reads the data into the memory system, but shifts the old data up one stage as new data is received. As a result, all of the replies received during one radar range sweep are stored in memories 832a, 831a, 823a, 813a and 832b, 831b, 832b, 813b, but they will often not be in the required order of increasing range with the nearest or shortest range target data in the top or D1 row of the memory stack.

The manner in which target data is sorted and reordered is generally known in the computer art as a relative sort procedure. Thus, in each cycle each range count is compared with all of the others in the memory having rows A1, B1, C1, D1 and the one with the lowest count or shortest range is transferred out of stage D1. In the next cycle, the same process is repeated and the next lowest count found in the memory is read out. The process cyclically repeats until all data has been read out of the stage D1.

Figure 8F:
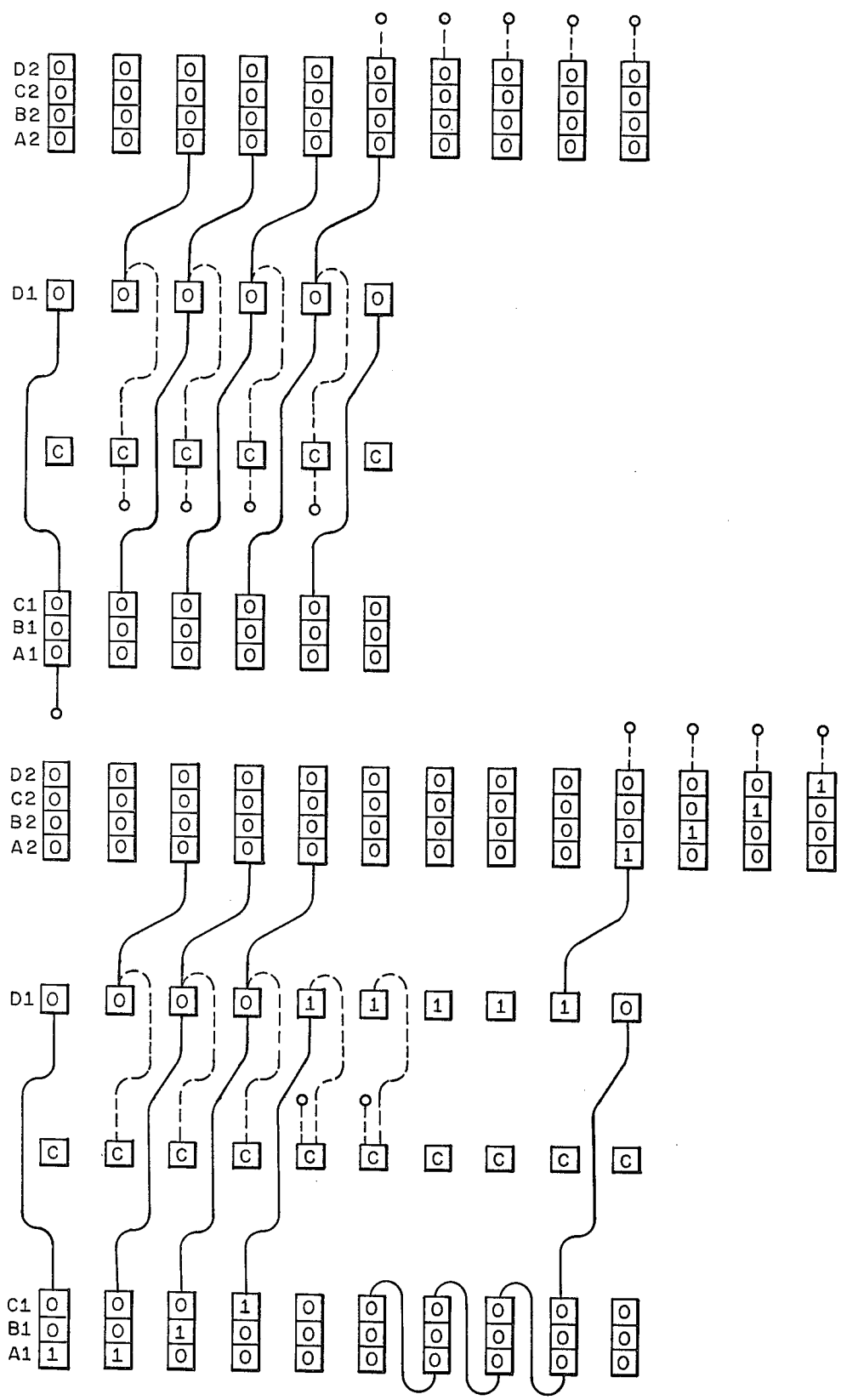

Examples of the signal flow during shift processes and the necessary connections are diagrammed in FIGS. 8E and 8F. In any one vertical column of blocks in each diagram, only one column of the dual memory system is shown; the simple integers zero through four are used to designate the range count. The small squares labelled C appearing between rows C1 and D1 are comparator elements which are associated with but not an integral part of the memories. The vertical columns are repeated once to the right for each successive action in the sortin process, so that time flows to the right in the drawing. The solid lines between the stages of memories show the electrical connections over which the data is shifted and the dotted lines show how the comparator is connected for each test; a dotted line associated with a comparator block and ending in a circle means that one side of the comparator is connected to all zero values.

Referring to Example 1 of FIG. 8E, operation of the sorting system will be understood. In this example, the loading shift zero process has, as shown in the left column, loaded the ranges 2, 4, 3, and 1 into the respective rows D1, C1, B1, and A1, respectively, and it is apparent that the memory column is full. In column 2 of Example 1, the dotted lines show the output of row D1 to be coupled at that instant of time to the top side of the comparator. The dotted line starting with a zero and connected to the bottom side of the comparator signifies that the D1 contents are to be compared to zero.

The first test to be made is to compare the content of D1 to zero. In this Example 1, the content of row D1 has a value 2 which is not equal to zero; the result of this test is negative and no shift takes place. For all subsequent tests in Example 1, the comparator block actually represents two comparators. The top side of one comparator is connected to zero levels and the top side of the other is connected to the output side of row D1. Further, the bottom sides of each comparator are connected to the output side of row C1. In each successive test, the value of C1 will therefore be first compared with zero and then with the content of row D1.

In Example 1, the first of the tests finds that the 4 in C1 is not equal to zero and is greater than the 2 in D1, so that a shift one is made to put the 4 in A1 and to shift the memory content upward so that there is now a 3 in C1. The process repeats, leaving a 1 in C1. As the 1 in C1 is less than the 2 in D1, the shift two is made, leaving a 1 in D1, a 4 in C1, a 3 in B1, and a 2 in A1. At this time, all range values have been compared and the shortest range is now in D1. A shift three then takes place, shifting the 1 from D1 to A2 and shifting the content of the four memory stages up one row. The entire process repeats, ending up with the original 1 in B2, the 2 in A2, the 4 in D1, and the 3 in C1. The process repeats for a third time, placing the 1 in C2, the 2 in B2, the 3 in A2, and the 4 in D1. At this time, the 4 in D1 is the largest of the set of values, and is the only value (other than zero) still remaining in memory sections 832b, 831b, 823b, and 813b. The last shift three is therefore arbitrarily made, so that all of the original values are stored in memory columns 809b in the desired properly increasing range order.

It is observed that $3 \times 3 + 1$ shifts were required for the four row memory of Example 1, and it is readily seen by extrapolation that the number of shifts required in general is equal to the square of the number of rows ($n$) in the memory plus one. It will be understood that the situation for $n = 4$ has been discussed herein, but that $n$ may take other values. For example, in a memory with 15 rows, $14 \times 14 + 1$ or 197 shifts would be required. At the 10 MHz shift rate, this process is readily completed during the radar system dead time and will adequately handle the extreme problem posed by 15 ships in line.

It will be understood that 15 replies is an extreme situation, since the most likely number of replies during one radar range sweep will be zero. The sorting process could always be done as it was in the complex situation of Example 1 even if all replies were zero. It will be understood that a value of zero in the memory does not mean a target at zero range which is a virtual impossibility, but rather it indicates the absence of a reply. Leading zeroes in the memory may therefore be handled as a special case.

The special case test operates as shown in Example 3 when there are no replies by comparing the content of D1 with the value zero four successive times, with each test resulting in a shift three. Both memories are consequently emptied, wother than to leave only zeroes in the stages of memories 809a and 809b, in a time much shorter than that required in Example 1.

In the readout cycle, the content of row D2 is compared in comparator 852 with the continuously advancing range count from counter 407. When a coincidence is found, a shift four moves the content of D2 in column 809a, the C'DPA code, to the readout section and all of the remaining data up one row. There arises a problem if there are leading zeroes in row D2, as only the first address would ever be read out. Therefore, the content of row D2 in column 809b is simultaneously compared with zero in comparator 853 as well as the range count; if a zero is found, a shift four is performed which shifts the content of the memories up one row. The process continues until either the content of row D2 becomes greater than zero or four shift-fours have been made, at which time the processing is complete.

Returning attention to FIGS. 8A, 8B, 8C, 8D, 11A, and 11B, consider the situation in which the loading and read out of the dual memories is complete and either the memory full puse from counter 884 or the EOS pulse 1101 from sweep generator 17 has reset flip flop 881, which starts the sorting process. The high, not-one output 1102 of flip flop 881 resets the memory-full three stage counter 884 and sets flip flop 880. The now-high one output 1103 of flip flip 880 resets flip flop 860 in flowing along lead 860a (see wave forms 1108a and 1108b), enables divide-by-16 counter 879, and sets flip flop 883 (1104). The divide-by-16 circuit 879 at once starts dividing down the $\phi1$ 160 MHz clock pulses received on terminal 478, producing the $\phi1$, $\phi2$, and $\phi3$ 10 MHz clock pulses 1105, 1106, 1107, respectively of FIG. 11A on leads 863d, 854a, and 867a, respectively. The now-high one output of flip flop 883 partly enables AND gate 886. At this stage in the processing, the content of two stage counter 891a is zero, so that the decode line three output of decoder 891b is low and the output of flip-flop 897 is high (see wave form 1109).

The now-high output of flip-flop 897 flows via lead 873a and partially enables AND gates 871, 861, 873, and 855. The now-high, not one output of the reset flip flop 860 completes the enabling of AND gate 861 (see wave 1110). The now-low one output 1108b of flip flop 860 inhibits AND gates 862 and 863 and, via lead 862a and delay 887 followed by lead 865a, inhibits AND gates 871, 873,855, and 898 (see wave 1113). The inhibition of AND gate 862 results in connecting all zero values to the upper inputs of comparators 864a and 864b.

Flip flop 888 being reset (wave 1115) the now-high one output 1104 of flip flop 883 completes the enablement of AND gate 886, permitting flow of 02 10 MHz clock pulses 1116 via lead 812a to comparators 864a and 812 and to AND gate 894. The first 02 10 MHz clock pulse passing through AND gate 886 along lead 812a enables the read out of the content of comparator 864a. This event compares the content of row D1 in memory 813b with zero. The inhibited AND gate 863 blocks the flow of enabling 01 10 MHz clock pulses 1105 into comparator 864b.

Because it contains all of the types of shifts, Example 2 of FIG. 8e is a particularly useful example for explaining the sorting process. When comparator 864a makes its comparison or test, it will find that the value of D1 is zero. The resultant A=B coincidence output 1117 from comparator 864a passes through the now-enabled AND gate 861 and OR gate 859; following passage through OR gates 858, 857, 856, and 866 in parallel it passes to all rows of memory 809 and rows 813, 831, and 832 and causes a shift three to take place within the memories (see wave 1118). It should be noted that flip flop 830 is reset and that shift three connections for range data are made via AND gate 827a, OR gate 826, leads 822 and 816. Shift three connections from the C'DPA column are always made. The first shift three therefore shifts all of the data up one row, ending with a zero in A1, a two in B1, a three in C1 and a one in D1. The fact that a zero was shifted into A2 is not material. The coincidence pulse from AND gate 861 will also pass via lead 859a and through OR gate 893 to put a one in three stage counter 892a. The count in counter 892a therefore becomes a one (see wave 1119). As two stage counter 891a is already reset, the pulse from OR gate 893 to the reset terminal of two stage counter 891a is immaterial.

At the same time, this first 02 10 MHz clock pulse 1106 also causes comparator 812 to compare the C'DPA data stored in row D1 of memory section 813a with that stored in row C1 of memory section 823a. If the two data are the same, this signifies that there are two responding I-T devices with the same address on the same azimuth with respect to own ship; the consequent coincident output passes via terminal 812b to the readout system, which will be further discussed in connection with FIG. 9, to activate the appropriate alarm, for example. The same coincidence output pulse is fed back via lead 810 through OR gate 878 to clear via lead 859a three stage counter 892a and reset flip flop 880, stopping the sorting process. As in the sorting process, each target reply is compared to all other calls, so that any two with the same address will be discovered.

Assuming that no two targets with the same address are stored in sections 832a, 831a, 823a, 813a when the second 02 10 MHz clock pulse 1106 arrives at comparator 864a, the comparison will find that row D1 now stores a one which obviously is greater than zero. The resultant non-coincidence (B>A) output 1120 from comparator 864a sets flip flop 860 via lead 860b. The resultant interchange of its one and not-one output levels 1108a and 1108b switches the input to the upper sides of comparators 864a and 864b from all zero values to the value now stored in 823b of row C1 through AND gate 862.

The now-high, one output 1108b from flip flop 860 enables AND gate 863 (wave 1111) and, after passing along lead 862a and through delay 887 (wave 1112), it completes via lead 865a the enabling of AND gates 871 and 873 (see wave 1113). The gates 871, 873, and 855 were already partially enabled by the high level signal from inverter 897 on lead 873a. The delayed now-high one level from flip flop 860 will also partially enable AND gate 898. Because delay 887 prevents the enabling of AND gate 871 until after the occurrence of the non-coincidence pulse from comparator 864a, no shift is performed.

When the third 01 10 MHz clock pulse arrives, comparator 864b finds that the value stored in C1, which is three in Example 2, is greater than zero, so there will be no output from the A=B output of comparator 864b. At the time of the third 02 10 MHz clock pulse, however, comparator 864a finds that the value in row C1 is three and is therefore also greater than the value one in row D1. The resultant A>B non-coincidence output pulse 1121 of comparator 864a flows through OR gate 872 and the now-enabled AND gate 873 to set flip flop 870. The now-high one output 1122 of flip flop 870 enables AND gate 868; the timing is illustrated by wave form 1122. The now-high one level from flip flop 870 also passes along lead 837 and enables AND gates 834a and 834b (see wave 1122) which, via OR gates 833a and 833b, respectively, complete the shift one connections around the input memory system 813, 823, 831, 832. This change in level passes via lead 837 and OR gate 874.

AND gate 867 being inhibited, the next 03 10 MHz clock pulse following the third 02 clock pulse passes via lead 867a and through the now-enabled AND gate 868 and will pass through OR gates 858 and 866 to make a shift one shift (see wave 1124). It is also fed back from AND gate 868 to reset flip flop 870 (see wave form 1122), and via 874a to place a one in two stage counter 891a (see wave 1123). Thus, a one is left in row D1, a two in Cl, a zero in B1, and a three in row A1.

When the fourth 01 10 MHz clock pulse 1105 enables comparator 864b, it finds that the two in row C1 is greater than zero, so there is no A=B output from comparator 864b. As the value two now in row C1 is also greater than the value one in D1, the fourth 02 clock pulse 1106 from AND gate 886 on lead 812a will cause an A>B non-coincidence output 1121 of comparator 864a and, as in the foregoing, will also cause a second shift one to occur (see wave 1124). The result is a two in row A1, a three in B1, a zero in C1, and a one in D1. The count in counter 891a is now two (see wave 1123).

When the fifth 01 10 MHz clock pulse 1105 arrives at comparator 864b, that comparator will, in accord with Example 2, find the value in row C1 equal to zero. The resultant A=B coincidence output 1125 of comparator 864b then passes through OR gate 872 and the now-enabled AND gate 873 to set flip flop 870 (wave 1122). As before, this event will cause at the time of the fifth 03 pulse a shift one, leaving a zero in row A1, a two in row B1, a three in A1, and a one in D1. It will also increment counter 891a to three. The coincidence output 1125 of comparator 864b will also set flip flop 888. The now-low, not-one output of flip flop 888 inhibits AND gate 886, preventing the fifth 02 10 MHz clock pulse from reading comparator 864a (see wave 1126). The now-high one output 1126 of flip flop 888 enables AND gate 889 so that the fifth 03 10 MHz clock pulse 1126 resets flip flop 888.

The count in three stage counter 892a now being three (see wave 1123), the consequent high level 1127 on the decode three output lead of decoder 891b will set flip flop 897. Its now-low, not-one output will inhibit AND gates 871, 873, 861, and 855, so that no outputs from comparators 864a, 864b are active (see wave 1113). As the high level on the third decode output lead of decoder 891b (wave 1127) has enabled AND gate 894, the sixth 02 10 MHz clock pulse 1106 from AND gate 886 passes through lead 812a, AND gate 894, and lead 859b to OR gate 859 and thence through OR gates 856, 857, 858, and 866 to cause a shift three (wave 1118) so that the dual memory has zeroes in rows A1 and B1, a two in row C1, a three in row D1, and a one in row A2 of the vertical section 809b.

As the several C'DPA codes are shifted at the same time and in the same manner as the respective range counts, the address of the nearest I-T device is now stored in row A2 of column 809a. The sixth 02 10 MHz clock pulse 1106 from AND gate 894 also passes through OR gate 893 to reset two stage counter 891a (wave 1123), and places another one in three stage counter 892a. The count in counter 892a is now two (see wave 1119). When the sixth 03 pulse 1107 resets counter 891a, the decode three output lead (wave 1127) of decoder 891b goes low, inhibiting AND gate 894 (wave 1127). The sixth 03 pulse 1107 then resets flip flop 897, completing the enabling of AND gates 855, 861, 871, and 873 (see wave 1113).

When the seventh 01 10 MHz clock pulse 1105 arrives at comparator 864b, it will find a two in row C1 which it determines to be greater than zero, so there will be no A=B coincidence output from the comparator 864b. When the seventh 02 10 MHz clock pulse from AND gate 886 arrives at comparator 864a, it is determined that the value two in row C1 is less than the three in row D1, so that there is an output from the B>A non-coincidence output 1120 of comparator 864a.

This B>A non-coincidence pulse 1120 output passes through the now-enabled AND gate 871 to set flip flop 869. The now-high one output of flip flop 869 passes via lead 838 and enables AND gates 867, 835a, and 835b (wave 1128). These gates, with the cooperation of the respective OR gates 833a and 833b, complete the shift two connections around the memory stages A1, B1, C1, D1. As a result, the seventh 03 pulse 1107 passes through OR gate 874 and lead 874a to place a one in two stage counter 891a (wave 1123) so that its count is now one. As a result, the seventh 03 10 MHz clock pulse 1107 passes via lead 867a through AND gate 867 and OR gates 857, 858, and 866 in parallel to cause a shift two to take place (wave 1124). This shift leaves a three in row A1, zeroes in B1 and C1, and a two in D1. As a result of the two zeroes in B1 and C1, the eighth and ninth comparisons result in A=B coincidence output pulses 1125 from comparator 864b, causing at the 03 pulse time shift-one shifts. A count of one will be placed in counter 891a for each such comparison (wave 1123). These events leave zeroes in rows A1 and B1, a three in C1, and a two in D1. The count in counter 891a is now a three, as is the count in counter 892a.

In the aforegoing example, it will be recognized that the original shift three removed the leading zero from row D1, which left only three I-T replies in memory stacks 813a, 823a, 831a, 832a and 813b, 823b, 831b, 832b. Thus, only two further sorts were necessary to assure that the target data were ordered in the desired order of increasing range. At the tenth 02 pulse 1106, the signal 1130 on the decode three output lead of decoder 892b resets flip flop 883 and completes the enabling of AND gate 898. The now-low one output of flop flop 883 (wave 1104) inhibits AND gates 886 and 863 stopping both the flow of 01 and 02 10 MHz clock pulses 1105 and 1106 and the sorting process. As a result, the tenth 03 10 MHz clock pulse 1107 from the divide-by-16 circuit 879 passes through AND gate 898 and OR gate 893 and advances the count in three stage counter 892a to four (wave 1119). The now-low level of the decode three output of decoder 892b inhibits AND gate 898 (see wave 1123). The now-high level of the decode four output 1131 of decoder 892b now passes through lead 859a and OR gate 859 and, then in parallel, through OR gates 866, 858, 857 and 856 to make the last shift three. This event leaves all zeroes in rows A1, B1, C1, and D1 and a three in row A2, a two in C2, a one in B2 and a zero in D2.

The now-high level 1131 on the decode four line of decoder 892b also enables three stage counter 875 and, via leads 859a and 854b, enables AND gate 854. This connection leads to the removal of leading zeroes in memory stack 809b, where their presence is not desired for reasons previously discussed. To accomplish this removal, the next 02 10 MHz clock pulse 1106 from the divide-by-16 circuit 879 passes via lead 854a through the now-enabled AND gate 854 and causes comparator 853 to compare the content of row D2 of memory stack 809b with zero. In Example 2, row D2 contains a zero, and there is consequently an A=B coincidence output from comparator 853. This event advances counter 875 to one and the coincidence output passes also through lead 856a and OR gate 856 to produce a shift four, leaving a zero in row A2, a three in row B1, a two in C1, and a one in D1 which result was, of course, the desired result of the sorting process.

When the very next 02 10 MHz clock pulse arrives, comparator 853 will, as a result, find a value in row D2 greater than zero. The resulting A>B non-coincidence output pulse from comparator 853 on lead 853a passes through OR gate 876 to reset three stage counter 875; it also passes through OR 878 to reset flip flop 880 and resets or clears three stage counter 892a. The resultant now-high, not one output of flip flop 880 resets the divide-by-16 879, stopping both the generation of any further clock pulses and the sorting process. The system remains in this state until the next delayed sweep trigger pulse arrives at terminal 54 and starts the readout cycle.

Example 3 illustrates the situation in which no replies are received during the next succeeding radar range sweep. In this case, the first three comparisons of row D1 with zero would have resulted in a shift three, placing a one in three stage counter 892a each time. The resultant high level on the decode three line would have caused the last shift three, leaving all zeroes in the input memory stacks and, of course, all zeroes in the output memory stack 809b. In such a case, comparator 853 would continue to find zeroes in row D2. It would place a one in counter 875 each time, so that after the fourth shift, the high level at the count-of-four output of counter 875 would pass through OR gates 876 and 878 and reset both the counter 875 and flip flop 880, stopping the sorting process. When the delayed radar range sweep trigger pulse arrives from terminal 54 from FIG. 4, it sets flip flop 881, again starting the loading and readout cycle. Thus, the loading cycle has been fully explained.

As previously indicated, completion of the sorting cycle places the dual memory sorting system in condition to be read out. Like the loading cycle, the read out cycle is also started when a radar synchronizer trigger at terminal 54 sets flip flop 881. It will be remembered that the operator is holding down the EE interrogate key 180 during all of this processing. Therefore, flip flop 808 has been reset and its resulting now-high not-one output has therefore partially enabled, via lead 808a, the AND gates 877 and 882. The resulting high one output from flip flop 881 therefore completely enables AND gate 877, which now permits the flow of 02 20 MHz clock pulses from divide-by-8 circuit 740' (FIG. 8A) to pass through terminal 801, AND gate 877, and lead 803a to enable comparator 852 (FIG. 8C). For each 01 20 MHz, the count in the 13 stage binary range counter 739' (FIG. 8A) advances one count. The output side 739a of range counter 739' is connected to multiple terminals 803 at one side of comparator 852, while the other side is coupled to row D2 of memory stack 809b by multi-connector 814. When there is a coincidence between the count in the binary range counter 739' and the range of I-T device having the closest range, that range being stored in row D2 of memory stack 809b, there will be an A=B coincidence output from comparator 852 which will set flip flop 851. The A=B coincidence output will also pass through terminal 803b as a target-present-pulse to certain display apparatus yet to be described in connection with FIG. 9, where it is coupled to OR gate 734 for use in target enhancement in indicator 21.

The C'DPA output of row D2 of the memory stack 809a is connected via terminals 805a and OR gate 938 to the input side of the C'DPA readout latches 936a, 936b, 936c, and 936d of FIG. 9. Accordingly, if the target present or A=B coincidence output pulse of comparator 852 passes through range gate 727, it causes the corresponding C'DPA data to be read into the appropriate display, as will be further explained. When flip flop 851 is set, its high one output enables AND gate 850. This permits the very next 01 20 MHz clock pulse from divide-by-8 circuit 740' on terminal 800 to make, via AND gate 850 and OR gate 856, a shift-four shift of memory stacks 809a and 809b, moving the C'DPA of the responding I-T device next in range and its range count into row D2. The same 01 clock pulse is also fed back to reset flip flop 851.

As the count in range counter 739' continues, the above process repeats each time the range count matches the range stored in row D2 of memory stack 809b until each I-T replay has been read out at the appropriate range (there are three replies in the present example). A target selected for identification by the operator will also be read out at the proper range to coincide with the opening of the range gate 727, and its address will accordingly be read into the desired display. While the stored and range-sorted replies are being read from the output memory, new replies are being stored in the input memory. Accordingly, it is a feature of the present embodiment of the invention that no target data is lost. The read out cycle continues until, as previously explained, either a memory-full pulse from counter 884 or an EOS pulse on terminal 55 from the radar sweep generator 17 starts the range sorting process.

As in the first embodiment of the range sorting apparatus, there is again the possibility of detecting two targets at substantially the same azimuth angle and at the same corrected range with respect to own ship. With the random delay present in the replies when they are detected at own ship, any pair actually having the same ranges will appear to have different ranges and will be stored in different input memory rows. Accordingly, if the targets are range-sorted only as so far described in connection with the present embodiment, any two targets of like range will be stored in sequential rows, but with the same corrected ranges. As a result, only the first of the pair would be read out in the read out cycle and neither the second of the pair nor any following targets would be read out. This result comes about because the second target of the pair is moved to the top of the memory stack after the range count corresponding to the common range has already been made at the time of transfer of the first target data.

The problem is solved by a simple addition to the system as thus far described. It is recalled that, in that part of the range sorting cycle after any leading zeroes are removed from the memory, flip flop 860 is set. Its now-low, not-one output inhibits AND gate 861, stopping the leading zero part of the sort; the now-high one output of flip flop 860 completes the enabling of AND gate 855 via delay 887. Whenever the ranges of the targets stored in rows D1 and C1 are equal, there appears an A=B coincidence output from comparator 864a. This coincidence output passes through AND gate 855 and sets flip flop 830. It will be noted that adder 820 is continuously adding ones to the range stored in row C1 at 02 10 MHz clock pulse.

With flip flop 830 set, its now-low, not-one output inhibits AND gate 827a, breaking the connection through OR gate 826 between rows B1 and C1 in the vertical stack 832b, 831b, 823b, 813b. At the same time, the now-high, one output of flip flop 830 enables AND gates 827b and 828. The enablement of AND gate 827b connects the output of adder 820 through OR gate 826 to the input of row C1 in memory section 823b. Enabling AND gate 828 permits the next following 03 10 MHz clock pulse to flow via leads 867a and 828a to AND gate 828 and to read the new range into row C1 and to reset flip flop 830. The C'DPA code in row C1 of memory section 823a is not affected, nor is any other memory shift made. When the next 01 and 02 10 MHz clock pulses arrive and comparisons are made, the value detected in row D1 will be less than that in row C1 and range sorting will continue, as before. If there happens on rare occasions to be a third target at the range stored in row B1 at the beginning of the foregoing range sort, it would progress to row C1 when the memory was shifted once, and the process would repeat so that three or more targets may be adequately range-sorted.

As the second equal range target has had its range artificially increased by one count, it could be read out in the normal manner. However, it will be understood that the original order of storing targets in the sorting memory system is a function of the injected random delay, and that it is therefore possible that on a successive range sweep, two targets at the same corrected or real range will have been sorted in a reversed order with respect to their order of storage in the immediately preceding range sweep. When attempting to identify one of such targets, the operator would observe flickering of the C'DPA readout. The C'DPA data finally displayed would be the data for the last successful interrogation by the radar antenna pattern as it left the corresponding target.

To solve this problem, the single channel vertical memory shift register stacks 809c and 813c, 823c, 831c, 832c are added to the dual memory system. Whenever there is a coincidence output from comparator 864a signifying the presence of two targets at substantially the same range and azimuth, the same 03 20 MHz clock pulse that reads corrected range from row C1 of memory stage 823b places a one in row D1 of memory stage 813c via OR gate 823e. This datum will be shifted with the previously described data in row D1 and will progress with that data until finally shifted out of row D2. Assume that a target at this range happens to be the one that the operator is trying to identify and that AND gate 807 is therefore enabled. During the readout cycle, its data reaches row D2 of memory stacks 809a, 809b and 809c. Thus, the datum in stack 809c passes through the now-enabled AND gate 807 to set flip flop 808. The now-low, not-one output of flip flop 808 on lead 808a then inhibits AND gate 877, preventing the enablement of comparator 852. This event prevents any further shifts of memories 809a, 809b and 809c. The event also inhibits AND gate 882, preventing any following memory full or end-of-sweep EOS pulses from starting a range sort cycle. The C'DPA code in row D2 of memory stack 809a will remain displayed in the C'DPA readout and an audio alarm activated by the output 807a of AND gate 807 will sound to alert the operator (FIG. 9) that there are two targets at the same range. Having observed the first C'DPA data, the operator can, by touching key 849, cause a shift four to take place, bringing the second C'DPA data to the readout device. The high one level on terminal 849a will enable the related readout latch. Having observed the two sets of C'DPA data, the operator may restart the EE process by releasing and again pushing the EE interrogate button 180 (FIG. 4B) and the resultant pulse from differentiator 497 will reset flip flop 808 and will also restart the EE interrogation process as previously explained.

The interface between the operator and the range sorting system will be explained by reference to FIG. 9. This interface is an important feature of the invention, in that one of its principal purposes is to enable the I-T system on one vessel sequentially to determine and to observe the C'DPA data of different ships in the vicinity of own ship. Because the operator is, in general, interested only in those few vessels which represent a definite threat to the safe and convenient operation of his own vessel, display of only a few C'DPA's need be supplied. In this example, operation upon only four sets of C'DPA data is provided for. It will, of course, be understood that means for storing the C'DPA data of additional vessels could readily be supplied according to the present invention. In FIG. 9, four sets of C'DPA data are accommodated, so that four readout devices 934a, 934b, 934c, and 934d are provided. The readout devices each show decimal digits 999, illustrating the maximum values that can be displayed in this example.

By nature, the readout devices 934a, 934b, 934c, 934d conventionally display data that must be stored in a storage or buffer register such as the respective latches 936a, 936b, 936c, 936d and transferred therefrom via multiconductor leads 935a, 935b, 935c, and 935d, respectively. The latches include conventional circuits to convert data entering in the binary coded decimal input format into the format conventionally required by the displays 934a, 934b, 934c, 934d. The display and latching systems are conventional and are internally controlled in the well known manner.

On the control and display panel of FIG. 1B, the operator is provided with four C'DPA data entry keys 154 physically mounted in an orderly array next to the four C'DPA readouts in unit 155. The first C'DPA address will normally be placed in the first readout 934a, as by pressing the associated key 951a. A positive voltage level is thus placed on the first input to the conventional one-out-of-four encoder 949. This event causes a binary four (1000) to appear on the four leads of the output multi-conductor 945. Encoder 949 also generates an output that goes low with any input and that is applied to inverter 950. After inversion, the signal enables the latch 944 which will store the binary four selection code. The output of latch 944 is coupled by multi-conductor 943a to the conventional one-out-of-four enable decoder 943 and via multi-conductor 932 to one-out-of-four reset decoder 933. When key 951a is pressed, high level signals are generated on the decode one lines of both decoders 933, 943 in the situation being discussed. The combination of encoders, latches, and decoders supplies a simple way of automatically remembering which key it was of keys 591a, 591b, 591c, 591d that the operator depressed. In the foregoing process, inverter 950 also resets flip flop 929 via lead 940. The one output of flip flop 929 flowing through amplifier 930 drops, extinguishing the two-with-the-same address display or lamp 931.

The multiple lead inputs 939a, 939b, 939c, 939d to the four respective latches 936a, 936b, 936c, 936d are connected in parallel to the output of multiple input OR gate 938. The 12 lead input 805a of OR gate 938 is connected to the output side of row D2 of memory stack 809a which contains the C'DPA code to be selected by range gate 727. The other twelve lead input 811' to OR gate 938 is connected to the output side of row D1 of memory stack 813a. The latter row D1 contains the address that will be displayed where two I-T devices with the same address have replied during a single radar range sweep.

In normal operation, one of the latches, such as latch 936a, is selected by the operator as the latch in which is to be stored the C'DPA code of the vessel he is about to identify. The high one level on decode line one of decoder 943 partially enables latch 936a. If the operator has correctly positioned the variable range marker, the target-present pulse from comparator 852 of FIG. 8C will then pass through terminal 803b and the range gate 727 to complete the enabling of latch 936a via OR gate 937. At that instant, the enablement of latch 936a causes the C'DPA data stored in row D2 of memory stack 809a to be read into the latch 936a and therefore to be displayed by readout 934a. The operator may repeat the same process for any three other vessels which may be located at any point on the screen of type P radar indicator 21. To avoid confusion, the operator may remove any displayed address by touching a key such as key 951a in entry key section 154 of FIG. 1B associated with that address and then the clear key 924. If the operator wishes to store a new address, the old address need not be cleared, since the new address will automatically displace the old.

Now assume that two targets with the same addresses are found during one radar range sweep while making an EE call. As previously described, the output of row D1 of memory cell 813a is also connected via terminal 811a through OR gate 938 to the input side of the four latches 936a, et cetera, still also using the example in which latch 936a has been selected to store the data. As the two I-T devices with the same C'DPA data are compared during the range sorting cycle, the coincidence pulse output of comparator 812 will pass via terminal 812b through OR gate 937 to complete the enabling of latch 936a. The C'DPA data now present will be read via OR gate 938 into latch 936a and thence displayed in readout 934a.

At the same time, the coincidence pulse from comparator 812 is fed both via lead 812b to set flip flop 929 and via OR gate 928 to set flip flop 925. The now-high one output of flip flop 929 will illuminate the two-targets-with-the-same-address display element 931 via amplifier 930. The now-high one output of flip flop 925 enables the analog AND gate 926, permitting a driving signal, for example of 1000 Hz frequency, to pass from a suitable source (not shown) attached to terminal 926a to drive the alarm speaker 927. The alarm speaker 927 may be silenced at the convenience of the operator upon touching the silencing key 924 which resets flip flop 925, thereby inhibiting AND gate 926. When the operator completes a conclusive conversation over own ship's radio telephone with the other vessel or vessels, he can clear the two-with-the-same-address light by depressing any enter key in the group 154. Whenever the operator touches a C'DPA data entry key, decoders 933 and 943 put out a high level signal on a corresponding output line. Therefore, to clear particular C'DPA data from one of the readouts, the operator first touches the C'DPA data entry key and then touches the clear C'DPA data key 923. It will, of course, be understood that the other latches and corresponding displays will normally be used consecutively and that they operate in the same manner as has been discussed in connection with latch 936a and readout 934a.

MAKING AND REPLYING TO A DIRECTED EE CALL

Figure 10:
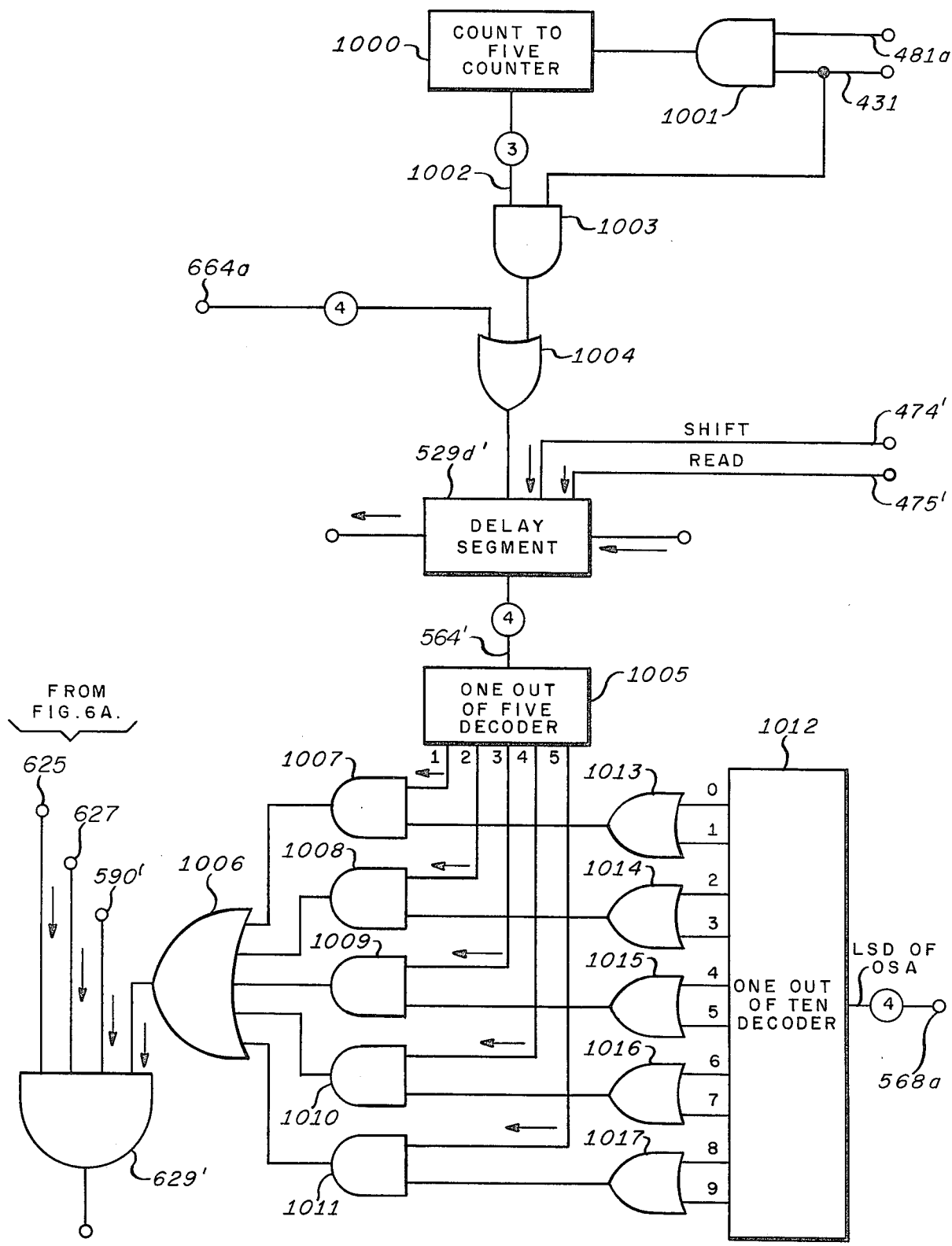
FIG. 10 illustrates a modification of part of the apparatus of FIGS. 6A, 6B, and 6C.

It will be remembered that, to reduce the number of vessels on the same azimuth that are to reply to an EE call, the system may readily be implemented to use a selective form of EE call, the directed EE call. Therefore, when making a directed EE call, the interrogating I-T device must insert in the delay word segment 529d' of the master shift register the code for the control word used during each particular interrogation. The control word will be one of the binary coded digital words equivalent to the decimal numbers one through five. For each successive transmission, the number is advanced by one count through five and then is started again with a one. This operation may be accomplished as shown in FIG. 10 by using a three stage counter 1000 with the necessary conventional internal feedback connections to limit its count to five. The output of counter 1000 is connected in parallel through the multi-conductor 1002, through AND gate 1003 and OR gate 1004, to the parallel input taps of delay segment 529d'.

When the operator initiates an EE call by pressing the EE interrogate call key 180, flip flop 447 is set. Its now-high one output then passes along lead 431 and enables AND gates 1001 and 1003. As, for each transmission, the one output of flip flop 481 goes high, this change in level will pass through terminal 481a and via AND gate 1001 will cause the count in the count-to-five counter 1000 to advance one count. The enabled AND gate 1003 connects the multiple outputs of counter 1000, via OR gate 1004, in parallel to the input side of delay segment 529d' so that each 02 10 MHz read pulse from AND gate 473 via lead 475' will read the count in counter 1000 at that instant into delay segment 529d'. The normal shifting of the content of the main shift register 529' to transmitter 44, including the added code in memory segment 529d', then follows. Other aspects of the interrogation proceed as previously described. The replies received at the interrogating I-T device in response to a directed EE call are received and processed as previously described, including the range and address sorting procedures.

Now, assume that a directed EE call has been received. Before replying, each receiving I-T device will compare the least significant digit appearing on leads 568 of own ship's address OSA with the incoming address code in the delay segment 529b' of the master shift register. If the incoming number has a value of one, only those I-T devices whose OSA least significant digit is either zero or one will reply. If the value of the number is two, only those I-T devices whose OSA least significant digit is either two or three will reply. Operation is similar for other values; for example, if the incoming value is five, only those I-T devices whose OSA least significant digit is either nine or 10 reply. In this way, all I-T devices have the opportunity to reply during the assumed minimum of five interrogations of a particular vessel made during a scan of the radar antenna. In the extreme case of an area densely populated with cooperating ships where all possible OSA least significant digits are present, only 20 percent of the I-T devices involved would reply on any one radar range sweep, greatly increasing the probability of detection without garbling.

This is accomplished in FIG. 10 through the agency of the conventional one-out-of-five decoder 1005, which is permanently connected in parallel to outputs of delay segment 529d'. The inputs of a conventional one-out-of-10 decoder 1012 are permanently connected via terminal 568a to the least significant leads of a four-bit binary coded decimal register part of OSA storage register 574.

Decoder line one of decoder 1005 and either of decoder lines zero or one of decoder 1012 are coupled to AND gate 1007. Decoder line two of decoder 1005 and decoder lines two and three of decoder 1012 are coupled to AND gate 1008, and so on, until decoder line five of decoder 1005 and either of decoder lines eight or nine of decoder 1012 are coupled to inputs of the last AND gate 1011. All of the outputs of the respective AND gates 1007 through 1011 are fed through OR gate 1006. As a result, there will be an output from OR gate 1006 only when the lowest significant digit of own ship's address agrees with the incoming number present in delay segment 529d'.

As previously discussed in connection with FIG. 6A, the receipt of a valid EE call results in a pulse passing through EE call AND gate 629 which will cause the I-T transmitter 44 to reply in the EE mode. It is again the function of AND gate 629' in the modification of FIG. 10 to respond to the simultaneous presence at its inputs of the output from OR gate 1006, the EE mode received pulse, the fact that all C'DPA digits are zeroes, and to the odd parity character of the message. In order to limit the replies only to the selected group of I-T devices that are to reply to a directed EE call, the AND gate is expanded from the triple input gate 629 to a quadruple input AND gate 629'. As a result, only cooperating I-T devices with the correct own ship's address lowest significant digit will reply. Otherwise, the incoming call is received and is processed as previously explained.

In replying to a directed EE call, the procedure is the same as a reply to a valid EE call as previously described, except that the amount of range delay used as found in latch 672 is connected through delay 664 and terminal 664a to the input side of delay segment 529d' of the master shift register 529' through OR gate 1004. This completes the description of apparatus used in making and in replying to a directed EE call.

CONCLUSION

Accordingly, it is seen that the invention provides radar target identification in such a way that ships can be selectively called for initiating subsequent communication procedures. It provides valuable enhancement of the primary radar target echo when displayed on the radar indicator. It provides means for directed or selectively called communication for the automatic and rapid interchange of coded information between ships or between a ship and a shore based station, also providing means enabling direct ship's radio-telephone communication between positively identified vessels. Finally, it provides a versatile facility for broadcast communication to all cooperating systems within range, with the source of the broadcast identified on each recipient's radar display.

The present invention additionally solves two particular problems limiting the effectiveness of prior concepts. For example, when two marine radar interrogator-transponder systems that lie on essentially the same radial azimuth line with respect to own ship and whose antennas are separated by less than the round trip message length are interrogated, their replies as received at own ship cannot help but overlap in time. The data the replies contain is therefore garbled and, if detected, would normally be dangerously inaccurate. The defect is overcome by delaying the replies from each transponder in a random manner. Since two-way communication is involved, each replying transponder conveys to the interrogator the specific data defining the delay used in each successive reply. The delays are then removed in a novel manner at the interrogator itself. The intensifications of the identifications of the replying transponders are then accurately displayed on own ship's radar type P display in their true locations.

Problems related to very dense traffic are also solved, including the problems that two vicinal ships that are separated by somewhat more than a message length may produce garbled messages due to overlap induced by the random delay. Accordingly, it is arranged that the interrogator requests replies from only certain vessels per each range sweep. This is accomplished by using the same space in the interrogation message that is used in the reply to specify the delay in the reply itself to instruct the transponder whether or not to reply. This is not done by operating on individual targets, but by groups of vessels. In order to assure a reasonable certainty of getting a reply from all vessels in range on each antenna scan, the number of groups is limited.

It is seen that the present invention transmits, in appropriate places in the interrogation, numbers one through five, advancing by one for each subsequent range scan. The number sequence cyclically repeats with a period of five. At the remote transponder, the received number is compared to the least significant digit in that transponder's current address. Depending upon each successive comparison, different groups of transponders successively reply. In this manner, replies are normally received from all transponders in ordered succession. Use of the random delay also permits the detection and individual identification of two vicinal transponders that are not only along the same azimuth line, but are found at substantially the same ranges.

It is further seen that the invention solves additional problems, such as those consequent of the fact that the system, as a matter of convenience, operates with fewer available addresses than the possible number of participating vessels. Accordingly, there is a finite probability that two or more vessels will be found with identical addresses on the same azimuth with respect to own ship. The invention further provides means for the display of the over-used address and for a change of one of them by radio-telephone communication, since the addresses are not considered to be permanent.

While the invention has been described in its preferred embodiments, it is to be understood that the words which have been used are words of description rather than of limitation and that changes within the purview of the appended claims may be made without departing from the true scope and spirit of the invention in its broader aspects.

We claim:

1. In a radio aid to navigation adapted for cooperative use with an azimuth scanning radar transmitter-receiver system wherein a radar echo signal is represented by intensification of a cathode ray beam of radar indicator means, said radio system including synchronizer means for generating at least one synchronizer pulse for initiating a radial sweep of said cathode ray beam and for initiating operation of said radar transmitter-receiver system:

first clock pulse generator means for generating a train of first clock pulses of a predetermined phase and frequency, selector means responsive to said one radar synchronizer pulse for selecting a first clock pulse immediately following said one radar synchronizer pulse for forming a selected pulse, first pulse train frequency divider means cleared by said selected pulse and responsive to said first clock pulses for initiating trains of second clock pulses of first and second phase and of a second predetermined pulse frequency, first counter-decoder means cleared by said selected pulse and responsive to said first phase second clock pulses for producing a delayed radar synchronizer pulse for delayed operation of said radar transmitter-receiver system and a delayed radar sweep trigger pulse for delayed initiation of said radial sweep, adjustable video delay means responsive to radar video signals output from said radar transmitter-receiver system and to said first phase second clock pulses for producing delayed radar video signals for intensifying said cathode ray beam, and transceiver means responsive to said first clock pulse generator means.

2. Apparatus as described in claim 1 additionally including inhibit means for preventing passage of subsequent pulses of said first clock pulse train through said selector means until the arrival of a radar synchronizer pulse following said one radar synchronizer pulse.

3. Apparatus as described in claim 2 additionally including binary range counter means for counting said first phase second clock pulses until reset by said selected pulse.

4. Apparatus as described in claim 3 wherein said adjustable video delay means includes at least two fixed delay means, said apparatus further including:
first bistable means,
control means for controlling the state of said first bistable means, and
first gate means for passing said radar video signals selectively through one or both of said fixed delay means in response to the state of said first bistable means.

5. Apparatus as described in claim 4 wherein said first counter-decoder means is characterized by having plural outputs, said apparatus further including:
an even plurality of AND gate means each responsive to one of said plural outputs,
each AND gate means being further responsive to at least one state of said first bistable means, and
an odd plurality of OR gate means each responsive to a pair of said AND gate means for generating at least said one delayed radar synchronizer pulse and said one delayed radar sweep trigger pulse.

6. Apparatus as described in claim 5 wherein said control means includes:
unidirectional voltage source means, differentiating circuit means, and
manually operated switch means interposed between said source means and said differentiating circuit means.

7. Apparatus as described in claim 5 wherein one of said odd plurality of OR gate means is responsive to a discrete pair of said even plurality of AND gate means for producing an end-of-count pulse, said apparatus additionally including:
second bistable means responsive to said end-of-count pulse, and
second gate means responsive to a first state of said second bistable means for inhibiting the flow of shift and read pulses.

8. Apparatus as described in claim 2 additionally including:
first bistable means responsive to said selected pulse and to said delayed radar sweep trigger pulse, and gate means interposed between said first pulse train frequency divider means and said first counter-decoder means responsive to said first bistable means for controlling the passage into said first counter-decoder means of said first phase second clock pulses.

9. Apparatus as described in claim 1 wherein said transceiver means includes:
transponder transmitter means adapted for transmitting pulse coded messages to a remote transponder,
transponder receiver means adapted for receiving pulse coded messages from said remote transponder, and
master shift register means having a plurality of segments and responsive to said transponder receiver means, responsive to said selected pulse for clearing said master shift register means, and responsive in part to said pulse train frequency divider means for shifting and reading said master shift register means,
said transponder transmitter means being responsive to the output of said master shift register means.

10. Apparatus as described in claim 9 including plural data insertion means respectively parallel coupled for selectively inserting data into respective ones of said segments.

11. Apparatus as described in claim 10 further including means for processing a predetermined message received by said transponder receiver means comprising:
receiver gate means coupled between said transponder receiver means output and the input segment of said master shift register means,
synchronizing word decoder means for recognizing a synchronizing word of predetermined nature at the start of said predetermined received message,
decoder gate means coupled between said transponder receiver means and said synchronizing word decoder means, and
bistable control means for reversibly inhibiting said receiver gate means and for enabling said decoder gate means in a first state for passing said synchronizing word, if present, to said synchronizing word decoder means,
said bistable control means being responsive to the recognition of said synchronizing word for inhibiting said decoder gate means and for enabling said receiver gate means for passing the remainder of said predetermined message into said master shift register means when said bistable control means is in its second state.

12. Apparatus as described in claim 11 further including:
second pulse train frequency divider means for producing first and second phase trains of receiver clock pulses of a second predetermined frequency when excited by said first clock pulse generator means, and
second counter-decoder means for counting said second pulse train frequency divider means phase-one receiver clock pulses,
said second pulse train frequency divider means and said second counter-decoder means being coupled for enabling thereof to said bistable control means when in the second state thereof.

13. Apparatus as described in claim 12 further including shift gating means responsive to said bistable control means for permitting passage therethrough of said first phase receiver clock pulses as shift pulses to shift the remainder of said predetermined received message into said segments of said master shift register means until shifting is ended by a predetermined output pulse of said second counter-decoder means.

14. Apparatus as described in claim 13 further including:
   test gating means responsive to said predetermined output pulse and to a predetermined one of said second phase receiver clock pulses, and
   first comparator means for comparing a first ship's address code of said predetermined received passage when stored in a first predetermined one of said master shift register segments with the actual first ship's address code for producing as an output a valid-reply received signal.

15. Apparatus as described in claim 14 wherein a second predetermined segment of said master shift register means operates as a parity segment for storing a parity code when said predetermined received message is present within said master shift register means, said apparatus further including parity check means responsive to said second predetermined segment for emitting a parity output pulse when the parity characteristic of said parity code is odd.

16. Apparatus as described in claim 15 wherein a third predetermined segment of said master shift register means stores a first message mode code when said predetermined received message is present within said master shift register means, said apparatus further including:
   mode decoder means for determining the presence of said message mode code and for then generating a corresponding output mode pulse.

17. Apparatus as described in claim 16 further including:
   first reply gate means responsive to the simultaneous presence of said valid-reply received signal, of said parity output pulse, and of said output mode pulse for generating a first valid predetermined reply signal,
   said first valid predetermined reply signal being coupled to cause said bistable control means to inhibit said receiver gate means and said shift means, whereby said predetermined received message remains stored in said master shift register means.

18. Apparatus as described in claim 16 further adapted for processing a predetermined received message having a length greater than that of said predetermined received message, said apparatus further including:
   second comparator means for comparing a second ship's address code of said predetermined longer received message when stored in a fourth predetermined segment of said master shift register means with the actual second ship's address code for producing a coincidence output if the addresses are identical, and
   second message reply gate means responsive jointly to the simultaneous presence of at least said parity output pulse, of said coincidence output, and of said valid-reply received signal for generating a second valid predetermined reply signal,
   said second valid predetermined reply signal being coupled to cause said bistable control means to inhibit said receiver gate means and said shift gate means for holding said predetermined longer received message in said master shift register means.

19. Apparatus as described in claim 13:
   test gating means responsive to said predetermined output pulse and to a predetermined one of said second phase receiver clock pulses,
   parity check means responsive to the presence in a first predetermined segment of said master shift register means of a parity code of said predetermined received message for generating a parity output pulse,
   first comparator means for comparing a first ship's address code of said predetermined message when stored in a second predetermined segment of said master shift register with zero potential levels for generating a coincidence pulse,
   mode code decoder means for determining the presence in said predetermined received message, when stored within a third predetermined segment of said master shift register means, and for generating a corresponding output mode pulse,
   first reply gate means responsive to the simultaneous presence of at least said parity output pulse, said coincidence pulse, and said output mode pulse for generating a second valid predetermined reply signal, and
   message translation means responsive to said second valid predetermined reply signal.

20. Apparatus as described in claim 19 wherein said message translation means includes:
   first readout means responsive to said second valid predetermined reply signal for reading a first ship's address into said second predetermined segment of said master shift register means,
   synchronous word generator means, and
   second readout means responsive to said second valid predetermined reply signal for reading a synchronous word code from said synchronous word generator means into a fourth predetermined segment of said master shift register means.

21. Apparatus as described in claim 20 wherein said master shift register means has a group of series connected segments adapted for storing data groups identifying predetermined characteristics of own ship, said apparatus additionally including:
   bypass means coupled in shunt relation with respect to said group of series connected segments, and
   bistable means responsive to said second valid predetermined reply signal for enabling said bypass means whereby said data groups identifying predetermined characteristics of own ship remains within said group of series connected segments.

22. Apparatus as described in claim 19 wherein said first reply gate means for generating a second valid reply signal is additionally enabled by apparatus including:
   address storage means for storing a code group representing own ship's address,
   first decoder means responsive to the presence of a received message having a predetermined segment of said master shift register means, and
   second decoder means responsive to the least significant binary coded digits of said address storage means.

23. Apparatus as described in claim 22 further including:
   a plurality of decoder gate means,
   respective individual decode output lines of said first decoder means being coupled to respective ones of said plurality of a decoder gate means, respective successive pairs of decode output lines of said second decoder means being coupled to said respective ones of said decoder gate means, OR gate means responsive to said plurality of decoder gate means for additionally enabling said first reply gate means.

24. Apparatus as described in claim 12 further including:

coincidence means responsive to said shift register means for recognizing a received message of predetermined character, thereby producing a valid predetermined reply signal, first bistable means exhibiting a change of state in response to said valid predetermined reply signal, random delay generator means for generating a continuously changing pseudo-random delay pulse code in response to a first-phase pulse train output of said second pulse train frequency divider, said second pulse train frequency divider being adapted to supply first and second phase pulse train outputs, latch storage means, and second selector means responsive to said first bistable means for passing the first pulse of said second phase pulse train following said change of state of said bistable means for reading the pseudo-random pulse code instantaneously present in said random delay generator means into said latch storage means and into a predetermined segment of said master shift register means.

25. Apparatus as described in claim 24 further including circuit means whereby said selected first pulse of said second phase pulse train causes said first bistable means to revert to its original state, thereby permitting selection by said second selector means of no pulses following said selected first pulse.

26. Apparatus as described in claim 25 further including:

multiplexer means parallel coupled to a plurality of time-spaced count outputs of said second counter-decoder means, said multiplexer means being responsive to said latch means for determining which of said time-spaced counts appears at the output of said multiplexer means, and second bistable means responsive to said multiplexer means output for shifting a predetermined message stored in said master shift register, including said pseudo-random pulse code, into said transponder transmitter means for transmission thereby.

27. Apparatus as described in claim 12 wherein said azimuth scanning radar transmitter-receiver system is additionally adapted to provide a variably adjustable range marker pulse and an end-of-sweep pulse, said apparatus additionally including:

binary range counter means in which counting in response to said first clock pulses from said first clock pulse generating means is initiated by said delayed sweep trigger pulse, said counting being terminated by the arrival of said end-of-sweep pulse, subtractor means, coincidence means responsive to said master shift register means for recognizing a received message of predetermined character, thereby producing a recognition pulse, latch storage means responsive to said recognition pulse for transferring the instantaneous count in said binary counter means into said subtractor means, and shift register random-delay segment means providing a second input to said subtractor means and forming a predetermined one of said plurality of segments of said master shift register means for storing said received message of predetermined character including a code representing the pseudo-random delay used in transmitting said reply, whereby the output of said subtractor means represents true range to a replying transponder means.

28. Apparatus as described in claim 27 further including:

bistable means responsive at least to first and second of said undelayed radar synchronizer trigger pulses, and having corresponding first and second states, and first gate means interposed between said binary range counter means and said latch storage means, said first gate means being responsive to said first state of said bistable means for enabling said transfer of the instantaneous count in said binary counter means into said subtractor means, said first gate means being responsive to said second state of said bistable means for inhibiting said transfer.

29. Apparatus as described in claim 28 further including:

a plurality of latch means parallel coupled to the output of said subtractor means, a corresponding plurality of comparator means respectively parallel coupled to respective ones of said latch storage means for forming respective first inputs to said respective first inputs to said respective comparator means, and second gate means enabled by said bistable means in the second state thereof for coupling the outputs of said binary range counter means as second inputs to each of said respective comparator means, whereby a target-present signal is generated at a corresponding output of the said comparator means wherein the content of said binary range counter means matches corrected range data stored in a corresponding one of said plurality of storage latch means.

30. Apparatus as described in claim 29 including means for coupling at least one of said target-present signals to display means.

31. Apparatus as described in claim 27 additionally including:

third pulse train frequency divider means for generating first and second phase pulses of a third predetermined frequency in response to said first clock pulse generator means phase-one clock pulses, said binary range counter means being directly responsive to said third pulse train frequency divider means.

32. Apparatus as described in claim 31 further including:

reply bistable means responsive to a predetermined output of said second counter-decoder means for changing state, and reply gate means responsive to said change of state of said reply bistable means for conducting the very next phase-two pulse output of said third pulse train frequency divider means for reading the content of said binary range counter means into said latch storage means, said reply bistable means being reset by said phase-two pulse output of said reply gate means.

33. Apparatus as described in claim 32 wherein said master shift register means includes a serially coupled segment adapted for storing ship's address codes as portions of a predetermined received messages, said apparatus further including:
- input storage means having at least two parallel channels respectively for storing successively coupled outputs of said subtractor means and for storing said corresponding address codes from said serially connected segment,
- sorting control means for arranging the order within said input storage means of said subtractor means outputs and of said corresponding ship's address codes by range magnitude,
- output storage means having at least two parallel channels respectively responsive for receiving successive parallel outputs of said input storage means channels in order of range magnitude, and
- utilization means for employing the content of said output storage means.

34. Apparatus as described in claim 33 further including shift gate means responsive to a first predetermined output coupling of said second counter-decoder means for successively shifting said contents of said subtractor means and of said serially connected segment into the inputs of said respective channels of said input storage means.

35. Apparatus as described in claim 34 further including multi-stage counter means responsive to said first predetermined output of said second counter-decoder means for generating an initiating signal in the form of a memory full signal for initiating operation of said sorting control means.

36. Apparatus as described in claim 35 further including first enabling gate means responsive to the first signal arriving of said memory full signal or of said end-of-sweep pulse for coupling successive outputs of said subtractor means to the input of said input storage means whereby all successive outputs of said subtractor means and of said serially connected segment generated during one radar sweep are stored in said input storage means.

37. Apparatus as described in claim 36 additionally including:
- multiple output control means responsive to said initiating signal,
- fourth pulse train frequency divider means responsive to said first clock pulse generator means for generating first, second, and third phase pulse trains when enabled by said multiple output control means,
- two-stage counter means responsive at least to said third phase pulse train,
- first single output coincidence means responsive at least to said phase-one pulses of said fourth pulse train frequency divider means,
- triple output coincidence means responsive at least to said phase two pulses of said fourth pulse train frequency divider means, and
- control means responsive to said multiple output control means in a first state thereof for placing a first predetermined code group in inputs of said single and triple output coincidence means.

38. Apparatus as described in claim 37 wherein an input of said triple output coincidence means is obtained from a predetermined stage of said input storage means, the apparatus additionally including:
- fourth bistable means responsive to said multiple output control means for permitting flow of said phase two pulses of said pulse train frequency divider means for enabling readout of said triple output coincidence means,
- said multiple output control means additionally preventing flow of said phase one pulses of said fourth pulse train frequency divider means into said first single output coinidence means.

39. Apparatus as described in claim 38 further including:
- signal coupling means responsive to said triple output coincidence means when yielding a coincidence output,
- predetermined stages of said input storage means being responsive to an output of said signal coupling means for progressively shifting the contents of said stages, and
- three-stage counter means additionally responsive to said signal coupling means output for increasing the count therein by an integer,
- the count within said two-stage counter means additionally being increased by an integer in response to said signal coupling means output.

40. Apparatus as described in claim 39 additionally including:
- second single output coincidence means responsive at least to said phase two pulses of said fourth pulse train frequency divider means for comparing the contents of a predetermined contiguous pair of stages of said input storage means for producing a single coincidence output when two transponder systems of the same address data lie on the same azimuth with respect to own ship, and
- alarm means responsive to said coincidence output.

41. Apparatus as described in claim 40 wherein said alarm means includes multiple display means for the display of at least one set of address data.

42. Apparatus as described in claim 38 for sorting of data held within said input storage means further including means for detecting two targets at substantially the same azimuth angle and range, the apparatus including:
- signal bistable coupling means responsive to said triple output coincidence means when yielding a coincidence output by change from a first to a second state,
- first and second AND gate means, and
- first OR gate means,
- said first AND gate means and said first OR gate means forming a first series connection between first and second predetermined stages of said input storage means,
- said second AND gate means and said first OR gate means forming a second series connection between said first and second predetermined stages of said input storage means,
- said second AND gate means being supplied with said phase-two pulses from said third pulse train frequency divider means and being coupled to said second predetermined stage of said input storage means,
- said signal bistable coupling means when in said second state enabling only said second AND gate means to pass one of said phase-two pulses from said third pulse train frequency divider means, and said signal bistable coupling means when in said first state enabling only said first AND gate means.

43. Apparatus as described in claim 42 further including:
third AND gate means responsive to said signal bistable coupling means when in said second state for passage of one pulse of said phase-three pulses of said third pulse train frequency divider means, whereby new range data is read into said second predetermined stage,
said signal bistable coupling means being reset by said one pulse of said phase-three pulses.

44. Apparatus as described in claim 42 for sorting of data held within said input storage means further including means for detecting two targets having substantially the same range but stored in reversed order during immediately successive range sweeps, the apparatus including:
first and second single-channel shift register means having stages corresponding to the respective stages of said input and output storage means,
second OR gate means coupled in series relation between predetermined stages of said first single-channel shift register means,
alarm means,
said one pulse of said phase-three pulses of said third pulse train frequency divider means being coupled through said second OR gate means,
said one pulse, when shifted from the output state of said output storage device, serving to inhibit operation of said first comparator means and to activate said alarm means.

45. Apparatus as described in claim 33 wherein:
said channels of said input storage means have respective equal first and second pluralities of stages, and
said sorting control means, upon being activated, is adapted cyclically to compare the range magnitudes of said successive outputs of said subtractor means thereupon to arrange said successive outputs in said first plurality of stages in order of range magnitude and to arrange said address data outputs of said serially coupled segment in corresponding order within said second plurality of stages.

46. Apparatus as described in claim 33 for read out of data present within said output storage means including:
first bistable means responsive to said delayed radar sweep trigger pulse,
first comparator means,
manually controlled means cooperative with said bistable means for enabling passage of phase-two pulses from said third pulse train frequency divider means for enabling said first comparator means,
said first comparator means having a first input for receiving the count in said binary range counter means and a second input for receiving the range value stored in the output stage of said output storage device for providing a coincidence output upon equality of said range values representing a target present signal, and
display means for utilizing said target present signal.

47. Apparatus as described in claim 46 further including:
plural address data display means,
address data display gating means responsive to said target present pulse for passing the address data stored in the output stage of said output storage means into at least one of said plural address display means.

48. Apparatus as described in claim 47 further including:
second bistable means responsive to said target present pulse and to a predetermined one of said phase one pulses from said third pulse train frequency divider means for shifting the content of the next to the output stage of said output storage device into said output stage,
said predetermined one of said phase one pulses resetting said second bistable means.

49. Apparatus as described in claim 46 further including:
a plurality of numerical address display means,
a plurality of latch means for transferring, when enabled, ship's address data from said output stage of said output storage means into a respective one of said plurality of display means, and
a plurality of manual selector means for selectively partially enabling said latch means.

50. Apparatus as described in claim 12 wherein said azimuth scanning radar transmitter-receiver system is additionally adapted to provide a manually adjustable range marker pulse and an end-of-range-sweep pulse, and additionally including:
fist bistable means responsive to said delayed radar sweep trigger pulse,
binary range counter means for counting said first clock pulses of said first clock pulse generator means in response to said first bistable means,
coincidence means responsive to the presence of a message of predetermined character in said master shift register means,
second bistable means responsive to said coincidence means, and
latch storage means enabled by said second bistable means for reading and storing the instantaneous content of said binary range counter means.

51. Apparatus as described in claim 50 additionally including:
first gate means responsive to said second bistable means for passing a predetermined pulse of said first phase pulse train,
a predetermined segment of said shift register means being adapted to store a delay code of predetermined character as a portion of said message of predetermined character, and
subtractor means responsive to said predetermined pulse of said first gate means for subtracting the stored contents of said latch storage means from said delay code for generating a signal representing true range to the source of said message of predetermined character.

52. Apparatus as described in claim 51 additionally including:
second gate means for receiving said second phase pulse train,
multiple stage counter means responsive to the first pulse of said second phase pulse train,
decoder means having plural outputs and responsive to a single count advance within said multiple stage counter means for providing a high level signal on one of said plural output means, and
first inhibit means responsive to said first pulse of said second phase pulse train for inhibiting said first and second gate means, thereby blocking the flow of further first and second phase pulse trains therethrough.

53. Apparatus as described in claim 52 further including:
- a first plurality of latch means,
- first coupling means for coupling the output of said subtractor means into each of said first plurality of latch means, and
- second coupling means for coupling said respective outputs of said decoder means into one each of said first plurality of latch means whereby each said subtractor means output occurring during one radar range sweep is read into only one latch means of said first plurality of latch means.

54. Apparatus as described in claim 53 further including:
- a second plurality of latch means,
- a predetermined segment of said shift register means being adapted to store a predetermined code representing a ship's address identification as a portion of said message of predetermined character, and
- third coupling means for coupling said respective outputs of said decoder means to each of said second plurality of latch means whereby any said predetermined segment content occurring during one radar range sweep is read into only one latch means of said second plurality of latch means.

55. Apparatus as described in claim 54 further including:
- a plurality of comparator means respectively coupled in parallel to respective first outputs of said first plurality of latch means and enabled in response to said undelayed radar trigger pulse,
- third bistable means responsive at least to first and second of said undelayed radar synchronizer trigger pulses, and
- third gate means made responsive to said third bistable means by said second undelayed radar synchronizer trigger pulse for coupling the output of said binary range counter means to second inputs of said plurality of comparator means, whereby each of said first plurality of latch means containing range data causes a corresponding comparator of said plurality of comparator means to yield a target-present pulse at an output thereof in the order of increasing range.

56. Apparatus as described in claim 55 additionally including indicator coupling means for coupling said target present pulses to intensify and cathode ray beam of said radar indicator means.

57. Apparatus as described in claim 55 additionally including:
- numerical display means, and
- a plurality of display gate means for energizing said numerical display means,
  - each said display gate means being coupled to the output a respective one latch means of said second plurality of latch means,
  - any one of said display gate means being enabled by the presence of a corresponding target-present pulse for the display of a corresponding ship's address by said numerical display means.

58. Apparatus as described in claim 57 further including:
- range gating means responsive to said manually adjustable range marker pulse for passing any target-present pulse of corresponding range, and
- pulse generator means responsive to the output of said range gating means and coupled to intensity said cathode ray beam of said cathode ray indicator means for forming on the display screen thereof a radial demarcation line from a selected target presentation.

59. Apparatus as described in claim 58 further including:
- buffer register means interposed between said plurality of display gate means and said numerical display means,
- said plurality of display gate means and said buffer means being enabled in response to said range gating means.

60. Apparatus as described in claim 55 further including:
- a plurality of AND gate means each having a pair of inputs, and
- first coupling means for coupling said plurality of comparators to said plurality of AND gate means, said first coupling means providing all possible combinations of the outputs of said plurality of comparator means taken two at a time to said pairs of inputs, whereby a pair of predetermined target-present pulses may appear at a respective pair of said inputs, for forming a plurality of alarm signals.

61. Apparatus as described in claim 60 further including alarm means responsive to an alarm signal output from at least one of said AND gate means for indicating the presence at substantially the same range and azimuth of two target ships.

62. Apparatus as described in claim 60 further including:
- second inhibit means responsive to said alarm signal for inhibiting the response of said second bistable means to said coincidence means and of said first bistable means to said delayed radar sweep trigger pulse.

63. Apparatus as described in claim 60 further including:
- a plurality of OR gate means,
- second coupling means for coupling said plurality of alarm signals to individual pairs of said plurality of OR gate means, and
- a plurality of alarm indicator means, each responsive to an output of a respective one of said plurality of OR gate means,
  - a pair of said alarm indicator means being activated upon receipt of each one of said alarm signals.

64. Apparatus as described in claim 55 additionally including:
- a plurality of one shot generator means, and
- manual means for selectively actuating ones of said plurality of pulse generator means for enabling corresponding ones of said plurality of display gates, thereby energizing said numerical display means.

65. Apparatus as described in claim 9 further including:
- first gate means responsive to said pulse train frequency divider means for forming a master shift register shift pulse,
- first bistable means responsive to said selected pulse and to said shift pulse,
- second gate means responsive to said first bistable means and to said pulse train frequency divider means for forming a master shift register read pulse, and
- first bistable control means for controlling the state of said first and second gate means.

66. Apparatus as described in claim 9 further including:
first insertion means for inserting a synchronous word group into a first master shift register segment, and
second insertion means for inserting data groups identifying characteristics of own ship in respective ones of a discrete group of shift register segments including at least a second segment serially coupled with said first shift register segment.

67. Apparatus as described in claim 66 further including:
third insertion means for inserting a data group identifying a selected operational mode into a third shift register segment coupled in series relation with said group of series connected shift register segments, and
fourth insertion means for inserting a data group characterizing a variable delay value into a fourth shift register segment serially coupled with said third shift register segment.

68. Apparatus as described in claim 67 further including:
fifth insertion means for inserting a data group identifying a first ship in a fifth shift register segment coupled in series relation with said fourth shift register segment, and
sixth insertion means for inserting a data group identifying a second ship in a sixth shift register segment serially coupled with said fifth shift register segment.

69. Apparatus as described in claim 68 wherein said fifth insertion means includes:
first storage means for storing said data group identifying a first ship, and
first manual control means,
said first storage means being responsive to said first manual control means for transferring said first ship's stored data group into said fifth shift register segment.

70. Apparatus as described in claim 69 wherein said sixth insertion means includes:
second storage means for storing said data group identifying a second ship, and
second manual control means,
said second storage means being responsive to said second manual control means for transferring said second ship's stored data group into said sixth shift register segment.

71. Apparatus as described in claim 70 further including:
second bistable control means,
manually operated switch means for controlling said first bistable means and said second bistable control means,
omnidirectional antenna means, and
transmission line switch means responsive to said second bistable control means for selectively coupling said radar transmitter-receiver system or said omnidirectional antenna means to said transponder transmitter-receiver system.

72. Apparatus as described in claim 71 further including microwave oscillator means coupled to said transponder transmitter and to said transponder receiver and adapted selectively to supply thereto under control of said second bistable control means at least one of two carrier frequency signals spaced apart in frequency by the intermediate frequency of said transponder receiver means.

73. Apparatus as described in claim 67 wherein said third insertion means comprises:
keyboard means,
manual control means,
mode encoder means responsive to said keyboard means and to said manual control means, and
storage register means responsive to said mode encoder means.

74. Apparatus as described in claim 67 further including manually controllable bistable means for directly coupling in series relation said first and third shift register segments, thereby bypassing said group of series connected shift register segments.

75. Apparatus as described in claim 66 wherein said second insertion means includes manually operable keyboard means.

76. Apparatus as described in claim 75 wherein said second insertion means additionally includes at least:
ship's compass means for providing a data group identifying ship's course, and
ship's speed log means for providing a data group identifying ship's speed.

77. A radio aid to navigation comprising:
transponder receiver means responsive to first pulse coded messages,
signal generator means for generating successive code groups representing respective predetermined variable delay values,
circuit means for inserting said successive code groups into said first pulse coded messages for forming second pulse coded messages,
control means for variably delaying said second pulse coded messages according to said respective values, and
transponder transmitter means coupled to said circuit means for transmitting said second pulse coded messages.

78. A radio aid to navigation comprising:
synchronizing pulse generator means,
transponder receiver means responsive to said synchronizing pulse generator means for receiving first pulse coded messages,
pseudo-random pulse code signal generator means responsive to said synchronizing pulse generator means for generating successive code groups representing respective predetermined variable delay values,
shift register means for successively storing said first pulse coded messages,
circuit means under control of said synchronizing pulse generator means for inserting said successive code groups within said first pulse coded message when in said shift register means for forming second pulse coded messages, and
variable delay means responsive to said psuedo-random pulse code signal generator means and to said transponder receiver means for variably delaying said first pulse coded messages according to said respective variable delay values, and
transponder transmitter means coupled to said shift register means for transmitting said second pulse coded messages.

79. Apparatus as described in claim 78 further including:
pulse train frequency divider means for producing first and second phase trains of receiver clock pulses when excited by said synchronizing pulse generator means, and counter-decoder means for counting said first phase receiver clock pulses.

80. Apparatus as described in claim 79 further including:

coincidence means responsive to said shift register means for recognizing the receipt of a first pulse coded message of predetermined character, thereby producing a valid-reply signal, latch storage means, and selector means responsive to said valid-reply signal for passing a pulse of said second phase pulse train for reading a one of said successive code groups of said pseudo-random pulse code signal generator into said latch storage means and into a predetermined segment of said shift register means.

81. Apparatus as described in claim 80 wherein said variable delay means comprises:

multiplexer means parallel coupled to a plurality of time-spaced count outputs of said counter-decoder means, said multiplexer means being responsive to said latch means for determining which of said time-spaced counts appears at the output of said multiplexer means, and bistable means responsive to said multiplexer means for shifting said second pulse coded message into said transponder transmitter means for transmission thereby.

82. A radio aid to navigation comprising:

transponder receiver means at a local station for receiving first pulse coded messages transmitted from a remote station and characterized by an inherent propagation time, said first pulse coded messages being variably delayed upon transmission at said first station and each including a pulse coded group representing said predetermined variable delay value, recognition means responsive to said transponder receiver means for recognizing said pulse coded group and for converting it into a corresponding time delay value, time measurement means responsive to said transponder means for yielding a time measure representing the sum of said inherent propagation time and of said corresponding time delay value, subtraction means for subtracting said time delay value from said time measure for producing an output representing true range between said local and remote stations, and utilization means responsive to said true range output.

83. Apparatus as described in claim 82 wherein said utilization means comprises true range display means.

84. Apparatus as described in claim 83 wherein said utilization means comprises range sorting means whereby in the presence of a multiplicity of remote stations along the same radial from said local station, the true range outputs for said remote stations are sorted and displayed in increasing value of range.

85. Apparatus as described in claim 84 where said utilization means further includes:

input storage means having at least one channel for storing succesively coupled outputs of said subtractor means each output corresponding to one of said multiplicity of remote stations, sorting control means for arranging the order within said input storage means of said subtractor means outputs by increasing range magnitude, output storge means having at least one channel for receiving successive outputs of said input storage means in order of increasing range magnitude, display means for displaying the ordered content of said output storage means.

* * * * *